(12) United States Patent
Iversen et al.

(10) Patent No.: US 11,578,275 B2
(45) Date of Patent: Feb. 14, 2023

(54) PROCESS FOR UPGRADING OXYGEN CONTAINING RENEWABLE OIL

(71) Applicant: STEEPER ENERGY APS, Hørsholm (DK)

(72) Inventors: Steen B. Iversen, Vedbæk (DK); Claus Uhrenholt Jensen, Aalborg (DK); Julie Katerine Rodriguez Guerrero, Calgary (CA)

(73) Assignee: STEEPER ENERGY APS, Hørsholm (DK)

( * ) Notice: Subject to any disclaimer, the term of this patent is extended or adjusted under 35 U.S.C. 154(b) by 272 days.

(21) Appl. No.: 16/961,533

(22) PCT Filed: Jan. 10, 2019

(86) PCT No.: PCT/EP2019/050554
§ 371 (c)(1),
(2) Date: Jul. 10, 2020

(87) PCT Pub. No.: WO2019/138002
PCT Pub. Date: Jul. 18, 2019

(65) Prior Publication Data
US 2021/0062098 A1  Mar. 4, 2021

(30) Foreign Application Priority Data

Jan. 10, 2018  (DK) .............. PA201800011

(51) Int. Cl.
*C10G 65/04* (2006.01)
*C01B 3/38* (2006.01)
(Continued)

(52) U.S. Cl.
CPC ............ *C10G 65/04* (2013.01); *C01B 3/38* (2013.01); *C10G 1/002* (2013.01); *C10G 3/42* (2013.01);
(Continued)

(58) Field of Classification Search
CPC .......... C10G 65/04; C10G 1/002; C10G 3/42; C10G 3/50; C10G 2300/1014;
(Continued)

(56) References Cited

U.S. PATENT DOCUMENTS

2010/0133144 A1  6/2010  Kokayeff et al.
2014/0135540 A1  5/2014  Iversen
2014/0288338 A1  9/2014  Radlein et al.

FOREIGN PATENT DOCUMENTS

WO  WO-2018058172 A1 *  4/2018

* cited by examiner

*Primary Examiner* — Randy Boyer
*Assistant Examiner* — Juan C Valencia
(74) *Attorney, Agent, or Firm* — Birch, Stewart, Kolasch & Birch, LLP

(57) ABSTRACT

The invention relates to producing upgraded renewable oil. Renewable crude oil is provided whose oxygen content, water content, and total acid number are within predetermined ranges. Respective fractions of the oil have boiling points below 350° C. and above 450° C. After the oil is pressurized, and hydrogen is added, the mixture is heated and contacted with a heterogeneous catalyst in a first reaction zone with weight based hourly space velocity (WHSV) of 0.1 to 1 h-1. The resultant partially hydrogenated and deoxygenated oil is further heated and contacted with a heterogeneous catalyst in a second reaction zone at WHSV of 0.1 to 1.5 h-1. Low and high boiling point liquid hydrocarbon fractions of the product of the second reaction zone are sent to third and fourth reaction zones, respectively, to be contacted with hydrogen and a heterogeneous catalyst under respective heating conditions and WHSV of 0.1 to 1 h-1.

34 Claims, 22 Drawing Sheets

(51) Int. Cl.
*C10G 1/00* (2006.01)
*C10G 3/00* (2006.01)
(52) U.S. Cl.
CPC ........ *C10G 3/50* (2013.01); *C01B 2203/0233* (2013.01); *C10G 2300/1014* (2013.01); *C10G 2300/202* (2013.01); *C10G 2300/301* (2013.01); *C10G 2300/4006* (2013.01); *C10G 2300/4012* (2013.01); *C10G 2300/4018* (2013.01); *C10G 2400/02* (2013.01); *C10G 2400/04* (2013.01); *C10G 2400/06* (2013.01)
(58) Field of Classification Search
CPC ........ C10G 2300/202; C10G 2300/301; C10G 2300/4006; C10G 2300/4012; C10G 2300/4018; C10G 2400/02; C10G 2400/04; C10G 2400/06; C01B 3/38; C01B 2203/0233; Y02P 30/20
See application file for complete search history.

PROCESS FOR UPGRADING OXYGEN CONTAINING RENEWABLE OIL

FIELD OF THE INVENTION

The present invention relates to the field of producing renewable liquid hydrocarbons from carbonaceous materials such as biomass and wastes. In particular, it relates to an improved process and apparatus for producing compatible renewable blend stock for transportation fuels, finished transportation fuels, or renewable base oils for production of renewable lubricants in an efficient, economical and environmentally sustainable way.

BACKGROUND OF THE INVENTION

Climate change and depletion of convention fossil oil reserves are driving huge interest for transportation fuels, lubricants and fine chemicals produced from renewable sources.

New technologies for production of renewable oils produced from biomass and waste materials such as lignocellulosic (e.g. plant material and residues such as wood, grasses, etc.) are being developed including pyrolysis and hydrothermal and solvothermal liquefaction technologies.

Traditional pyrolysis processes were originally targeting the production of solid char and further developed up to maximize the production of oil by fast pyrolysis. Fast pyrolysis occurs at atmospheric pressure and temperatures of about 500° C., in the absence of oxygen, and with resident time up to 2 s. Pyrolysis processes are limited to raw materials having a moisture content of about 10% by weight. Raw materials with higher moisture content require drying whereby the carbon foot print of the products are increased. Pyrolysis processes typically produce an oil with an oxygen content of 35 to 50 wt. % and a high moisture content of typically 20 to 35 wt. % by weight that typically reduces the higher heating value to 16-19 MJ/kg and the viscosity to 40-100 cP at 50° C. Further such pyrolysis oils have a high total acid number (TAN) such as in the range in the range 80-120 mg KOH/g oil. The high total acid number and water content promote corrosion in storage and during utilization. Further pyrolysis oils have a poor thermal stability at temperatures above about 150° C. due to a large number of reactive groups, and a high risk of deterioration by polymerization and/or phase separation on prolonged storage when exposed to air. The physicochemical properties of the pyrolysis oils need to be addressed by pre-treatment prior to any hydroprocessing treatment and/or drop-in fuel utilization. The main cause of the necessity of these pre-treatments is the poor chemical and thermal stability which limits the use of high temperatures for initial stabilization process by hydroprocessing or for direct treatment under industrial hydrotreatment conditions of fossil oils.

Additionally, the high moisture content, oxygen content and solid content considerably affect commercial hydroprocessing catalysts activity and it is often necessary to use of on purpose developed catalysts, which typically involves the use of precious metals such us Ru. Fast pyrolysis oil's upgrading strategies involves multi-stages processes including initial thermal or catalytic stabilization at low temperatures (<150° C.) followed by a mild hydrogenation at temperatures about 150° C., both staged using novel-metal catalysts and finally hydrocracking at temperatures about 420° C. and liquid hourly space velocities lower than 0.2 hours$^{-1}$ using commercial sulphided catalyst.

A recent approach for upgrading of blends of pyrolysis oils and fossil hydrocarbon liquids with the addition of a dispersant and/or stabilizer agent to make the two oils miscible for processing was disclosed by Radlein et al (U.S. Pat. No. 9,896,390). The processing involves a first stage of pretreating/stabilizing the blend by hydroreforming with hydrogen and a heterogeneous catalyst in the form of hydrogen comprising Ni singly or in combination with at least one metal of the group Ce, Zr, Cr, Mo, W, Mn, Re, Fe, Ru or Cu on a porous carbon support prior to conventional upgrading by conventional hydrotreatment and/or hydrocracking/hydroconversion. The hydroreforming step takes advantage of the high water content the pyrolysis step to reduce the hydrogen consumption due to internal reforming of the pyrolysis oil by reaction with water. The resulting blended hydrocarbon liquid product (UBA) after the hydroreforming step has an oxygen content of less than 15 wt. %, a total acid number of 15 to 25 mg KOH/g and a higher heating value of 30 MJ/kg and allows for allows for separation of water from the blend to achieve a water content in the hydrocarbon product of less than 2 wt. %. The liquid hydrocarbon product blend after the hydroreforming is claimed to be fully miscible with typical refinery hydrocarbon streams and allow for upgrading using conventional hydrotreatment and/or hydrocracking/hydroconversion processes without significant catalyst deactivation, coke or biooil-polymers formation.

Hydrothermal and/or solvothermal liquefaction (HTL; STL) are very efficient thermochemical methods for conversion of such bio-organic materials into a renewable crude oil using high pressure water and/or solvents near the critical point of water (218 bar, 374° C.) e.g. at pressures from 150 bar to 400 bar and temperatures in the range from about 300 to 450° C. At these conditions water obtains special properties making it an ideal medium for many chemical reactions such as conversion of bio-organic materials into renewable crude oils. Hydrothermal liquefaction is very resource efficient due to its high conversion to renewable crude oil and carbon efficiency as all organic carbon material (including recalcitrant bio-polymers such as lignin) is directly converted to a renewable bio-crude oil. It has very high energy efficiency due to low parasitic losses, and, unlike other thermochemical processes no latent heat addition is required as there is no drying or phase change required i.e. wet materials can be processed. Furthermore, hydrothermal liquefaction processes allow for extensive heat recovery processes. The renewable crude oils are generally of much higher quality than pyrolysis oils. Depending on the specific process configuration, the oxygen content of the renewable crude oil produced are generally in the range 3-20 wt. % and often in the range 4-15 wt. %, the total acid number (TAN) is typically in the range 5-80 mg KOH/g and higher heating values in the range 35-40 MJ/kg. By proper design of the separation system in the process water contents of less than 2 wt. % in the renewable can be obtained. Hence, the renewable oil produced directly by hydrothermal and/or solvothermal is comparable with the hydroreformed product blend disclosed by Radlein et al (U.S. Pat. No. 9,896,390).

Hence, renewable crude oils produced by hydrothermal and/or solvothermal techniques are of significantly higher quality than bio oils produced by pyrolysis and have many similarities to their hydrocarbon cousins. Similar to fossil crude oil, the oxygenated bio-oil/biocrude is an intermediate that needs further upgrading to meet specifications of liquid fuels. The lower the process complexity, pre-treatment steps and hydrogen consumption, the better and most cost-effective the upgrading strategy will be. Conventional production of liquid fuels from fossil crude oil consists of initial distillation, followed by hydroprocessing/refining of each distillate cut. The processes conditions for each hydroprocessing stage has been industrially developed for each fraction's requirements. By following this logic, production of liquid fuels from renewable crude oils consists of several steps including or not initial separation and followed by hydroprocessing/refining of independent fractions.

However, despite their similarities the renewable crude oils produced by hydrothermal and/or solvothermal liquefaction techniques have properties that are different from fossil crude oils. Typically, they are characterized by having a low sulphur content e.g. in the range 0.0001 up to about 0.5 wt. % and an oxygen content in the range 3.0-20 wt. %. Further such oil may contain more or less unsaturated compounds and/or more or less aromatics and/or have a high viscosity and/or a high boiling point and/or a lower density and/or a high TAN number or other parameters that limit their direct use as blend stock or finished products. Hence, it is desirable to optimize such parameters by upgrading the oil e.g. by reacting the oil with hydrogen over a suitable heterogeneous catalyst.

However, a number of issues need to be addressed when upgrading such oxygenated crude oils including but not restricted to:

High Heat Release

Hydrogenation and in particular hydrodeoxygenation are rapid and highly exothermic reactions. The high oxygen content of the hydrothermal liquefaction crude oils crude results in a significant heat release that need to be controlled and a high hydrogen consumption. In fact, the heat released per mass of heteroatom is about 2-4 times larger for oxygen removal compared to sulphur removal. Meanwhile, the heteroatom content is 1-2 orders of magnitude higher for oxygenated crude oils compared to petroleum crude. As a result, the heat release during hydrotreating of such oil is around 20-200 times larger than during hydro-desulphurization of a petroleum feed. Hence there is a risk of a rapid and significant temperature increase and resulting hydrogen starvation around the active catalyst sites induce risk of deactivation, coking and fouling of the catalyst beds, and pressure drop build up. Hence, process design and operating protocols including control of the temperatures are important aspects of the upgrading process design.

Poor Volatility, High Boiling Point and High Viscosity

The renewable crude oil appears heavy and viscous and has a poor volatility (high boiling point) and high viscosity due the higher oxygen content than conventional fossil oils. Further there is a huge difference in the boiling point temperature of the oxygenated compounds and their corresponding hydrocarbons.

Compatibility with Fossil Counter Parts

The renewable crude oil is generally not fully miscible/compatible with its fossil counter parts nor with the partially or fully upgraded oil resulting from e.g. catalytic treatment with hydrogen.

Presence of Water

The high oxygen content of the hydrothermal liquefaction crude oils is mostly converted into water during the hydrodeoxygenation reactions occurring in the upgrading process. Thus, there will be about 10 wt. % water in the liquid products after complete hydrodeoxygenation, water during reaction is very high compared to conventional hydrotreating. Water has a negative effect on the upgrading process performance as reduces both activity and selectivity of the heterogeneous catalyst, can cause irreversible deactivation through structural changes of catalyst and increases hydrogen consumption and coke formation by undesired reactions. Hence, the concentration of water needs to be carefully managed in both the upgrading process design, operating protocol and heterogeneous catalyst design.

Coking Propensity

The aromaticity and in particular the PAH content of a hydrotreater feed relates to risk of catalyst deactivation by coking. Additionally, oxygenates and in particular methoxy- and diphenols are coke precursors. Oxygenated crude oils are rich in both aromatic and phenolic compounds, and the Conradson carbon of 15-20 wt. % is high compared to conventional hydrotreating feeds. Thus, it is important to control the coking propensity during the upgrading process. Catalyst acidity, including that of the support, facilitate coking, and thus the heterogeneous catalysts, upgrading scheme and operating protocol needs to be carefully selected.

Low Sulphur Concentration

Hydrothermal liquefaction oils have a low sulphur content when produced from low sulphur carbonaceous feed stock sources such as many lignocellulosics. This needs to be taken into account in both the upgrading process design, operating protocol and heterogeneous catalyst design.

These distinct properties need to be taken into account when upgrading such renewable crude oils.

Objective of the Invention

Accordingly, it is an objective of the present invention to provide an improved process, improved catalysts, and an improved apparatus for upgrading oxygen containing renewable oils partly or wholly remedying the problems and disadvantages as described above and further providing a process being more effective for example by requiring less external hydrogen than the prior art and/or in being simpler and/or more economical and/or having less downtime and/or resulting higher yields of desired products and/or higher quality of the oil products than in the prior art.

SUMMARY OF THE INVENTION

According to the invention, the objective(s) have been achieved by a process for producing an upgraded renewable oil from renewable carbonaceous material(-s) comprising:

a. Providing an oxygen containing renewable crude oil having:
   an oxygen content in the range of 3.0 to 20% by weight,
   a water content of less than 2.0 wt. %
   a total acid number in the range from 5 to 80 mg KOH/g,
   a fraction of the oil having a boiling point below than 350° C. of less than 70% by weight, and
   a residue fraction having a boiling point of more than 450° C. of at least 10% by weight,
b. Pressurising the oxygen containing renewable crude oil to an operational pressure in the range 60 to 200 bar;
c. Adding and mixing hydrogen to the pressurized oxygen containing renewable crude oil;
d. Contacting the pressurized mixture with at least one heterogeneous catalyst contained in a first reaction zone at a temperature of 260 to 350° C. having a weight based hourly space velocity (WHSV) in the range 0.1 to 1 $h^{-1}$ so as to produce a partially hydrogenated and deoxygenated oil;
e. Separating water, gas and optionally a low boiling fraction from the partially hydrogenated and deoxygenated oil from the first reaction zone f. Heating the partially hydrogenated and deoxygenated oil from the first reaction zone to a temperature in the range 350 to 400° C.;
g. Contacting the partially hydrogenated and deoxygenated oil with at least one heterogeneous catalysts in a second reaction zone at a temperature of 350 to 400° C. at weight based hourly space velocity (WHSV) in the range 0.1 to 1.5 $h^{-1}$,
h. Separating the product from the second reaction zone into a at least a gas fraction, a water fraction, a low boiling point renewable liquid hydrocarbon fraction and a high boiling point renewable liquid hydrocarbon fraction.
i. Contacting the low boiling point fraction from the second reaction zone with hydrogen and one or more heterogeneous catalysts at a temperature in the range 350 to 390° C. in a third reaction zone having a weight based space velocity in the range 0.1 to 1 $h^{-1}$, thereby producing a first product stream and
j. Contacting the high boiling point oil fraction with hydrogen and one or more heterogeneous catalysts at a temperature in the range 360-420° C. in a fourth reaction zone having a weight based space velocity in the range 0.1 to 1 $h^{-1}$, thereby producing a second product stream.

The first and second product streams from the third and the fourth reaction zones is according to a preferred embodiment further separated into a liquid hydrocarbon product, a water phase and a gas phase.

During conventional upgrading of fossil crude oils at refineries, the crude oil is first fractionated and the resulting fractions of the crude oil are upgraded individually by hydroprocessing such as hydrotreatment and/or hydrocracking. According to the present invention the whole oil or at least a wider spectrum of the whole oil having a broad range of boiling point, is treated without prior fractionation. As will be further exemplified in the detailed description and examples this results in a significant reduction in the boiling point and viscosity, and significantly higher yield of desired renewable hydrocarbon products and thereby a more efficient and economical upgrading process.

The oxygen content of the renewable oxygen containing crude oil provided is according to a preferred embodiment of the present invention in the range 4.0 to 15 wt. % such a as in the range 5 to 12 wt. %.

The water content of the renewable oxygen containing crude oil provided is generally below 2 wt. % such as below 1.5 wt. %; preferably the water content of the renewable crude oil is below 1.0 wt. % such as below 0.5 wt. %; advantageously the water content of the renewable oxygen containing crude oil provided is below 0.25 wt. % such as below 0.15 wt. %.

The Total Acid Number (TAN) of the renewable oxygen containing crude oil provided is generally in the range 5 to 80 mg KOH/g such as in the range 5 to 70 mg KOH/g. Preferred embodiments include applications where the Total Acid Number (TAN) of the renewable oxygen containing crude oil provided is in the range 5 to 60 mg KOH/g such as in the range 5 to 50 mg KOH/g.

In many applications of the present invention the fraction of the renewable oxygen containing crude oil provided having a boiling point below than 350° C. is less than 70% by weight such as less than 60% by weight. However, other preferred embodiments include applications where the fraction of the renewable oxygen containing crude oil provided having a boiling point below than 350° C. is less than 50% by weight such as less than 40%.

The fraction of the renewable oxygen containing crude oil provided having a boiling point of more than 450° C. is typically more than 10% by weight such as more than 20% by weight. Preferred embodiments include applications where the fraction of the renewable oxygen containing crude oil provided having a boiling point below than 450° C. is more than 30% by weight such as more than 40% by weight.

An advantageous embodiment is where the first reaction zone comprises an initial stabilization zone for reducing the content of reactive oxygenated compounds and/or unsaturated compounds and/or aromatic compounds and/or metals of the low oxygen containing renewable crude oil where the weight based space velocity of the initial stabilization zone is in the range 0.2 to 1 $h^{-1}$ such as in the range from 0.2 to 0.5 $h^{-1}$.

The first reaction zone may according to the present invention comprise at least 2 reactors. An advantageous embodiment is where the first reaction zone comprises more than one heterogeneous catalyst and where the reaction rates are controlled by grading the catalyst bed(-s) so that the catalyst activity is increasing during the first reaction zone. Hereby an improved control of the temperature increase from the exothermic reactions and resulting catalyst deactivation and coking due to hydrogen starvation is obtained. By controlling the reaction rates this way it is further obtained that the product and feed are fully miscible at any point in the first reaction zone whereby the risk of reactor plugging due to parts of the oil being deposited due to incompatibility between the incoming feed and the product from the reaction.

Advantageously hydrogen is produced from the separated gas from step e and/or step h by contacting it with steam and a heterogeneous catalyst capable of performing a steam reforming reaction of hydrocarbons contained in the process gas in a fifth reaction zone.

Preferred steam reforming catalysts for performing said steam reforming of the separated gas in the fifth reaction zone include in supported monometallic Ni catalyst and/or bimetallic Ni-M supported catalysts, where M is selected from the group of Pd, Pt, Ru, Rh, Re, Ir, Au, Ag, Cu, Co, Mo, Cr, Fe, Mn, W, Sn, Ce, Zr, Ti, Mg. Another advantageous catalyst material is Ru—Ce.

The supporting material is preferably having a high surface area such as a BET surface area of at least 150 m2/g such as a BET surface area of at least 200 m2/g; preferably the BET surface area is least 230 m2/g such as a BET surface area of at least 260 m2/g. Suitable supporting materials according to the present invention include alumina such as γ-alumina, α-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, and porous carbon such as activated carbon or pet coke, zeolites or combinations thereof. The support may optionally further comprises promoters such as phophorous and/or boron. By performing such steam reforming of the seprated gas the requirements for external hydrogen is reduced or eliminated.

The pressure of the steam reforming of the separated process gas the fifth reaction zone is according to a preferred embodiment performed at a pressure in the range 2 to 40 bar such as 3 to 30 bar and a temperature in the range 350° C. to 600° C. such as a temperature in the range 400 to 500° C. and a weight based space velocity in the range 0.1 to 2 hours$^{-1}$ in a fifth reaction zone.

An advantageous embodiment of the present invention is where the step a of providing oxygen containing renewable crude oil comprises:

Providing a carbonaceous material in the form of biomass contained in one or more feedstock;

Providing a feed mixture by slurring the carbonaceous material in one or more fluids, at least one of which comprises water;

Pressurizing the feed mixture to a pressure in the range 150 to 400 bar;

Heating the pressurized feed to a temperature in the range of 300° C. to about 450° C.

Maintaining the pressurized and heated feed mixture in a reaction zone for a conversion time in the range 3 to 30 minutes;

thereby causing the carbonaceous material to be converted; and

Cooling the converted feed mixture to a temperature in the range from 25° C. to 200° C.;

Expanding the converted feed mixture to a pressure in the range 1-120 bar, and separating the converted feed mixture into at least a low oxygen containing renewable crude oil, a gas phase and a water phase comprising water-soluble organics and dissolved salts;

thereby providing an oxygen containing renewable crude oil having an oxygen content in the range from 3.0 wt. % to 20.0 wt. %, a water content of less than 2.0 wt. % a total acid number in the range from 5 to 80 mg KOH/g, a fraction of the oil having a boiling point below than 350° C. of less 70% by weight, and a residue fraction having a boiling point of more than 450° C. of at least 10% by weight.

In many embodiments of the invention the oxygen containing renewable crude oil provided in step a has an aromatics content of at least 20% by weight or at least 30% by weight; particularly in the range from about 20 to 70% by weight such as in the range from about 30% by weight to about 70% by weight.

The H/C ratio of the renewable oil is for many relevant carbonaceous materials is for many carbonaceous materials such as lignocellulosic quite low. Often the H/C ratio of the oxygen containing renewable crude oil is in less than 1.5 such as less than 1.3.

An advantageous process according to the present invention further comprises

Passing the first and second product streams from the third and/or fourth reaction zone to a further separation zone in which water and gases and optionally a low boiling fraction are separated from the product streams;

Passing the dewatered and degassed product streams to a fractionation zone, where the product streams are separated into a naptha, fraction, an aviation fuel fraction, a diesel fraction, a gas oil fraction, and a residual fraction or any combination thereof.

In a preferred approach, part of the separated oil from the step e and/or the step h is withdrawn and added to the oxygenated renewable crude oil prior to the pressurization step b.

The weight ratio of the partially hydrogenated and deoxygenated oil being withdrawn from step e and/or step h and added to the oxygen containing renewable crude oil prior to step b is in a preferred embodiment in the range 0.1-3.0 such as in the range 0.1 to 1.0.

The separated oxygen containing renewable crude oil may according to a preferred embodiment be subjected to a polishing step for removal of inorganic contaminants prior to being pressurized in step b. A preferred polishing step for removal of inorganic contaminants comprises an ion exchange step comprising a cation resin.

The concentration of inorganics in the oil being pressurized may in a preferred embodiments of the present invention be in the range from about 0.1 ppm by weight to about 1000 ppm by weight, such as in the range 1 ppm by weight to about 600 ppm by weight; preferably in the range from about 1 ppm by weight to about 400 ppm by weight such as in the range from about 1 ppm by weight to about 300 ppm by weight; even more preferably in the range from 5 ppm by weight to about 200 ppm by weight such as in the range from about 5 ppm by weight to about 100 ppm by weight.

The sulphur content of the oxygen containing renewable oil or the feed being pressurized is in the range from about 50 ppm by weight to about 20000 ppm by weight, such as in the range from about 50 ppm by weight to about 10000 ppm by weight; preferably in the range from about 100 ppm by weight to about 5000 ppm by weight such as in the range from about 200 ppm by weight to about 500 ppm by weight.

A process according to any of the preceding claims, where the renewable crude oil is spiked with sulphur by addition of a sulphur containing compound and/or oil to the oxygen containing renewable crude oil prior to the pressurization step b.

Preferred sulphur spiking agents according to the present invention include sulphur containing compound selected from the group of hydrogen sulphide ($H_2S$), carbon disulphide ($CS_2$), dimethyl sulphide (DMS), dimethyl disulphide (DMDS), dimethyl sulfoxide (DMSO), light gas oil, heavy gas oil or a combination thereof.

By adding such sulphur spiking compound, a more stable heterogeneous catalysts, and consequently a more efficient and economical process is provided, particularly when the renewable oxygen containing oil provided is produced from renewable carbonaceous materials having a low sulphur content.

According to preferred embodiments of the invention the carbonaceous material in the form of biomass may comprise a lignocellulosic material such as wood.

The total hydrogen consumption required by the upgrading process according the present invention is in the range 2 to 10% by weight of the incoming oil being upgraded such as in the range 2 to 6% by weight of the incoming oil being upgraded; preferably in the range 2.5 to 4% by weight of the incoming oil being upgraded such as 3 to 4% by weight of the incoming oil being upgraded.

An advantageous embodiment is where the hydrogen added is at least partly produced in and extracted from said process of producing an upgraded renewable oil e.g. is extracted from the step of providing the oxygen containing renewable crude oil and/or extracted from gas exiting the upgrading process. In an advantageous embodiment the amount of external hydrogen required is required further is further reduced by passing the process gas from the step a. of providing the renewable oxygen containing crude oil and/or the gas separated from the first reaction zone (step e) and/or the second reaction zone (step h) and/or third reaction zone and/or fourth reaction zone to the steam reforming step prior to extracting said hydrogen from the process.

Preferred technologies for extracting said hydrogen from the process gas include membrane gas separation and pressure swing adsorption.

Often the amount of hydrogen extracted from said process of producing an upgraded renewable oil comprises at least 50% of the total hydrogen consumed by the upgrading process substantially all of hydrogen added to the upgrading process is produced by the process such as at least 90% of the hydrogen consumed by said upgrading process. In an advantageous embodiment the amount of hydrogen extracted exceeds the amount of hydrogen added to the upgrading process.

Thereby the need for external hydrogen and/or the scale and/or the need for a hydrogen plant is eliminated or significantly reduced. As hydrogen constitutes a major part of the upgrading process a significant economical advantage is obtained. Further as the hydrogen extracted from process is produced from renewable resources the carbon footprint of the upgraded products is significantly reduced. As the key driver for renewable products is reduce the carbon footprint this is a key element.

The carbon foot print of the upgraded products produced by the upgrading process according to the present invention is at least 60% less than the fossil equivalents such as at least 70% less than the fossil equivalents; in a preferred embodiment according to the present invention the carbon foot print of the upgraded products is at least 80% less than the fossil equivalents such as at least 90% less than the fossil equivalents; in an advantageous embodiment the carbon foot print of the upgraded products produced by the upgrading process is at least 100% less than the fossil equivalent such as least 110% less than its fossil equivalent.

Hence a more efficient process, requiring significantly less external hydrogen, having a lower carbon footprint and being more effective and economical and environmentally sustainable than prior art processes is provided.

Typically, the heterogeneous catalyst(-s) in the first reaction zone and/or second reaction zone and/or third reaction zone comprises one or more hydrotreating, hydroprocessing, hydrocracking, hydrogenation, hydrodearomatization, hydrodemetallization and/or hydro-isomerization catalysts.

Preferred forms of the heterogeneous catalyst(-s) according to many aspects of the present invention include heterogeneous catalyst(-s) on a sulphided form, a reduced form and/or in a carbide form and/or in a carbonate and/or in a nitride form and/or in a phosphide form and/or in a phosphate and/or in a boride form and/or in a oxide form and/or in a hydroxide form and/or a sulphate form or a combination thereof.

A preferred embodiment of the invention is where the heterogeneous catalyst in the first reaction zone and/or second and/or third and/or fourth reaction zone comprises one or more elements selected from the group of Fe, Ni, Co, Mo, Cr, W, Ce, Ru, Rh, Pd, Pt, V, Cu, Au, Zr, Ti, B, Bi, Nb, Na, K supported on a supporting structure.

A further preferred embodiment of the invention is where the heterogeneous catalyst(-s) in the first reaction zone and/or second reaction zone and/or third reaction zone and/or fourth reaction zone according to the present invention is/are a bi-metallic or tri-metallic catalyst supported on a supporting structure.

An advantageous embodiment of the invention is where the bi-metallic or tri-metallic heterogeneous catalyst(-s) and/or catalyst elements in the first reaction zone and/or second reaction zone and/or third reaction zone and/or fourth reaction zone comprises
   a. one or two metals selected from group VIIIB of the periodic table such as one or two metals selected from the group of Fe, Co, Ni, Ru supported on a supporting structure, and
   b. one or more elements selected from group VIB of the periodic table such as one or two metals selected from the group of Cr, Mo, W
   c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

In a preferred embodiment according to the present invention the heterogeneous catalyst may further comprise one or more elements selected from Ce, Ti, Zr, B, Bi, Cu, Na, K, Mg.

The amount of each of said catalyst(-s) or catalytic element(-s) is/are typically in the range 0.01 to 27% by weight such as in the range 0.1 to 18% by weight. In some preferred embodiments the amount of each of said catalyst (-s) or catalytic element(-s) is in the range 0.01 to 5% by weight. In some advantageous embodiments the amount of each of said catalyst(-s) or catalytic element(-s) is in the range 0.5 to 4.0% by weight.

It is generally preferred that acidity of said supporting structure is low to moderate in order to minimize undesired reactions such coke formation and/or polymerization reactions. In some applications of the present invention the number of acidic sites on the catalyst support may be reduced by reacting the acidic sites with a suitable base such as sodium hydroxide or potassium hydroxide prior to drying.

Advantageous embodiments of the present invention include supporting structures comprising Ce. It has been found that presence of ceria in the support contribute to the reduction of coke formation on the catalyst surface and increase the thermal resistance of the catalyst support, and enables higher loadings and better dispersion of active metals.

Particularly preferred support according to the present invention include alumina such as γ-alumina or δ-alumina, silica, stabilized alumina, silicate and alumosilicate such as MCM-41, silicoaluminophosphates (SAPO), aerogirine, ceria, zirconia, titania, activated carbon and hydrotalcite supports and combinations thereof.

Further, some of the compounds of the oxygen containing renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the support structure for the heterogeneous catalyst has few micropores with pore size less than 20 Angstrom, a large amount of mesopores in the range 20 to 500 Angstrom and some macropores with a pore size larger than 500 Angstrom.

A preferred embodiment of the present invention comprises a support structure for the heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a support structure for the heterogeneous catalyst having a BET surface as measured by $N_2$ adsorption at 77K in the range 20 to about 500 $m^2/g$ such as in the range 20 to 250 $m^2/g$, preferably the support has a surface area (BET) in the range in the range 30 to 150 $m^2/g$ such as in the range 40 to 120 m²/g, even more preferably the support have a surface area (BET) in the range 60 to 120 m²/g such as in the range 60 to 100 m²/g.

The pore density of the support structure for the heterogeneous catalyst in as measured by $N_2$ adsorption at 77 K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

The heterogeneous catalyst(-s) in the first and/or the second reaction zone may according to many aspects of the invention comprise substantially the same heterogeneous catalyst(-s) operating a different operating conditions (e.g. different temperature and/or pressure). However, in many aspects of invention the heterogeneous catalysts in the first and second reaction zone comprise different heterogeneous catalysts having different activities.

The temperature, pressure, heterogeneous catalyst and liquid hourly space velocity of the first reaction zone and the second reaction zone and/or third reaction zone is often selected so as to reduce the oxygen content of the oxygen containing renewable crude oil, while reducing other parameters such as the amount of residue (e.g. compounds having a boiling point above 450° C., the boiling point curve and/or the total acid number (TAN) and/or the viscosity and/or the density and/or the amount of unsaturated compounds such as olefins and/or the amount of aromatics, while avoiding turning too much of the lower boiling compounds into an undesired gas products that reduces the yield of desired liquid hydrocarbon products such as upgraded hydrocarbons having a boiling point in the jet fuel and diesel range.

As mentioned in background introduction there are a number of issues that needs to be addressed when selecting the process scheme, catalysts and operating protocol for the upgrading process. For example, a man skilled in the art will obviously maximize the catalysts reactivity/activity and minimize the number of reaction zones, minimize reactor volumes and operate the process at as mild conditions as possible to achieve the desired quality and quantity of the oil product(s) from the process. However, it has been found that such approach is highly disadvantageous as the oxygen containing renewable crude oil is highly reactive and not fully miscible with the out going product thus leading to deposition of unsoluble parts of the partially upgraded renewable oil, a high temperature increase in reactors and increased coking if such approach is pursued. Further as the product is not fully miscible with the incoming renewable crude oil conventional solutions to control the heat generation such as cooling of a recirculation streams around reactors is generally not an option.

Hence, the conversion of the incoming feed needs to be carefully managed and controlled. According to the invention this is performed by applying at least two reaction zones, each comprising at least one reactor and at least one heterogeneous catalyst.

The operating pressure in the first reaction zone and/or second reaction zone may be at least 20 bar such as an operating pressure in the first reaction zone of at least 50 bar; Preferably the operating pressure in the first reaction zone is at least 60 bar such as an operating pressure in the first reaction zone of at least 80 bar; Advantageously the operating pressure of the first reaction zone is at least 100 bar such as an operating pressure of at least 110 bar.

Further according to a preferred embodiment of the invention the operating pressure in the first reaction zone may be below 200 bar such as an operating pressure in the first reaction zone below 180 bar; Preferably the operating pressure of the first and/or second reaction zone is below 150 bar such as below 120 bar.

Depending on the specific configuration of the step of providing the oxygen containing renewable crude oil, such oil may comprise more or less reactive species such as aldehydes and/or ketones and/or other oxygenates and/or unsaturated and/or aromatic compounds and/or ash compounds or metals including K, Na, Ca, Mg, P, Si, Fe, Ni, Co, Cr, Al. Such reactive species may react such as by polymerization and/or by coking and/or inorganic elements may foul heat exchangers and/or poison and/or plug the pores the catalyst in the downstream reactors, and shorten the lifespan and reduce the cost effectiveness of catalysts. Hence, in certain preferred embodiments of the present invention, it is desirable to remove and/or reduce such reactive species and inorganic elements prior to the further subsequent catalytic reactors.

Hence, an advantageous embodiment of the present invention is where the first reaction zone comprises a stabilization zone for reducing and/or eliminating the amount of reactive species such as aldehydes and/or ketones and/or other oxygenates and/or unsaturated compounds and/or aromatic compounds and/or inorganic elements such as metal compounds thereby reducing polymerization and/or coking and/or fouling during heat up and thereby protecting down stream catalysts from clogging and poisoning. Thereby the down time is reduced, and catalyst lifetime extended, and hence a more effective and economical process is provided.

The temperature at the inlet of the first reaction zone is depending on the specific catalyst(-s) and hydrogen pressure used in the first reaction zone. The lower limit of the inlet temperature to the first reaction zone is generally selected for the desired reactions to proceed with a reasonable rate without depleting the hydrogen on the surface, which may lead to coking, whereas the upper limit is selected so as to avoid excessive coking.

The upper limit of the operating temperature of said first reactor of reaction zone 1 is typically selected to avoid excessive coking. Hence in many embodiments the inlet temperature to the first reaction zone is below 350° C. such as below 340° C., preferably below 330° C. such as below 320° C.

The lower limit for the operating temperature of said first reactor of reaction zone 1 may according to the invention be above 260° C. such as an operating temperature of the first reaction zone 1 of at least 270° C.; preferably the temperature to the first reaction zone is at least 280° C. Advantageously the operating temperature of the first reaction zone is in the range 260 to 350° C. such as in the range 280 to 345° C.

The inlet temperature of the renewable oxygen containing crude oil prior to the pressurization step b. is in a preferred embodiment in the range 80 to 150° C. such as in the range 100 to 130° C.

The heating from the inlet temperature of the pressurized renewable crude oil to the operating temperature may be all be supplied by heating the pressurized renewable crude oil in an external heat exchanger. However, in many advantageous embodiments of the present invention at least part of the heat required to reach the operating temperature in reaction zone 1 is provided in the reactors e.g by the exothermic reactions in the reactor(-s).

The heterogeneous catalyst for said stabilization zone in the first reaction zone is often selected to have an open pore structure e.g. a high pore volume with many pores in the macro and mesoporous size range to ensure accessibility of the oil composition along with a large metal and metalloid storage capacity.

The hydrogenation reactions occurring during said upgrading are highly exothermic i.e. heat is generated by said reactions. Hence, the outlet temperature from the reactors is generally higher than the inlet temperature, and at least part of the heat for heating of the renewable oil to the desired reaction temperatures in reaction zone may be generated by the reactions in the stabilization reactor.

Often the oxygen containing renewable crude oil in the first reaction zone is very reactive due to the relatively high oxygen content. Too high activity of heterogeneous catalyst in the first reaction zone is not desired as the surface of the catalyst may be depleted and may lead to deposits. Further too high activity of the heterogeneous catalyst in the first reactive zone may lead to deactivation of the catalyst/loss of surface area due to generation of hot spots from the exothermic reaction occurring during said upgrading process in the first reaction zone.

Hence, according to aspects of the present invention the activity of the heterogeneous catalysts in the first reaction zone are selected so as to have a relatively low activity initially in the stabilization zone and gradually to be increased through the first reaction zone. Hereby, the control of reaction rate and temperature profile is improved and hot spots are avoided.

Hence, the catalyst in the stabilization zone is often selected to be less active than in the subsequent catalytic reactor so as to obtain a controlled pre-reaction and temperature profiles and to ensure the incoming feed and the products are not too different at a given position in the reaction zone.

In a preferred embodiment the heterogeneous catalyst the stabilization zone of first reaction zone is a spent catalyst from the more active catalysts in the subsequent reactors in the first and/or second reaction zone.

In another preferred embodiment a lower activity may be obtained by diluting the catalyst with an inert material such as silicon carbide.

In a further advantageous embodiment a combination of dilution and catalysts with different activities are applied.

The weight hourly space velocity (WHSV) in said stabilization zone is according to many aspects of the invention in the range 0.1 to 1.5 hours$^{-1}$ such as 0.2 to 1.0 hours$^{-1}$. Preferably the weight hourly space velocity (WHSV) in the stabilization zone is in the range from about 0.2 to 0.5 hours$^{-1}$.

Typically, the oxygen content of the oxygen containing renewable crude oil is reduced by 20 to 60% such as 25 to 50% during the passage of said stabilization zone.

Further in preferred embodiments of the present invention the aromatic content of the oxygen containing renewable crude oil is reduced during the passage of the stabilization zone of the first reaction zone. According to many aspects of the invention the aromatic content is reduced by 20 to 75% during the passage of said stabilization zone of the first reaction zone such as a reduction of the aromatic content of 30 to 60% during the passage of the first reaction zone.

In an advantageous embodiment of the invention, the first reaction zone comprises two or more reactors. Hence, according to such advantageous embodiments of the invention, the effluent from the stabilization zone or the stabilization reactor of the first reaction zone enters into a second reactor of the first reaction zone typically having a higher average reactor temperature and more active catalyst than used in the stabilization zone.

The effluent from the stabilization zone of the first reaction zone may according to preferred embodiments of the invention be fed to a second reactor of the first reaction zone at the substantially the same temperature as the outlet temperature from the stabilization zone or may be further heated prior to entering the second reactor of the first reaction zone. Advantageously the inlet temperature to the second reactor is selected so as to obtain a desired average temperature in the second reactor of the first reaction zone so as to control the reaction rate.

The second reaction zone comprises two or more different catalysts arranged with an increasing catalyst activity.

The operating temperature of the second reaction zone is according a preferred embodiment of the present invention of the operating temperature below 420° C. such as below 410° C., preferably the operating temperature in the second reaction zone is below 400° C. such as below 390° C. Advantageously the operating temperature in the second reaction zone first is in the range 350° C. to 410° C. such a in the range 360° C. to 400° C. Further according to other advantageous embodiments the operating temperature in the second reaction zone is in the range from about 350° C. to about 390° C. such as in the range 360° C. to 390° C.

In many aspects of the present invention the renewable crude oil from the first and/or second reaction zone is not fully mixable with the partially upgraded oil from reaction zone 1 and/or second reaction zone, and conventional temperature control by for example cooling and recycling of the partially upgraded oil from the first or second reaction zone to the inlet of the reactor first reaction or second reaction zone is in such embodiments not possible. Hence, in an advantageous embodiment of the invention the first and/or second reaction zone may divided in multiple reactors such as two or more with intercooling of the oil in between so as to control the maximum temperature in the individual reactors.

In advantageous embodiment the weight hourly space velocity (WHSV) in the second reaction zone is selected so as to obtain a specific conversion and temperature increase in the second reaction zone. In an advantageous embodiment according to the invention the weight hourly space velocity in the second reaction zone is in the range 0.1 to 1.5 hours$^{-1}$ such as a weight based hourly space velocity in the second reaction zone is in the range 0.2 to 1 hours$^{-1}$. Preferably the weight hourly space velocity in the individual subsequent reactors in the second reaction zone is in the range 0.2 to 0.5 hours$^{-1}$ such as in the range 0.3 to 0.5 hours$^{-1}$.

In many aspects of the invention, the heterogeneous catalyst(-s) and process conditions in the third reaction zone is selected so as to perform hydrogenation reactions such as de-aromatization by saturation of aromatics and/or saturation of double bonds of the partially upgraded oxygen containing renewable crude oil from the first reaction zone and/or an isomerization of the light fraction. Hereby the density of the renewable oil is also significantly reduced. Further by treating the low boiling fraction of the renewable oil from the second reaction zone in a separate reaction zone it is avoided that too much gas and gasoline compounds are produced, whereby the overall yield of the jet fuel and diesel fraction are maximized.

The heterogeneous catalyst(-s) in the third reaction zone may comprise one or more heterogeneous catalyst(-s) and may in many applications of the invention be substantially the same as used in the first and second reaction zone, but with water, gases and heavy compounds separated from said low boiling fraction of the partially upgraded oil from the second reaction zone being treated in the third reaction zone. This reduces the risk of deactivation of the catalyst.

Advantageous embodiments include further adding and mixing hydrogen with the oxygen containing renewable crude oil between the first reaction zone and the second reaction zone and/or prior to or in the third reaction zone and/or prior to or in the fourth reaction zone.

According to a preferred embodiment the operating pressure in the third reaction zone is at least 60 bar such as an operating pressure of at least 80 bar; advantageously the operating pressure is at least 100 bar such as an operating pressure of at least 120 bar.

Further according to a preferred embodiment the operating pressure in the third reaction zone is below 160 bar such as an operating pressure of less than 180 bar; preferably an operating pressure below 140 bar such as an operating pressure below 120 bar.

The operating temperature in the reactor(-s) in reaction zone 3 is according to the invention typically below 420° C. such as below 410° C., preferably below 400° C. such as below 390° C. Even more preferably the operating temperature in the reactor(-s) in reaction zone 3 is below 380° C. such as below 370° C. Advantageously the operating temperature in the third reaction zone is in the range 350° C. to 420° C. such as in the range 350 to 410° C. Further according to other preferred embodiments, the operating temperature in the third reaction zone is in the range below 350° C. to 390° C. such as in the range 360° C. to 380° C.

The weight based hourly space velocity (WHSV) in the third reaction zone may according to an embodiment of the present invention be in the range 0.1 to 1.5 hours$^{-1}$ such as in the range 0.1 to 0.5 hours$^{-1}$, preferably the weight hourly space velocity in said third reaction zone is in the range 0.2 to 0.5 hours$^{-1}$ such as in the range 0.2 to 0.3 hours$^{-1}$.

The high boiling fraction of the separated partially upgraded oil from the second reaction zone is according to an advantageous embodiment of the present invention treated in a fourth reaction zone to maximize the overall yield of low boiling compounds such as compounds boiling in the jet fuel or diesel range. According to a preferred embodiment of the present invention the heterogeneous catalyst(-s) and the operating conditions in the fourth reaction zone are selected so as perform a hydrocracking of the of high boiling fractions.

As described above such hydrocracking may be performed using heterogeneous catalyst(-s) similar to the heterogeneous catalyst(-s) used in reaction zone 1 and 2, but typically at more severe conditions e.g. higher hydrogen pressure or higher operating temperature than used in reaction zones 1-3.

According to a preferred embodiment the operating pressure in the fourth reaction zone is at least 60 bar such as an operating pressure of at least 80 bar; advantageously the operating pressure is at least 100 bar such as an operating pressure of at least 120 bar.

Further according to a preferred embodiment the operating pressure in the fourth reaction zone is below 200 bar such as an operating pressure of less than 160 bar; preferably an operating pressure below 140 bar such as an operating pressure below 120 bar.

The operating temperature in the fourth reaction may according to a preferred embodiment be in the range 380° C. to 420° C. such as in the range 380° C. to 400° C.

The weight based hourly space velocity (WHSV) in the fourth reaction zone may according to an embodiment of the present invention be in the range 0.1 to 1.5 hours$^{-1}$ such as in the range 0.1 to 1.0 hours$^{-1}$, preferably the weight hourly space velocity in said fourth reaction zone is in the range 0.2 to 0.5 hours$^{-1}$ such as in the range 0.3 to 0.5 hours$^{-1}$.

By treating the separated high boiling fraction from the second reaction zone separately from the low boiling fraction from the second reaction zone, it is obtained that the low boiling fraction not becomes too light and eventually ends up as gas i.e. the yields of the jet and diesel fractions are maximized i.e. a more effective and economical process is obtained.

An advantageous embodiment of the fourth reaction zone according to the present invention is where steam is injected into separated high boiling fraction from the second reaction zone, and where the fourth reaction zone comprises a reactor containing a heterogeneous catalyst comprises a water splitting functionality for performing a catalytic steam conversion and/or catalytic steam cracking of said partially upgraded renewable oil. The catalytic steam conversion and/or catalytic steam cracking use steam as source of hydrogen, and generates excess hydrogen which may be recovered, compressed and recycled to the first reaction zone after separation from the upgraded oil. Without wishing to be bound to a specific theory it is believed that said catalytic steam conversion and/or catalytic steam cracking is due to oxygen deficiencies and/or vacancies at the surface of the heterogeneous catalyst(-s). The partially upgraded oxygen containing renewable crude oil may be adsorbed to the surface of the heterogeneous catalyst and may react with oxygen on the surface of the heterogeneous catalyst thereby forming $CO_2$. Water may be adsorbed and dissociated to/at the oxygen vacancy at the surface of the heterogeneous catalyst thereby renewing the oxygen on the surface, while producing hydrogen. Depending on the specific catalyst and operating conditions the hydrogen may further react with the partially oil or may be recovered from said gas phase after separation and introduced for the reactions in the first reaction zone, thereby reducing the amount of external hydrogen required for the process and thereby resulting in a more efficient and economic process with a lower carbon footprint than the prior art.

The amount of water or steam added or mixed with the oxygen containing renewable oil in the fourth reaction zone is often in the range 5.0 to 35% by weight of the oxygen containing renewable oil such as in the range 5.0 to 30% by weight of the oxygen containing renewable oil, preferably the amount of water or steam added or mixed with the oxygen containing renewable oil is in the range 5.0 to 25% by weight of the oxygen containing renewable oil such as in the range 5.0 to 20% by weight of the oxygen containing renewable oil. Even more preferably the amount of water or steam added or mixed with the oxygen containing renewable oil is in the range 5.0 to 15% by weight of the oxygen containing renewable oil such as in the range 5.0 to 10% by weight of the oxygen containing renewable oil.

The heterogeneous catalyst for performing a catalytic steam conversion and/or catalytic steam cracking of said partially upgraded renewable oil in the fourth reaction zone is according to a particularly preferred embodiment of the present invention a bimetallic or trimetallic catalyst supported on a supporting structure, and where said catalyst and/or catalyst elements comprises a. One or two transition metals selected from the group VIIIB of the periodic table of elements such as one or two metals selected from Fe, Co, Ni, Ru, Rh, Pd, Os, Ir, Pt.

b. One or more catalyst(-s) or catalyst(-s) selected from the group VIB of the periodic table of elements such as an element selected from Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

A further preferred embodiment of the heterogeneous catalyst for performing a catalytic steam conversion and/or catalytic steam cracking in the second reaction zone according to the present invention, is where said heterogeneous catalyst in the second reaction zone comprises or further comprises one or more elements selected from the group of Ce, Ti; Zr, B, Ga, Cu, B, Bi, Na, K, Mg.

According to many embodiments of the present invention said one or more elements or further elements may be present in a concentration from about to about such a concentration of said element in the range 1.0 wt. % to about 25.0 wt. % such as a concentration of said further catalyst element(s) is in the range from about 2.0 wt. % to about 25.0 wt. %. Preferably, said element or further element(-s) is present in the range from about 5 wt. % to about 20 wt % such as in the range from about 10 wt % to about 20 wt. %.

In other embodiments according to the present invention, the concentration of said one or more elements or further element(-s) may be in the range from about 0.5 wt. % to about 10 wt. % such as in the range from about 1.0 to about 7.0 wt. %. Preferably, said further element(-s) is in the range from about 1.5 wt. % to about 5 wt. %.

Advantageously said supporting oxide or hydroxide structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mn and/or Cr and/or Al and/or Fe and/or Ce or a combination thereof.

A particularly preferred embodiment according to the present invention is where said heterogeneous catalyst and/or supporting structure has the empirical formula $M(II)_6M(III)_2(OH)_{16}.CO_3.4H_2O$, where M(II) is a divalent metal ion comprising one or two elements selected from the group of Mg, Ca, Ni, Co, Cu, Mn, Zn, Fe and M(III) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16}.CO_3.4H_2O$, where x: 1.0-2.0, y: 4.0-5.0, z:0.0-1.0, w: 0.0-1.0, q: 1.0-2.0 such as $Mg_{4.3} Ni_{1.70} CeAl(OH)_{16}.CO_3.4H_2O$.

A further preferred embodiment according to the invention is where the heterogeneous catalyst and/or supporting structure comprises $Mg_{4.3} Ni_{1.70} CeAl(OH)_{16}.CO_3.4H_2O$.

According to a preferred embodiment said bimetallic or trimetallic catalyst is preferably on a sulphide form, on a carbide, a carbonate, a phosphide, a phosphate, a nitride, a boride form, an oxide form, and/or a hydroxide form and/or a combination of these.

The operating temperature in the fourth reaction zone for performing a catalytic steam conversion and/or catalytic steam cracking according to the invention is in many applications of the present invention in the range 350° C. to 410° C., such as in the range 360° C. to 410° C.; preferably the temperature at the inlet of said further catalytic reactor is in the range 360° C. to 400° C., such as in the range 360° C. to 390° C.

The operating pressure in the fourth reaction zone for catalytic steam conversion and/or catalytic steam cracking may be at least 20 bar such as an operating pressure in the first reaction zone of at least 30 bar; Preferably the operating pressure in the second reaction zone is at least 60 bar such as an operating pressure in the second reaction zone of at least 80 bar;

Further according to a preferred embodiment of the invention the operating pressure in the fourth reaction zone may be below 120 bar such as an operating pressure in the second reaction zone below 80 bar; Preferably the operating pressure of the second reaction zone is below 60 bar such as below 40 bar.

The weight based hourly space velocity (WHSV) in the fourth reaction zone may according to an embodiment of the present invention be in the range 0.1 to 1.5 hours$^{-1}$ such as in the range 0.1 to 1.0 hours$^{-1}$, preferably the weight hourly space velocity in said third reaction zone is in the range 0.1 to 0.5 hours$^{-1}$ such as in the range 0.2 to 0.3 hours$^{-1}$.

The amount of hydrogen consumed by the upgrading process may correspond to 0.01 to 10.0 wt % of the renewable oil such as 0.05 to 8.0 wt %, preferably the amount of hydrogen consumed by the upgrading process corresponds to 0.5 to 5.0 wt % of the renewable oil such as 1.0 to 4.5 wt %. Even more preferably the amount of hydrogen consumed by the upgrading process corresponds to 2.0 to 4.0 wt % of the renewable oil such as 2.5 to 3.5 wt %.

The hydrogen is in many embodiments added in excess of the stoichiometric amount of hydrogen required for the upgrading process. Hence, the amount of hydrogen added and mixed with the oxygen containing renewable oil is often up to 10 times higher than the amount of hydrogen consumed by the upgrading process such as up to 5 times higher than the amount of hydrogen consumed by the upgrading process, preferably the amount of hydrogen added and mixed with the oxygen containing renewable oil is the range 1.5 to 5 times higher than the amount of hydrogen consumed by the upgrading process such as in the range 2 to 5 higher than the amount of hydrogen consumed by the upgrading process.

The oxygen content of the oxygen containing renewable crude oil is generally below about 20 wt. % such as below about 17 wt. %, preferably the oxygen content of the oxygen containing renewable crude oil is below about 16 wt. %, such below about 12 wt. %. Often the oxygen content of the oxygen containing renewable crude oil is below 11 wt. % such as below about 10 wt. %.

The oxygen content of the oxygen containing renewable crude oil is generally in the range from about 3 wt. % to about 17 wt. % such as in the range 4-15 wt. %. Often the oxygen content of the oxygen containing renewable crude oil is in the range 5 to 13 wt. % such as 5 to 12 wt. %.

The sulphur content of the oxygen containing renewable crude oil according to the present invention is generally less than or equal to 0.5 wt. % such as below 0.3 wt %. In many embodiments according to the present invention the sulphur content of the oxygen containing renewable oil is less than or equal to 0.2 wt. % such as below 0.1 wt. %. Further preferred embodiments include oxygen containing renewable crude oil, where the sulphur content is less than 0.05 wt % such as less than 0.01 wt. %.

The nitrogen content of the oxygen containing renewable crude oil is in in a number of preferred embodiments in the range 0.01 to 7 wt. % such as in the range 2.0 to 6.5 wt. %.

In an advantageous embodiment according to the present invention heat is transferred between the step of providing said oxygen containing renewable crude oil and the upgrading step.

In a preferred embodiment the heavy oil fraction or residual oil fraction from the second reaction zone is recycled to the step a of providing said oxygen containing renewable oil and mixed with the oxygen containing renewable crude oil.

The naptha fraction of the upgraded renewable oil as defined by the boiling point range from the initial boiling point to 150° C. may according to a preferred embodiment comprise between 1 to 30% by weight of the total upgraded oil product such as 1 to 20% by weight of the total oil product; preferably the naptha fraction of the upgraded renewable oil as defined by the boiling point from the initial boiling point to 150° C. comprises 1 to 15% by weight of the total oil product such as 5 to 10% by weight of the total oil product.

The total mass yield of upgraded renewable oil from said upgrading process is in an advantageous embodiment of the present invention at least 80% by weight such as at least 85% by weight.

The total yield of upgraded renewable oil from said upgrading process is in an advantageous embodiment at least 95% by volume such as at least 100% by volume; preferably at least 103% by volume such as at least 105% by volume.

The Total Acid Number (TAN) of the upgraded renewable oil is in preferred embodiments less than 0.01 mg KOH/g.

The aromatic content of the upgrade renewable oil is in preferred embodiments less than 20% by weight such as less than 15% by weight; preferably less than 10% by weight such as less than 5% by weight.

The residue fraction of the upgraded renewable oil as defined by the fraction having a boiling of more than 450° C. is in a preferred embodiment less than 15% by weight such as less than 10% by weight; preferably less than 5% by weight.

The H/C ratio of the upgraded renewable oil according to the present invention is typically at least 1.7 such as at least 1.8; preferably at least 1.85.

The fraction of upgraded renewable oil having a boiling point below 350° C. is in a preferred embodiment according to the present invention at least 50% by weight, such as at least 60% by weight; preferably at least 70% by weight such as at least 80% by weight.

Further embodiments and advantageous effects of the present invention are presented in the following description of preferred embodiments of the invention.

Throughout this document the terms "comprising" or "comprises" do not exclude other possible elements or steps. Also, the mentioning of references such as "a" or "an" etc. should not be construed as excluding a plurality.

DESCRIPTION OF AN ADVANTAGEOUS EMBODIMENT OF THE INVENTION

Figure 1:
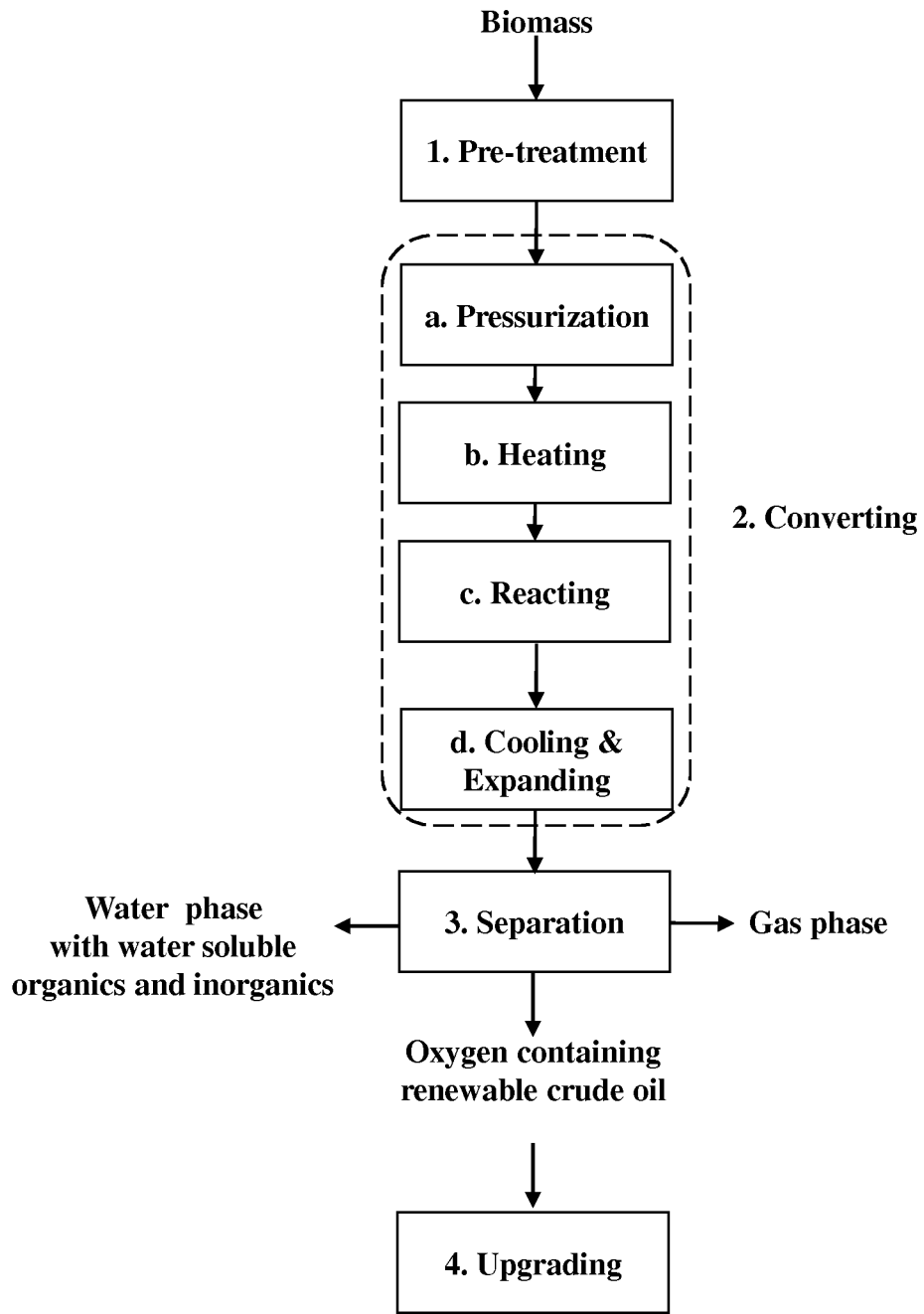
FIG. 1 shows an embodiment of a continuous process for production of oxygen containing renewable crude oil from organic materials according to the present invention.

FIG. 1 shows an embodiment of a continuous production process for producing an oxygen containing renewable crude oil produced from carbonaceous materials such as biomass.

As shown on FIG. 1, the carbonaceous material is first subjected to a pre-treatment step. The pre-treatment is designed to convert the carbonaceous material into a pumpable feed mixture and generally includes means for size reduction of the carbonaceous and slurrying the carbonaceous material with other ingredients such as water, catalysts and other additives such as organics in the feed mixture.

The feed mixture is pressurized to a pressure of at least 150 bar and up to about 400 bar before it is heated to a temperature from about 300 to 450° C.

The feed mixture is generally maintained at these conditions for sufficient time for conversion of the carbonaceous material e.g. for a period of 5 to 30 minutes, before it is cooled and expanded to ambient.

The converted feed mixture is further separated into at least a gas phase, an oxygen containing a renewable crude oil phase, a water phase with water-soluble organic compounds as well as dissolved salts such as homogeneous catalysts and eventually suspended particles. The separation may be performed by gravimetric phase separation or other suitable means such as centrifugation.

The oxygen containing renewable crude oil enters the upgrading part of the process according to the present invention.

Figure 2:
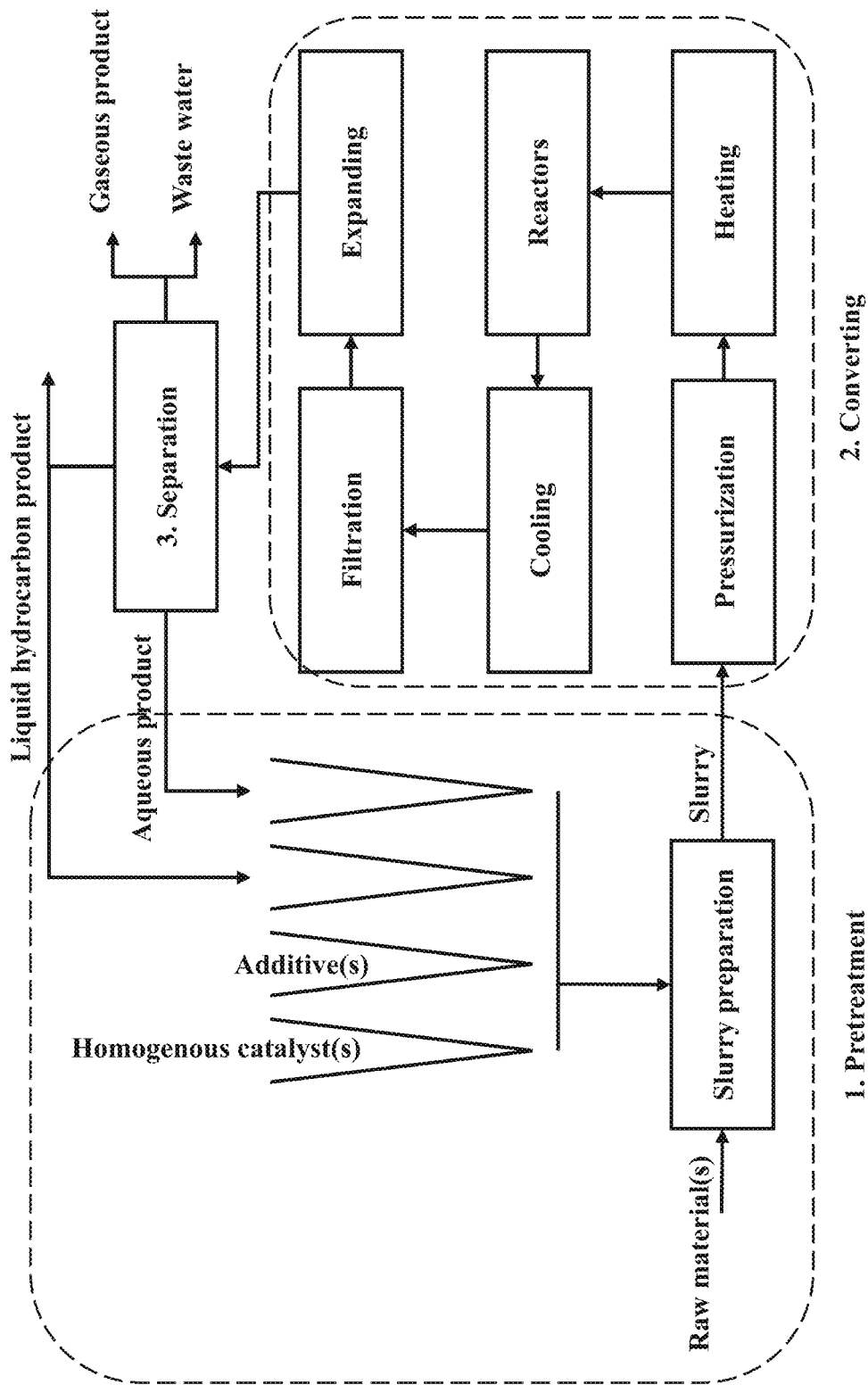
FIG. 2 shows a flow diagram of the continuous plant used for production of oxygen containing renewable crude oil from organic materials according to the present invention.

FIG. 2 shows a flow diagram of the continuous pilot plant used to provide the oxygen containing renewable crude oil in the examples below. Carbonaceous material such as biomass is pre-treated. The first part of the pre-treatment includes a size reduction in a hammermill to a maximum particle size of about 2 mm. The milled carbonaceous material is subsequently processed into a feed mixture in the slurry by mixing with other ingredients such as recycled water phase, recycled oil phase, makeup catalyst, and sodium hydroxide (to adjust pH). The feed mixture is then pressurized to a pressure range of 300-350 bar by the feed pump, heated to 370-420° C. in two electric heaters before entering the reactors. The reactors comprise two top fed cylindrical reactors connected in series. Depending on the specific flow rate used the retention/residence time in the reactors is in the range 4 to 25 minutes. The product mixture from the reactors is cooled to 80-120° C. by a water cooler. The product mixture continues through a 250 pm filter for separation of solid particles and dependent on the filtration temperature eventually high boiling liquid hydrocarbon compounds. Pressure let down is carried out through a series of 1.75 mm ID capillaries with a length of 200-400 m. The depressurized product mixture is further cooled to a temperature of 20-80° C., and proceeds to a flash tank for separation of the products. The gaseous product is separated from the liquid phase comprising liquid hydrocarbons (oil) and water with water-soluble organics, dissolved salts and eventually suspended particles. An oxygen containing renewable crude oil is gravimetrically separated from the aqueous products.

Figure 3:
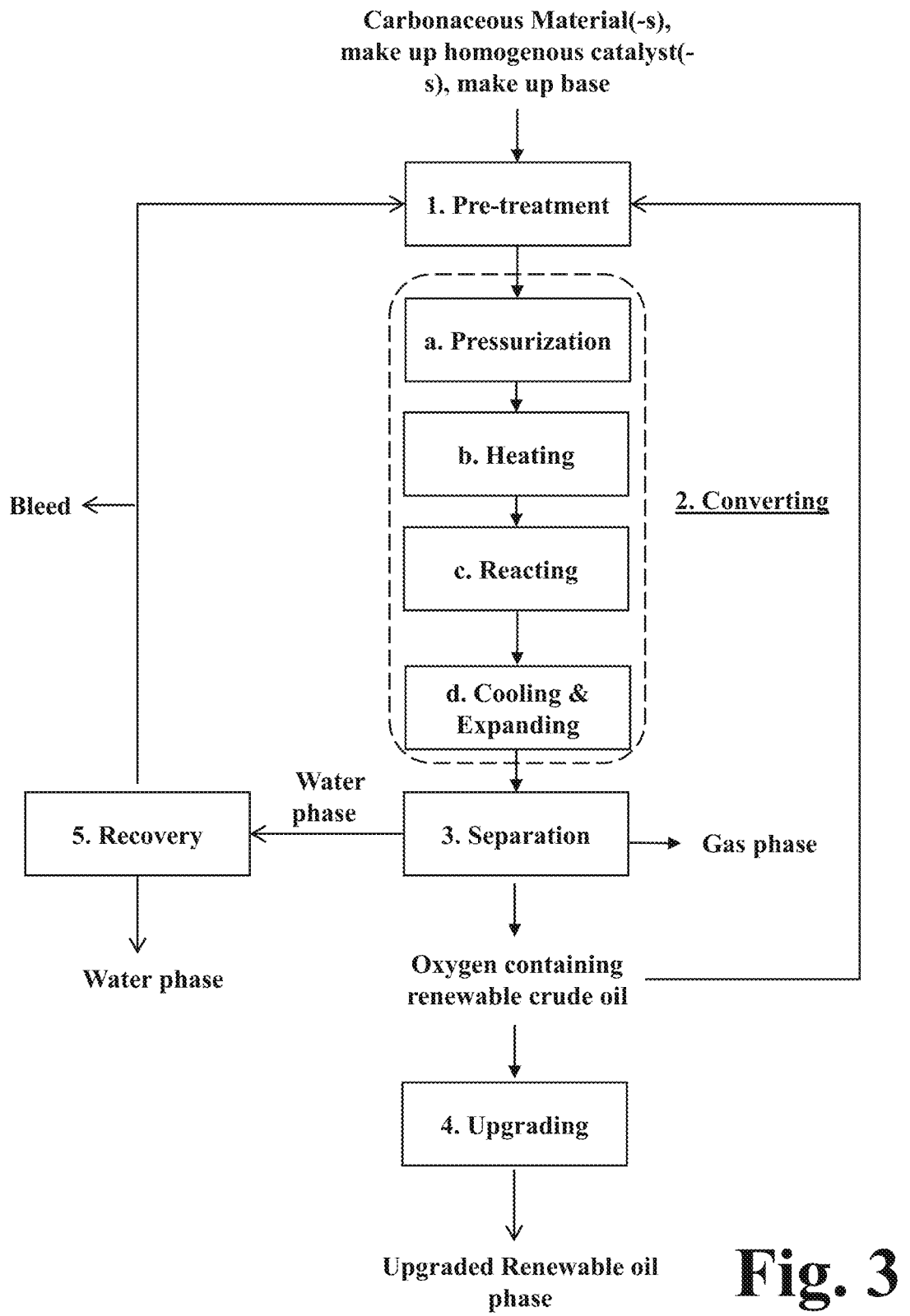
FIG. 3 shows an advantageous embodiment of the step of providing an oxygen containing renewable crude oil from organic materials according to the present invention.

FIG. 3 shows an advantageous embodiment of the step of providing an oxygen containing renewable crude oil from carbonaceous materials to said upgrading process according to the present invention.

1. Pre-Treatment

Carbonaceous materials such as biomass contained in one or more raw material input streams are introduced into a pre-treatment step in pre-treatment device, where they are transformed into a homogeneous, pumpable feed mixture in the form of a slurry and/or paste.

This may be advantageously be performed e.g. by introducing in situ produced liquid organic compounds such as a recycle stream of a liquid hydrocarbon product produced by the process or a fraction of the same as indicated by the fluid stream from the first separation and into the pre-treatment device and/or recovered liquid organic compounds produced by the process and/or homogeneous catalysts from the water phase into the pre-treatment device.

The liquid hydrocarbons produced in said step of providing an oxygen containing renewable crude oil typically contains oxygen in a concentration from about 1 wt % and up to about 20 wt. %. In many embodiments according to the present invention the oxygen content of said liquid hydrocarbons have an oxygen content in the range 2 wt. % to about 17 wt. % such a an oxygen content in the range 4 wt % to about 15 wt. %, and in further embodiments the oxygen content of liquid hydrocarbons is in the range 5-12 wt. % such as 6 to 11 wt. %.

The liquid hydrocarbons produced in said step often contain hundreds of different compounds such as alkanes, phenols, alkylated phenols, alkoxylated phenols ketones such as pentanones and pentenones, alkylated pentanones, alkylated pentenones, hexanones, indanones, carboxylic acids, fatty acids, monocycloparaffines, dicycloparaffines, alkylbenzenes, naphthenebenzenes, naphthalenes, naphthenols, etc.

It should be noted that the oil produced by the process behaves differently (has a different affinity to oxygenated carbonaceous feedstocks such as lignocellulosic such as wood) than mineral oils and that the full effects stated below may not be obtained using e.g. mineral oils. Whereas such mineral oils are good solvents for less polar materials such as coal they are generally not fully mixable with the oxygen containing oil produced by the process. It should further be noticed that the liquid hydrocarbons recycled may be part of the whole oil or it may be one or more fractions of the liquid hydrocarbons e.g. a high boiling fraction of the produced oil e.g., a high boiling fraction before or after upgrading. By recycling such high boiling fraction of the liquid hydrocarbons produced the yield of lower boiling compounds may be increased.

Advantageously said liquid hydrocarbons produced by the process is introduced into said pre-treatment step in a dry ash-free weight ratio to the carbonaceous material of 0.5 to 1.5 such as in a dry ash-free weight ratio to the wood in the range 0.8 to 1.2.

The concentration of said liquid hydrocarbons produced by process in the feed mixture may according to an embodiment of the present invention be at least 10 wt. % such as at least 12.5 wt. %. Preferably the concentration of said liquid hydrocarbons produced by process in the feed mixture is at least 15 wt. % such as at least 20 wt. %. Even more preferably the concentration of said liquid hydrocarbons produced by process in the feed mixture is at least 22.5 wt. % such as at least about 25 wt. %. At lower concentrations the full benefits of the addition of the in situ produced liquid hydrocarbon further described below is not obtained.

Further, the concentration of said liquid hydrocarbons produced by process in the feed mixture may according to an embodiment of the present invention be below about 40 wt. % such as below about 35 wt. %. Preferably the concentration of said liquid hydrocarbons produced by process in the feed mixture is below about 30 wt. % such as a concentration of said liquid hydrocarbons produced by process in the feed mixture below about 25 wt. %. At higher concentrations of said in situ produced liquid hydrocarbons there is not sufficient space for other required ingredients such as water, homogeneous catalysts and water-soluble organics for the conversion reactions to proceed as desired.

Water-soluble organics produced by the process are preferably recovered in the recovery unit and recycled to the feed preparation step in a concentrated form.

It should be understood that the water-soluble organics comprises a complex mixture of hundreds of different compounds. The water-soluble organics may also comprise emulsified liquid hydrocarbon product produced by the process. The water-soluble organics may according to an embodiment of the present invention comprise one or more components selected from 1. Ketones such as acetone, propanones, butanones, penthanones, penthenones, cyclopentanones such as 2,5 dimethyl cyclopentanone, cyclopentenones, hexanones and cyclohexanones such as 3-methyl hexanone, qionones etc.
2. Alcohols and polyalcohols such as methanol, ethanol, propane's (incl isopropanol), butanols, pentanols, hexanols, heptanols, octanols such as 2-butyl-1-octanol, hydroquinones, etc
3. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols
4. Carboxylic acids such as formic acid, acetic acid and phenolic acids like ferric acid, benzoic acids, coumarin acid, cinnamic acid, abietic acid, oleic acid, linoleic acid, palmetic acid, stearic acid
5. Furans such as tetrahydrofuran, etc
6. Alkanes, alkenenes, toluene, cumene, etc. and combinations thereof.

In general the water-soluble organics constitute a complex mixture of the above and the feed mixture may comprise such water-soluble organics in a concentration from about 1 wt % to about 10 wt % such as in the range from about 2 wt % to about 5 wt %. Further no individual component in the recycled water-soluble organics is generally in a concentration of more than corresponding to about 1 wt % in the feed slurry unless specific liquid organics compounds are added to the feed mixture in addition to the liquid hydrocarbons and water-soluble organics.

Typically the weight ratio of said recycled stream(-s) comprising liquid organic compounds relative to said input streams being introduced into said feed handling according to the present invention is in the range 0.01 to 5.0, such as in the range 0.1 to 2.0, preferably in the range 0.15 to 1.0 such as in the range 0.10 to 0.5, and even more preferably in the range 0.2-0.4. Besides introducing process advantages from a conversion point of view, the recovery and recycle of in situ produced liquid organic compounds to the pre-treatment 1 enables preparation of a feed mixture comprising homogeneous pumpable slurry or paste F from the input streams as received and/or preparation of a feed mixture comprising a pumpable slurry or paste having a higher dry matter content as no or less water and/or other solvent needs to be added to said pre-treatment 1. It has further been found that presence of said liquid organic compounds during said pre-treatment 1 introduces a stabilizing and/or dissolution effect that assists in homogenizing the feed mixture F e.g. by decreasing the viscosity of said feed mixture at a given dry solid content and temperature or allows for operation at a higher maximum particle size and/or at higher dry matter contents and thereby results in an overall more economical and effective process e.g. less parasitic energy losses and more oil produced.

The presence of the liquid organic compounds in the feed mixture has multifunctional effects and benefits including:

Liquid organic compounds in the pre-treatment/feed slurry preparation act as stabilizers and/or dispersants assisting in homogenizing the feed mixture e.g. decreasing sedimentation/precipitation and thereby allowing production of pumpable feed mixtures with a higher dry matter content thereby a higher output of liquid hydrocarbons from a given plant design is obtained;

Liquid organic compounds produced by the process assists in softening the lignocellulosic e.g. by improving wetting and/or dissolving part of the lignocellulosic material thereby a more homogeneous and pumpable feed slurry at high dry matter contents is obtained i.e. a more energy efficient and economical process is provided;

Liquid organic compounds in the form of water-soluble organics assists in homogenizing the feed slurry by solvolysis, which is believed to result in a softening/dissolution/pulping of the lignocellulosic structure at a lower temperature and thereby improving the rheological properties of the feed mixture e.g by lowering the viscosity and/or increasing the dry matter content i.e a more energy efficient and economical process is provided;

Liquid organic compounds in the form of oxygen containing species (both the oil and the water-soluble organics) introduce a parallel dissolution mechanism that enhances the conversion to desired products. The oxygen containing species are more similar to the lignocellulosic material and therefore have a stronger affinity to the material and are further believed to be more powerful solvents for such material (one can imagine the rule "like dissolves like").

The presence of liquid organic compounds in the feed mixture reduces the energy required to heat the feed mixture to the desired reaction temperature due to a lower heat capacity compared to water. For example, at a pressure in the range 300 to 320 bar and a temperature of about 400° C., the amount of energy required to heat the feed mixture to the desired reaction temperature is about 30-40% lower than for water, thereby a more energy efficient and economical process is provided.

The substantial recovery and recycling of the water-soluble organics results in higher yields than prior art processes. By recirculation of the water-soluble organics the concentration in water phase reaches a steady state where little or no further water-soluble organics are formed and the energy contained in the water-soluble organics is redistributed between the oil and gas product i.e. thereby a more efficient and economical process is provided.

Liquid organic compounds in the form of water-soluble organics increase the in situ production of hydrogen; thereby a more efficient and economical process is provided.

Liquid organic compounds act as radical scavengers suppressing polymerization reactions such as tar and char formation and may also be involved in the conversion process as a reactant, thereby a higher quality product, a more stable, efficient and economical process is obtained.

Depending on the concentration of the homogeneous catalysts such as potassium and/or sodium in the input stream(-s) makeup catalysts may also be introduced to adjust the homogeneous catalyst concentration to the concentration according to the present invention. The homogeneous catalyst concentration in the form of potassium and/or sodium may according to the present invention be at least about 0.5% by weight of the input stream such as at least 1.0% by weight. Preferably the homogeneous catalyst concentration in the form of potassium and/or sodium may according to the present invention be at least about 1.5% by weight such as at least 2.0%. More preferably the concentration of the homogeneous catalyst in the form of potassium and/or sodium may according to the present invention be at least about 2.5% by weight such as at least 3.0% by weight. Even more preferably the homogeneous catalyst concentration in the form of potassium and/or sodium according to the present invention be at least about 3.5% by weight such as at least 4.0% by weight.

A major part of said homogeneous catalyst in the form of potassium and/or sodium is according to an advantageous embodiment of the present invention recovered from the process water phase simultaneously with said water-soluble organics described above and introduced into the feed mixture together with the process water phase containing water-soluble organics and water.

Said homogeneous catalyst might according to a preferred embodiment of the present invention be added as a salt or be dissolved in a liquid e.g. water. Often said make-up catalyst(s) according to the present invention will be in an alkaline form such as in a hydroxide or carbonate form, and may besides make up of the homogeneous catalyst concentration further serve as a pH adjustment of the feed mixture so as to obtain a pH of at least 7 during or after said conversion, preferably a pH in the range 8-12 and more preferably a pH in the range 8-11.

In many embodiments according to the present invention, the pH of the feed mixture during and/or after said conversion of carbonaceous material contained in said feed mixture is controlled by measuring the pH during and/or after said conversion and adjusting the pH in said feed handling by addition of make-up catalyst and/or alternatively adding another base to the feed handling.

Carbonaceous materials are in the present context used as raw material(-s) for production of an oxygen containing renewable crude oil according to the present invention are generally renewable materials such as plant materials such as biomass. The carbonaceous material may be in a solid form or may have a solid appearance, but may also be in the form of a sludge or a liquid. Further, the raw material(-s) may be contained in one or more input streams.

Non limiting examples of carbonaceous feedstock according to the present invention include biomass such as woody biomass and residues such as wood chips, sawdust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyanobacteria; animal beddings and manures such as the fibre fraction from livestock production; municipal and industrial waste streams such as black liquor, paper sludges, off-specification fibres from paper production; residues and byproducts from food production such as juice or wine production; vegetable oil production, sorted municipal solid waste, source sorted house wastes, restaurant wastes, slaughterhouse waste, sewage sludge and combinations thereof.

Many carbonaceous materials according to the present invention are related to lignocellulosic materials such as woody biomass and agricultural residues. Such carbonaceous materials generally comprise lignin, cellulose, and hemicellulose.

An embodiment of the present invention includes a carbonaceous material having a lignin content in the range 1.0 to 60 wt. % such as lignin content in the range 10 to 55 wt. %. Preferably the lignin content of the carbonaceous material is in the range 15 to 40 wt. % such as 20-40 wt. %.

The cellulose content of the carbonaceous material is preferably in the range 10 to 60 wt. % such as cellulose content in the range 15 to 45 wt. %. Preferably the cellulose content of the carbonaceous material is in the range 20 to 40 wt. % such as 30-40 wt. %.

The hemicellulose content of the carbonaceous material is preferably in the range 10 to 60 wt. % such as cellulose content in the range 15 to 45 wt. %. Preferably the cellulose content of the carbonaceous material is in the range 20 to 40 wt. % such as 30-40 wt. %.

The pre-treatment 1 may according to a preferred embodiment of the present invention further comprise providing a feed mixture with a particle size of maximum 30 mm such as a particle size of maximum 15 mm, preferably said feed mixture provided has a particle size of maximum 5 mm such as a particle size of maximum 2 mm, more preferably the maximum particle size in said feed mixture is in the range 0.01 to 1.5 mm such as 0.1 to 1.0 mm. Said providing may comprise controlling the maximum particle size of the input materials e.g. by dividing said input materials by a sieving operation and/or one or more crushing and/or grinding and/or milling and/or cutting operations (not shown) and/or by dividing said feed mixture before being withdrawn from said pre-treatment to the pressurization step.

The pre-treatment 1 according to a preferred embodiment according to the present invention further comprises means for thoroughly mixing and transforming said input stream(-s) and fluid streams into a homogeneous slurry or paste. Said mixer might according to the present invention be a stirred vessel equipped with means for efficiently mixing and homogenizing viscous materials such as a planetary mixer, Kneader or Banbury mixer. Other preferred means for thoroughly mixing and homogenizing said input and fluid streams to a feed mixture according to the present invention include inline mixers. Such inline mixers may further introduce a cutting and/or scissoring and/or self-cleaning action. The mixer is preferably further equipped with means for heating said feed mixture to a temperature in the range 80 to 250° C., preferably in the range 130 to 200° C. and more preferably in the range 150 to 180° C. at sufficient pressure to avoid boiling such as a pressure in the range 1-30 bar, preferably in the range 5-20 bar. Preferred means for heating said feed mixture during the pre-treatment according to the present invention include a heating jacket (not shown). In a preferred embodiment the heat for preheating said feed mixture in the pre-treatment 1 is obtained from the cooling of the converted carbonaceous material comprising liquid hydrocarbon product e.g. by heat exchange with this process stream. Hereby the energy efficiency of the process may be further enhanced.

According a preferred embodiment of the present invention, the mixer may further be equipped with a recirculation loop, where material is withdrawn from said mixer and at least partly recirculated in an internal or external loop and re-introduced into said pre-treatment so as to control the residence time in said pre-treatment or feed handling to a predefined time.

Said external loop may further comprise one or more size reduction and/or homogenization device(-s) such as a macerator and/or a colloidal mill and/or a cone mill or a combination thereof. Preferred residence times in said pre-treatment step 1 are according to the present invention in the range 1 minute to 24 hours such as in the range 5 minutes to 12 hours. Preferably the residence time is in the range 5 minutes to 6 hours, more preferably in the range 5 minutes to 3 hours such as in the range 10 minutes to 2 hours.

Typically, the dry matter content according to the present invention is in the range 15 to 70% by weight, preferably in the range 20 to 60% and more preferably in the range 25 to 50% by weight.

The process according to the present invention requires water to be present in said feed mixture. Typically, the water content in said feed mixture is at least 30% by weight in the range 30 to 80% by weight and preferably in the range 40 to 60%.

The process according to the invention may further comprise introducing a texturing agent to the feed mixture, where the texturing agent serves the purpose of preventing the feed mixture from separating and maintaining the feed mixture homogeneous and pumpable. Further the texturing agent should possess the capability of being converted or degraded during the process. The texturing agent is according to an aspect of the present invention being adapted to stabilize the feed mixture to prevent separation and further to maintain the feed mixture as a homogeneous mixture during a pressurization and where the texturing agent is adapted to be converted or degraded during the hydrocarbon production process, where the texturing agent is chosen among the following: A pulp produced from part of the carbonaceous material being processed, microalgae, peat, vinasse, molasses, glycerine such as crude glycerine from biodiesel production, palm oil manufacturers effluent ("POME"), tall oil, black liquor from paper production, hydrocolloids, polysaccharides, carboxymethylcellulose (CMC), methylcellulose, hydroxypropyl methylcellulose, microcrystalline cellulose (MCC), nanocrystalline cellulose (NCC), polyanionic cellulose (PAC), pectin, hydrocolloids such saccharides such as carrageenan, pullulan, konjac and alginate, agar-agar, cassia gum, gellan gum, guar gum, locust bean gum and xanthan gum and combinations thereof.

In a preferred embodiment, according to the present invention, the texturing agent comprises a cellulosic material or a derivative of a cellulosic material such as where the texturing agent is selected from carboxymethyl cellulose (CMC), methylcellulose, hydroxypropyl methylcellulose, microcrystalline cellulose, nanocrystalline cellulose, polyanionic cellulose and combination thereof.

The texturing agent comprising such cellulosic materials may according to an aspect of the present invention be added in a concentration of 0.01 to 10% by weight of the incoming feed stream, preferably in the range 0.02-5% by weight, more preferably 0.05 to 2 by weight, most preferably in the range 0.1 to 1% by weight.

A particularly preferred texturing according to many aspects of the present invention is where the texturing agent is carboxymethyl cellulose having a molecular weight in the range 10000 to 1000000, preferably in the range 50000 to 750000, and where the degree of polymerization is in the range 100 to 5000, and the degree of substitution is in the range 0.5-1.5, preferably in the range 0.60-1.0.

In an advantageous embodiment the texturing agent added to said feed mixture in the pre-treatment is produced by pulping part of the carbonaceous material being processed in said step of providing an oxygen containing oil. Hence, an advantageous embodiment of the present invention is where the texturing agent is produced by a process for preparing a feed mixture for use in a process for producing hydrocarbon, comprising:

a. Producing a texturing agent in the form of pulp by
 i. Providing at least one feedstock of carbonaceous material;
 ii. Providing a desired water content;
 iii. Providing a desired content of homogeneous catalyst in the form of a compound of potassium and/or sodium;
 iv. Providing a desired content of liquid hydrocarbon product
 v. Providing a desired amount of water-soluble organics
 vi. Mixing the ingredients i. to v.;
 vii. Adjusting the pH of the mixture to a pH in the range 10-14, preferably in the range 11-12.5 by addition of base;
 viii. Heating said pH adjusted mixture to a temperature in the range 150-230° C. under stirring to produce a texturing agent in the form of a pulp;
b. Providing at least one feedstock of carbonaceous material;
c. Providing a desired amount of water;
d. Providing a desired content of homogeneous catalyst in the form of a compound of potassium and/or sodium;
e. Providing a desired content of liquid organic product
f. Providing a desired amount of water-soluble organics
g. Mixing the ingredients a) to f) for a time sufficient to provide a homogeneous feed mixture.

The mechanical and/or thermal and/or chemical pulping of the input materials obtained in the pre-treatment 1 according to a preferred embodiment of the present invention enables the production of a homogeneous pumpable feed mixture premixed with additives for performing a process according to the present invention and having a high dry matter content at a viscosity processable by a process according to the present invention. The feed mixture according to the present invention results in a more effective and economical process than in the prior art e.g. less parasitic energy losses, higher oil yields, increased capacity, higher on-stream factor and/or higher quality of the oil.

2. Conversion

The feed mixture is being withdrawn from said pre-treatment and transferred to the pressurization step a. The pre-pressurization pump of the pressurization step is preferably a positive displacement pump such as a progressive cavity pump, lobe pump, rotary gear pump, auger pump or screw pump. According to the present invention said pressurization to the desired reaction pressure is essentially performed before heating from entry temperature from the pre-treatment 1 to the reaction temperature is initiated. Suitable pumps for said pressurization according to the present invention include rotary lobe pumps in a series arrangement, piston pumps, hose diaphragm piston pumps.

The pressurization is preferably performed prior to heating and the feed mixture is generally pressurized to a sufficiently high pressure to maintain the feed mixture and/or converted feed mixture in a liquid and/or supercritical state during said heating and conversion i.e. the feed mixture is pressurized to a pressure of at least the boiling point and/or saturation pressure at the prevailing temperature in the process (and above the critical pressure at temperatures above the critical temperature).

Typically the feed mixture may be pressurized to an operating pressure during said heating and conversion of at least 150 bar such as 180 bar, preferably said operating pressure is at least 221 bar such as at least 250 bar and more preferably said operating pressure during conversion is at least 300 bar. Even more preferably the operating pressure is in the range of 300-400 bar such as in the range 300-350 bar.

The pressurized feed mixture is subsequently heated to a reaction temperature in the range 300 to 450° C. such as in the range 350 to 430° C., preferably in the range 370 to 430° C. such as in the range 390 to 430° C., more preferred in the range 400 to 420° C. such as in the range 405 to 415° C.

By maintaining the operating pressure above 300 bar such as above 320 bar, preferably in the range from about 300 bar to 400 bar such in the range 310 to 350 bar it is obtained that energy required to heat the feed mixture to the desired operating temperature is reduced. Further the combination of operating pressure and operating temperature results in a density of the feed mixture at the maximum temperature which are in the range 250-500 kg/m$^3$ such as in the range 300-450 kg/m$^3$. Preferably the density is in the range 350 to 450 kg/m$^3$ such as in the range 375-425 kg/m$^3$. Maintaining the operating pressure and operating temperature so as to obtain a density in this range results in a smaller reactor volume required to obtain a desired reaction time. Further important properties for the conversion such as the dielectric constant and ionic product of water are a unique function of the density and only indirectly of pressure and temperature.

According to a preferred embodiment of the present invention said heating is performed in one or more heat exchangers. Preferably said heating is at least partly performed by recovery of heat from one or more process streams. In the preferred embodiment shown in the figure, heat is recovered from the hot product stream, from the reaction zone c. and transferred to the pressurized feed mixture by direct heat exchange in the first heat exchanger (-s). Typically, the feed mixture is heated from entry temperature to a temperature in the 180-250° C. in the first heat exchanger, and to a temperature in the range 300-375° C. in the second heat exchanger. In an advantageous embodiment the heat recovery is performed by indirect heat exchange with a heat transfer medium such as superheated steam, supercritical water, hot oil or a molten salt. Particularly preferred heat transfer medium for indirect heat transfer according to the invention are supercritical water. By use of such heat transfer medium, it is obtained that both the feed mixture and the product mixture may flow inside tubes thereby allowing for easier cleaning and further the external heat can be supplied on a clean well defined fluid rather than the process fluid thereby enabling improved control of said heat addition.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

The heat exchangers may optionally be combined into one heat exchanger. However, as the properties of the feed mixture e.g. the viscosity changes significantly during said heating, it is typically preferred to divide said heating into two or more heat exchangers. This further has the advantage that different materials of construction may be used in the heat exchangers e.g. a lower alloyed material may be used in the first heat exchanger. Further according to a preferred embodiment of the present invention said heat exchangers are designed to provide a relatively high heating rate in the temperature range up to 300° C. or thereabout. Typically, the heating rate in the range from 140 to 300° C. is at least 50° C./min, preferably 75° C./min, more preferred 100° C./min and even more preferred 150° C./min. In combination with the characteristics of the feed mixture according to the present invention it is hereby obtained that undesired side reactions to char and tar are minimized, and that the yield of desired liquid hydrocarbon product is maximized.

The feed mixture is further heated to reaction temperature in the heat exchanger. Said heater may be a fired heater e.g. a heater fuelled by e.g. natural gas, oil or other suitable fuel. Preferably said fired heater is at least partly fueled by a product produced by the process according to the present invention such as gas produced by the process as shown in the figure. Other potential products produced by the process for at least partly fuelling said fired heater may include char and liquid hydrocarbon product. By at least partly fuelling said fired heater by a product produced by the process the parasitic energy loss is reduced and the energy efficiency is increased. Hereby a process that uses less consumables are more economical, more energy efficient and have a smaller environmental and/or $CO_2$ footprint is obtained.

Alternative embodiments of the further heating to the reaction temperature according to the present invention include a fired heater with indirect heating e.g. where heat from the combustion fuel(-s) in said furnace or burner is first transferred to another heat transfer medium such as supercritical water, hot oil or molten salt before heat exchange with said partly heated feed stream.

In advantageous embodiment of the present invention the operating temperature for said conversion process are selected so as produce sufficient gas the process to be self-sustaining in energy i.e. the energy required in said fired heater is supplied by products produced by the process such as the process gas.

The flow velocity of the feed mixture and/or the product mixture is maintained at least at a level so as to avoid sedimentation of any particles in the feed- or product mixture. Hence, according to an advantageous embodiment of the present invention, the flow velocity of the feed mixture and/or the product mixture is maintained at a velocity of at least 0.1 m/s such as at least 0.2 m/s. Particularly the flow velocity of the feed mixture and/or the product mixture is maintained at a velocity of at least 0.4 m/s such as at least 0.6 m/s. Preferably the flow velocity of the feed mixture and/or the product mixture is maintained at a velocity of at least 0.8 m/s such as at least 1.0 m/s. Even more preferably the flow velocity of the feed mixture and/or the product mixture is maintained at a velocity of at least 1.0 m/s such as at least 1.5 m/s. Hereby a more efficient process with a higher on stream factor and/or more efficient heat transfer is obtained.

Subsequent to heating to reaction temperature said pressurized and heated feed mixture is maintained at the desired pressure and temperature in a reaction zone c. for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

The residence time in the reaction zone c. may be obtained in long tubular reactor(-s) or in shorter larger diameter reactor(-s). As the wall thickness of the reactor(-s) increases with the diameter of the reactor(-s) it is generally preferred to use reactor(-s) with diameters within standard high pressure tubes e.g. inner diameters of individual reactors up to about 0.8 m. Preferably the reactor(-s) is/are vertically oriented and the feed mixture is fed to the top of said reactor(-s) and flows in same direction as the gravity and withdrawn from the bottom. Preferably said conversion reactors further comprise a conically shaped inlet for introducing said feed mixture in the top and a conically shaped outlet for withdrawing said converted feed mixture in the bottom. In many embodiments said conically shaped inlet and outlet has an angle of the walls of said conically shaped inlet and/or outlet to the centerline of said reactor below 30° such as an angle of the walls of said conically shaped inlet and/or outlet to the centerline of said reactor below 25°. Advantageously said conically shaped inlet and outlet has an angle of the walls of said conically shaped inlet and/or outlet to the centerline of said reactor below 22.5° such as an angle of the walls of said conically shaped inlet and/or outlet to the centerline of said reactor below 20°.

Further the diameter of inlet and outlet of reactor c. to the maximum diameter of the reactor are preferably selected so as to obtain a minimum ratio of the maximum average velocity in inlet/outlet to the minimum average velocity in the reactor of at least 25, preferably the ratio of the maximum average velocity in the inlet/outlet to the minimum average velocity in the reactor are selected so as to obtain a ratio of velocities at least 50, more preferred the maximum average velocity in the inlet/outlet to the minimum average velocity in the reactor are selected so as to obtain a velocity ratio of at least 75 such as a velocity ratio of at least 100.

Hereby an advantageous reactor system is provided that is less sensitive to clogging due to sedimentation of suspended particles, and is more compact and economically attractive than in the prior art. Further the controlled decrease and increase of velocities in the inlet and outlet may allow for a more efficient use of the reactor volume.

A reaction zone c. according to the present invention advantageously comprises two or more reactors in a series and/or in a parallel arrangement. A particularly preferred embodiment is shown in further details in FIG. 4. The embodiment comprises a dividing manifold with shutoff valves after the pressurization pump where the feed mixture is divided and passes through two or more parallel heating steps, and further through two or more parallel conversion steps each may comprise two or more reactors in series, and further through one or more cooling steps before the converted feed mixture before the converted feed mixture is being reassembled in another manifold with shut off valves.

Hereby an efficient and economical process design comprising multiple reactor, heating and cooling trains are provided, which further has the advantage that the diameters of high pressure shells of the heat exchangers and the reactors don't get excessive big and the wall thicknesses can therefore be kept at a reasonable level. Further the manifolds and shut off valves are located in relative cold positions and allows for shut off of reactor lines without that the valve gets excessively expensive.

D. Cooling & Expanding

The outlet stream from the reactor c. comprising liquid hydrocarbon product from said converted carbonaceous material is subsequently cooled to a temperature in the range 150 to 300° C. such as in the range 200 to 250° C. by heat exchange with the incoming feed mixture in the heat exchangers. Said heat exchange with the incoming feed mixture may be performed by direct heat exchange between the incoming feed mixture and the outgoing product mixture comprising the hydrocarbon product. However, a preferred embodiment of the present invention is where said heat exchange is performed by indirect heat transfer via a heat transfer medium such as superheated steam, supercritical water, hot oil or molten salt. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process according to the present invention. The product mixture is often further cooled to a temperature in the range 60 to 250° C. in the heat exchanger before expanding said product mixture such as cooling to a temperature in the range 100 to 175° C. before expanding said product mixture. In particular, the product mixture is further cooled in a further cooler 10 to a temperature of 110 to 160° C. before expanding said product mixture, such as cooling to a temperature in the range 120 to 150° C. before expanding said product mixture.

During said cooling, the temperature and flow of the cooling medium are controlled so that the surface temperature of the heat transfer surface in contact with the product medium is maintained at a temperature above about 50° C. such as at a temperature above about 70° C. Preferably the surface temperature of the heat transfer surface in contact with the product medium is maintained at a temperature above about 80° C. such as at a temperature above about 90° C. Hereby fouling of the heat transfer surfaces in the cooler by high boiling compounds in said liquid hydrocarbon product is reduced.

Pressure let down of the product mixture may be performed in one or more expansion steps. Suitable means for pressure let-down include valves including control orifices, tubular elements, turbines and pumps operated in a reverse mode e.g. as a brake with or without recovery of the pressure energy.

3. Separation

The mixture from said expanding d containing liquid hydrocarbon product is subsequently lead to separation. Said separation may according to the present invention comprise means for separating gas from said mixture as shown in the figure. Said separation means may comprise a flash separator or degasser, wherein gas is withdrawn from the top. According to an embodiment of the present invention said gas may be used to produce heat for heating in the process to the process. The gas may optionally be cooled to condense compounds such as e.g. water prior to said use to produce heat for heating in the process.

A particularly preferred embodiment according to the present invention includes a system where the converted feed mixture/product mixture is first cooled to a temperature of 60 to 250° C., expanded to a pressure in the range from about 50 to about 150 bar such as in the range from about 60 to about 120 bar and led to a phase separator/degasser for separation of the product mixture into at least a gas phase and residual phase. Preferably the gas phase is first cooled to a temperature in the range 70 to about 200° C., expanded to a pressure in the range 60 to 110 bar such as in the range 70 to 100 bar and led to a phase separator/degasser for separation of the converted feed mixture/product mixture into at least a gas phase and a residual phase.

As further exemplified below, the gas phase often comprises carbon dioxide, hydrogen, carbon monoxide, methane, ethane, ethane, propane, iso-propane, butane, iso-butane, water, methanol, ethanol, acetone.

Figure 8:
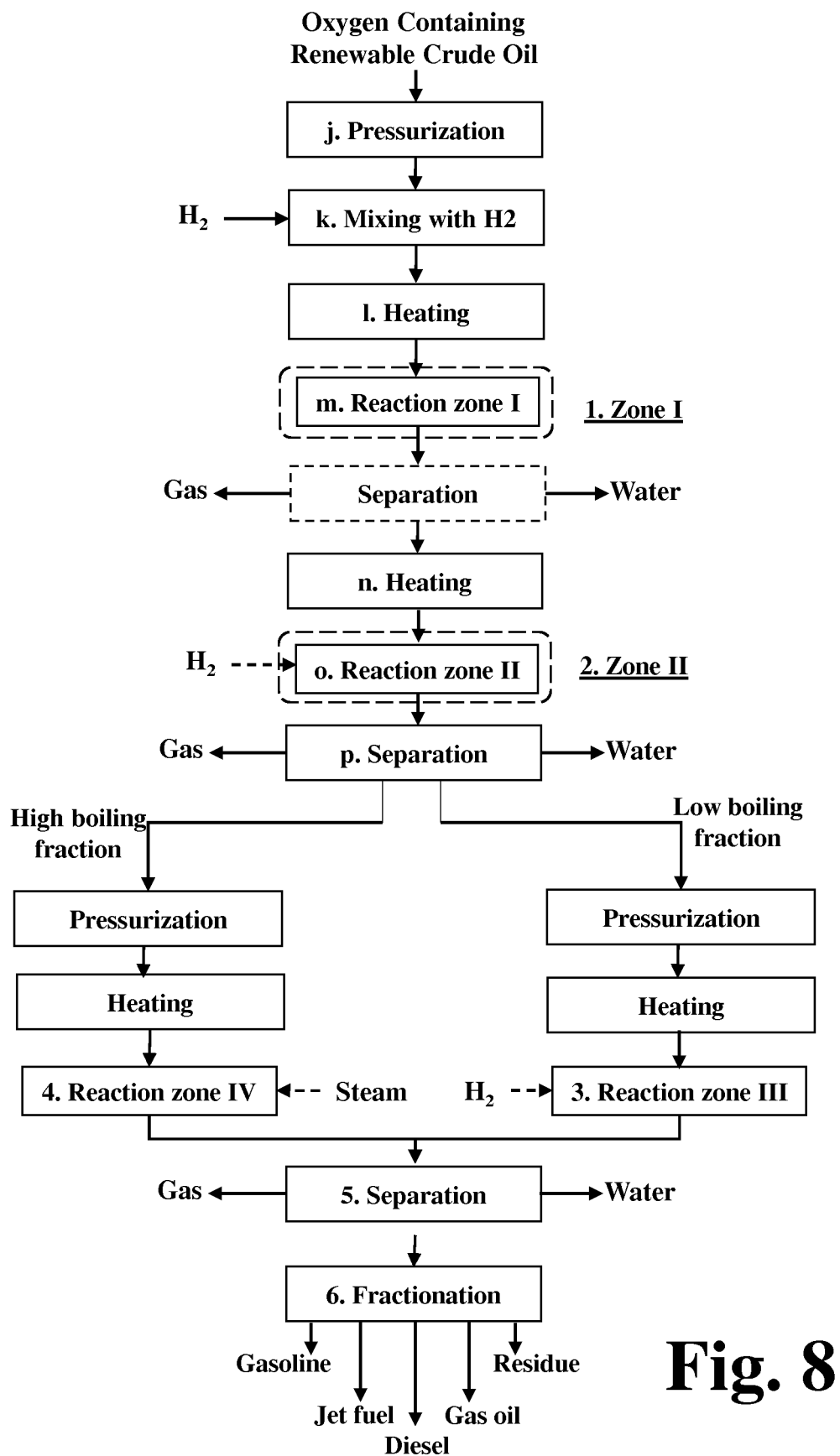
FIG. 8 shows an advantageous embodiment of the present invention where steam is added prior to the fourth reaction zone comprising catalytic steam conversion.

An advantageous embodiment of the present invention includes extracting/separating hydrogen from said separated gas phase and introducing it into said process for upgrading low sulphur, low oxygen containing renewable oil according to the present invention after the pressurization of the oil as further illustrated and discussed in relation to the FIG. 8.

One aspect of the present invention comprises extracting/separating hydrogen from the separated gas phase by a membrane gas separation technique. Another aspect of the present invention comprises extracting/separating hydrogen using a pressure swing adsorption technique. A further aspect of the present invention comprises extracting/separating hydrogen from said separated gas phase by the steps of:

Separating the converted feed mixture/product mixture into a gas phase and a residual phase Cooling the separated gas to a temperature in the range from about 31 to 50° C. and separating the cooled gas phase into a condensed phase substantially free of hydrogen and a residual gas phase enriched in hydrogen and carbon 15 dioxide in a phase separator, Further cooling the separated gas phase to a temperature in the range from about 10 up to about 31° C. and separating the cooled residual gas phase into a liquid phase comprising $CO_2$ and a residual gas phase enriched in hydrogen in a separator.

Introducing the hydrogen enriched gas in the upgrading process after the pressurization step.

The amount of hydrogen in said separated gas phase depends on the specific operating conditions for said conversion process according to the present invention such as operating pressure, operating temperature, concentration and type of liquid organic compounds, homogeneous catalyst(-s) type and concentration, pH, etc.

A preferred embodiment comprises selecting the operating conditions for said conversion process so as to produce a substantial part of the hydrogen required in the upgrading process according to the present invention.

Often the amount of hydrogen is produced in the step of providing the oxygen containing renewable crude oil and introduced into the process of upgrading comprises at least 20% of the hydrogen consumed in the upgrading process such as at least 25% of the hydrogen consumed in the upgrading process, preferably the hydrogen produced in the step of providing the oxygen containing renewable crude oil and introduced into the process of upgrading comprises at least 30% of the hydrogen consumed in the upgrading process such as at least 40% of the hydrogen consumed in the upgrading process, more preferably the hydrogen produced in the step of providing the oxygen containing renewable crude oil and introduced into the process of upgrading comprises at least 50% of the hydrogen consumed in the upgrading process such as at least 60% of the hydrogen consumed in the upgrading process. Even more preferably the hydrogen produced in the step of providing the oxygen containing renewable crude oil and introduced into the process of upgrading comprises at least 70% of the hydrogen consumed in the upgrading process such as at least 75% of the hydrogen consumed in the upgrading process.

The gas separating means may further provide at least a coarse separation of the degassed mixture into a liquid hydrocarbon rich stream and residual water rich stream e.g. by gravimetric separation in a 3-phase separator.

The water rich stream comprising water-soluble organics suspended particles and dissolved salts may be at least partly withdrawn from said gravimetric separator, and fed to a recovery unit, optionally after further separation by gravimetric means filtering and/or centrifugation (not shown) to remove suspended particles.

The degassed mixture or optionally the liquid hydrocarbon rich stream, is withdrawn from said gas separating means, and may be further separated e.g. the liquid hydrocarbon rich stream may be required to be efficiently dehydrated and/or desalted/deashed before being introduced into the upgrading part of the process according to the present invention as the oxygen containing renewable crude oil.

In many aspects of the present invention said further separation comprises one or more gravimetric separation step(-s) optionally equipped with means for coalescing oil or water droplets such as one or more electrostatic coalescing steps. In other aspects of the present invention said further separation may include separation in one or more centrifugation step(-s) such as separation in one or more 3-phase centrifuges such as one or more high speed disc bowl centrifuges and/or one or more decanter centrifuges.

Often the operating temperature of the further separation is selected so as to obtain a dynamic viscosity of the liquid hydrocarbon product in the range from about 1 to about 30 centipoises during said further separation such as in the range from about 1 to about 25 centipoises during said further separation, preferably the temperature of the separation is selected so as to obtain a dynamic viscosity in the range from about 1 to about 20 centipoises such as in the range 5 to 15 centipoise.

The operating temperature of said further separation may according to an embodiment of the present invention be in the range 80 to 250° C. such as in the range 100 to 175° C., preferably at least the first of said further separation is operating at a temperature in the range 110 to 160° C. such as a temperature in the range 120-150° C.

The operating pressure of said further separation may according to an aspect of the present invention be in the range 1 to 100 bar, such as in the range 2-74 bar, preferably said further separation is operating at a pressure in the range 15 to 50 bar, such as in the range 15-35 bar.

Many aspects of the present invention relates to the use of one or more phase separators, where the residence time in each of the phase separators is in the range 1-60 minutes such as in the range 1 to 30 minutes, preferably the residence time in each of the separators are in the range 2 to 20 minutes.

In a further aspect of the present invention a viscosity reducing agent may be added to the converted feed mixture before and/or during the further separation. The viscosity reducing agent may often be an organic solvent having a boiling point below 200° C. such as below 150° C., preferably below 140° C. such as below 130° C.

The weight ratio of the viscosity reducing agent added to the amount of oxygen containing renewable oil may according to many embodiments of the present invention be in the range 0.01 to 2 such as in the range 0.05 to 1, preferably the weight ratio of the viscosity reducing agent added to the amount of oxygen containing renewable oil is in the range 0.1 to 0.5 such as in the range 0.1 to 0.4. More preferably the weight ratio of the viscosity reducing agent added to the amount of oxygen containing renewable oil is in the range 0.2 to 0.4 such as in the range 0.2 to 0.35.

A particularly preferred embodiment is where the viscosity reducing agent comprises at least one ketone such as Methyl Ethyl Ketone (MEK) and/or 2-heptanone and/or 2,5 dimethyl-cyclo-pentanone or a combination thereof. In a further preferred embodiment the viscosity reducing agent comprise or further comprises toluene.

Advantageously the viscosity reducing agent comprises a fraction of the oxygen containing renewable crude oil and is recovered downstream of said further separation step and prior to providing the oxygen containing renewable crude oil to said upgrading step. The viscosity reducing agent according to the present invention may have multiple functions e.g. the viscosity reducing agent may besides reducing the viscosity of the oil act as de-emulsifying agent or assist in the dehydration and/or de-ashing of the oil.

According to a preferred embodiment of the present invention the viscosity reducing agent is recovered in an evaporation step operating at a temperature in the range 100-200° C. such as in the range 100-160° C., preferably the viscosity reducing agent is recovered in an evaporation step operating at a temperature in the range 100-150° C. such as in the range 100-130° C.

A particular preferred embodiment of the present invention is where the viscosity reducing agent is substantially recovered in one or more flash distillation step(-s) producing an oxygen containing renewable crude oil phase and a distillate phase, and where the flash temperature is in the range 100-200° C. such as in the range 100-160° C., preferably the viscosity reducing agent is recovered in the flash distillation step producing an containing crude oil phase and a distillate phase, where the flash temperature is in the range 100-150° C. such as in the range 100-130° C.

A washing agent comprising water may according to another aspect of the present invention be added to the liquid hydrocarbon product before or during said further phase separation step in order to further control the salt/ash content of said oxygen containing renewable crude oil before being introduced to the upgrading step according to the present invention. The washing agent comprising water may according to the present invention be introduced in several steps.

The weight ratio of the washing agent comprising water to the low suphur oxygen containing renewable oil may advantageously be in the range 0.05 to 5.0 such as a weight ratio of the washing agent comprising water to the low suphur oxygen containing renewable oil is in the range 0.05 to 3.0, preferably the of the washing agent comprising water to the low suphur oxygen containing renewable oil is in the range 0.1 to 2.0 such as a weight ratio in the range 0.1-1.0.

The washing agent comprising water may according to an embodiment further comprise an acidification agent such as acetic acid or citric acid or $CO_2$. A particularly preferred acidification agent is $CO_2$, and advantageously said $CO_2$ is obtained by contacting the gas from the degassing The acidification agent may be added so as to obtain a pH of the water phase after separation of the washing agent comprising water in the range 2 to 7 such as a pH in the range 2.5 to 6.5, preferably the acidification agent is added so as to obtain a pH of the water phase after separation of the washing agent comprising water in the range 2.75 to 6 such as a pH in the range 3 to 5.5.

The further separation may according to an embodiment of the present invention further comprise one or more filtration step(-s) of the liquid hydrocarbon product. The filtration step may according to some preferred aspects of the present invention comprise the first step of the further separation and/or the filtration step may be the final step before introducing the oxygen containing renewable crude oil to the upgrading process according to the present invention.

5. Recovery

The water phases from the gas separating means, and further separation means are fed to a recovery device, where liquid organic compounds in the form of water-soluble organics and/or homogeneous catalysts are recovered in a concentrated form, and recycled to into the pre-treatment device 1. As mentioned above under 1. Pre-treatment the water-soluble organics present in said water phase comprise a complex mixture of hundreds of different compounds including one or more compounds of ketones, alcohols and polyalcohols, phenols and alkylated phenols, carboxylic acids, furans, alkanes, alkenes, toluene, cumene, etc.

Preferably said recovery device, comprises one or more evaporation and or distillation step(-s), wherein water is evaporated from said combined water phases, and thereby providing a distillate and a concentrate. The degree of concentration is selected so as to provide a distillate amount that corresponds to the amount of water added to the carbonaceous material, homogeneous catalyst and makeup base in the pre-treatment. Typically, the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention, the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator and/or distillation step. The heat for said preheating is preferably provided by heat recovery from a process stream and/or from the outgoing distillate stream before entering into the evaporator. In the evaporator, water is evaporated from said mixture comprising water-soluble organics and dissolved salts at a temperature from about 100 to about 115° C. In these cases, the heat recovery from said process stream may be performed via a heat transfer medium such as a hot oil or steam e.g. transferring heat from the cooling of the product stream.

The pH of the combined water phase entering the recovery is according to the present invention preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step according to the present invention is where the recovery step comprises one or more flash step(-s).

A preferred embodiment of said recovery step according to the present invention is where the recovery step comprises evaporation in two or more steps operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer an absorber, where the evaporated fraction is contacted with an absorbent. Said absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled in a cooler to a temperature suitable for discharge. Hereby, it is obtained that said evaporator and/or distillation column and/or beside recovering said liquid organic compounds and/or homogenous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber such as activated carbon and/or a coalescing step and/or a membrane system such as reverse osmosis and/or a nanofiltration step and/or an ultrafiltration step and/or a pervaporation step and/or a biological treatment system such as a bioreactor.

A further preferred embodiment of the invention is where the recovery unit comprises one or more distillation columns or strippers, where a first distillation column or stripper provides a first fraction being enriched in compounds having a boiling point lower than water and water, and being depleted in compounds having a such as being substantially free of components having a boiling point higher than water ("the distillate"), and a second fraction being depleted in compounds having a boiling point lower than water and being enriched in components having a boiling point higher than water ("the concentrate"). The "distillate" enters a second distillation column where it is separated into a fraction enriched in compounds having a boiling point lower than water and a fraction and a fraction comprising a water phase that can be discharged to recipient.

The fraction being concentrated with compounds having a boiling point lower than water may according to a preferred embodiment be mixed with the concentrate from said evaporator, and recycled to the pre-treatment step 1.

In many applications according to the present invention a bleed or purge stream is withdrawn from said concentrated water phase prior to recycling to the pre-treatment step 1 to prevent build up of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of the concentrated water phase from the recovery unit such as up to about 15% by weight of the concentrated water phase from the recovery unit. More preferably the bleed stream comprises up to about 10% by weight of the concentrated water phase from the recovery unit such as up to about 5% by weight of the concentrated water phase from the recovery unit. The bleed stream may be disposed off. However, in many applications according to the present invention, the bleed stream is further treated.

The concentrated water phase from the recovery unit typically has a positive heating value.

A preferred application according to the present invention comprises further treating the bleed stream by combustion and/or co-combustion in a boiler or incinerator. Optionally the bleed stream is further concentrated prior to said combustion and/or co-combustion.

A particularly preferred embodiment of the present invention comprises further treating the bleed stream in an ion exchange step. The concentrated water phase from the recovery unit may be filtered to remove eventual solids prior to entering said ion exchange step according to the present invention.

The ion exchange step may according to a preferred embodiment of the present invention comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An advantageous embodiment of the present invention comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may according to an embodiment of the present invention be performed by a backflow or backflushing of the ion exchange bed(-s) by demineralized water such as distillate water from the recovery unit. The present invention includes a valve arrangement and/or control system allowing for such cleaning or regeneration by backflow or back flush with demineralized water.

Typically, the chloride removal in said ion exchange step according to the present invention is at least 50% of the chlorides in the concentrated water phase entering said ion exchange step such as a chloride removal of at least 60%. In many embodiments according to the present invention the chloride removal in said ion exchange step according to the present invention is at least 70% of the chlorides in the concentrated water phase entering said ion exchange step such as at least 80%. The chloride depleted stream from said chloride ion exchange step is preferably recycled to said pre-treatment step 1.

Further, in many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst (-s) in the form of potassium and/or sodium such as being retained in said chloride depleted outlet stream from said chloride ion exchange step is at least 90% by weight of the amount entering said chloride ion exchange step such as at least 95% by weight. Hereby, less make up homogeneous catalyst is required to be added in the pre-treatment step 1, and a more economical process is obtained for providing said oxygen containing renewable crude oil to the upgrading process according to the present invention, and thereby an overall more efficient and economical process is obtained.

4. Upgrading

The oxygen containing renewable crude oil enters the upgrading part of the process according to the present invention.

Figure 4:
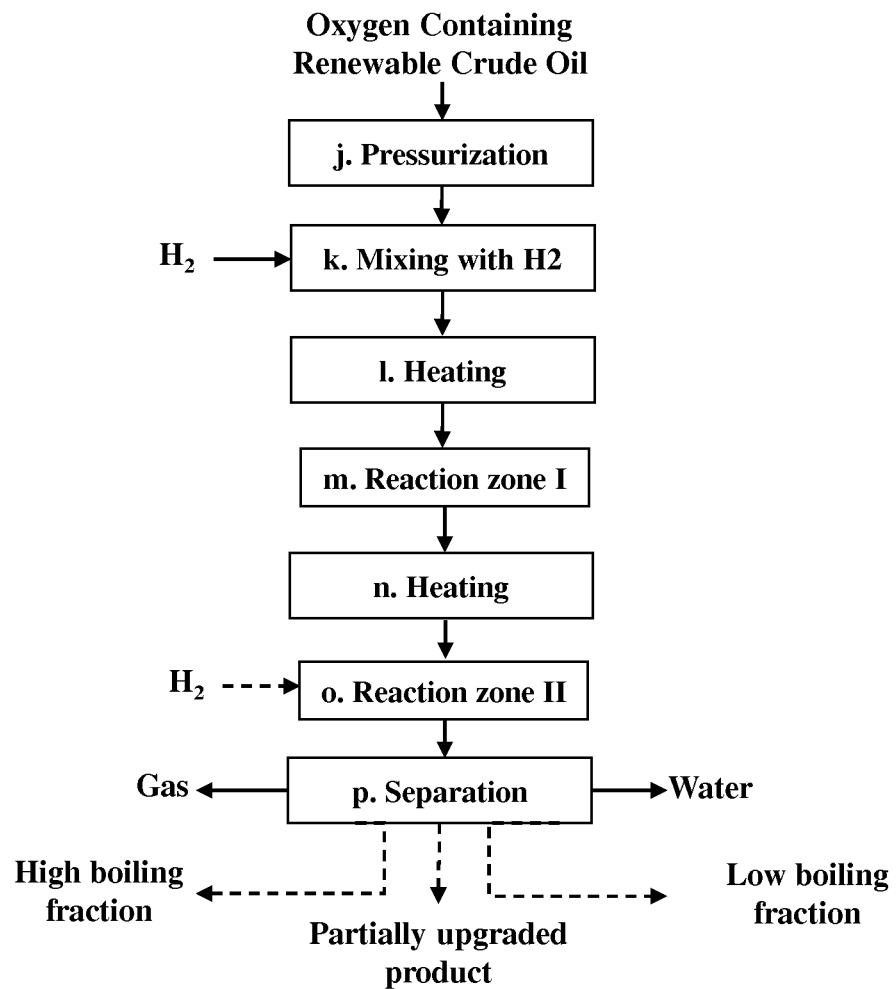
FIG. 4 shows an embodiment of an upgrading process according to the present invention comprising two reaction zones, followed by a separation step

FIG. 4 shows an embodiment of an upgrading process according to the present invention having at least two reaction zones. The oxygen containing renewable crude oil is first pressurized to a pressure in the range from about 60 bar to about 200 bar in the pressurization step j such as a pressure in the range from about 80 bar to about 180 bar. Preferably, the oxygen containing renewable crude oil is pressurized to a pressure in the range from about 80 bar to about 150 bar in the pressurization step j such as a pressure in the range from about 100 bar to about 140 bar after said pressurization step j.

The sulphur content of the oxygen containing renewable crude oil or the feed being pressurized may according to the present invention be less than 2.0 wt % such as below 1.0 wt. %. In some applications the sulphur content of the oxygen containing renewable crude oil or the feed being pressurized may be less than 0.5 wt % such as a sulphur content of less than 0.05 wt %.

The oxygen content of the oxygen containing renewable crude oil may according to the present invention have an oxygen content in the range from about 3 wt. % to about 20 wt. % such as an oxygen content in the range from about 3 wt. % to about 17 wt. %. Often the oxygen content is in the range from about 4 wt. % to about 15 wt. % such as an oxygen content in the range from about 5 wt. % to about 12 wt. %.

Hydrogen is according to an advantageous embodiment of the invention added and mixed with the oxygen containing renewable crude oil after pressurization and prior to heating and entry into the first reaction zone. The presence of hydrogen during said heating reduce fouling of heat exchangers during said heating.

The partial pressure of hydrogen at the inlet of the first reactor may according to an embodiment of the present invention be in the range 60 to 200 bar such as in the range 80 to 150 bar, preferably the partial pressure of hydrogen at the inlet of the of the first reactor is in the range 80 to 140 bar such as in the range 100 to 120 bar.

The hydrogen is added in excess of the stoichiometric amount of hydrogen required for the upgrading process, where the amount of hydrogen added and mixed with the oxygen containing renewable oil is up to 10 times higher than the amount of hydrogen consumed by the upgrading process such as up to 5 times higher than the amount of hydrogen consumed by the upgrading process, preferably the the amount of hydrogen added and mixed with the oxygen containing renewable oil is the range 1.5 to 5 times higher than the amount of hydrogen consumed by the upgrading process such as in the range 2 to 5 times higher than the amount of hydrogen consumed by the upgrading process.

The pressurized gas stream comprising hydrogen is according to a preferred embodiment of the present invention at least partly produced by the process e.g. in the step of providing said oxygen containing renewable crude oil as described in relation to FIG. 8.

The pressurized oxygen containing renewable crude oil is according to an embodiment of the present invention subsequently heated to achieve an operating temperature of reaction zone 1 from about 260° C. to about 350° C., such as an operating temperature of reaction zone in the range from about 270° C. to about 345° C. before entering the first reaction zone. Preferably, the oxygen containing renewable crude oil is subsequently heated to achieve an operating temperature of reaction zone 1 from about 280° C. to about 330° C., such as in the range from about 300° C. to about 310° C.

The operating temperature of the first reaction zone depends on the specific catalyst(-s) and hydrogen pressure used in the first reaction zone. The lower limit of the operating temperature of the first reaction zone is generally selected for the desired reactions to proceed with a reasonable rate without depleting the hydrogen on the surface, which may lead to coking, whereas the upper limit is selected so as to avoid excessive coking.

Heating of the oxygen containing renewable crude oil to achieve the operating temperature may be supplied by heating the pressurized renewable crude oil in an external heat exchanger. However, in many advantageous embodiments of the present invention at least part of the heat required to reach the operating temperature in reaction zone 1 is provided in the reactors e.g by the exothermic reactions in the reactor(-s).

Heating to the desired reaction temperature at the inlet of reaction zone 1 may be performed in one or more heat exchangers. Advantageously at least part of the heat used for said heating is recovered from other parts of the process such as from cooling of the upgraded oil and/or from the step of providing the oxygen containing renewable crude oil being upgraded. The heat recovery may be performed by direct heat exchange between the hot upgraded oil and the cold incoming oxygen containing crude oil to be upgraded. However, a preferred embodiment comprises recovery of heat by indirect heat exchange using one or more heat transfer media such as hot oil, molten salt or steam or a combination thereof as heat transfer media to transfer heat from a hot stream to a colder stream.

In addition to said heating by heat recovery, the oxygen containing renewable crude oil may be further heated to the desired temperature at the inlet of reaction zone 1. Said heating may according to an embodiment of the present invention be performed in a fired heater e.g. fueled by e.g. natural gas, LPG, oil, or other suitable fuel. Preferably said further heater is at least partly fueled by one or more byproducts produced by the process according to the present invention such as a combustible gas and/or oil such as a high boiling fraction of the oil. By at least partly fueling said fired heater by a by-product produced by the process the parasitic energy loss is reduced and the overall energy efficiency increased. Hereby a process that uses less consumables, is more economical, and has a smaller environmental and/or a lower carbon footprint is obtained.

The oxygen containing renewable crude oil heated to the desired temperature at the inlet of reaction zone 1, enters reaction zone 1 where it is contacted with at least one heterogeneous catalyst. Said reaction zone 1 may be divided into one or more reactors, each containing one or more catalyst(-s).

Preferred forms of the heterogeneous catalyst(-s) according to many aspects of the present invention include heterogeneous catalyst(-s) on a sulphided form, reduced form and/or in a carbide form and/or in a carbonate and/or in a nitride form and/or in a phosphide form and/or in a phosphate and/or in a boride form and/or in a borate form and/or in a oxide form and/or in a hydroxide form and/or in a sulphate form or a combination thereof.

A preferred embodiment of the invention is where the heterogeneous catalyst in the first reaction zone and/or second reaction zone comprises one or more elements selected from the group of Fe, Ni, Co, Mo, Cr, W, Ce, Ru, Rh, Pd, Pt, V, Cu, Au, Zr, Ti, B, Bi, Nb, Na, K supported on a supporting structure.

A further preferred embodiment of the invention is where the heterogeneous catalyst(-s) in the first reaction zone and/or second reaction zone according to the present invention is/are a bi-metallic or tri-metallic catalyst supported on a supporting structure.

An advantageous embodiment of the invention is where the bi-metallic or tri-metallic heterogeneous catalyst(-s) and/or catalyst elements in the first reaction zone and/or second reaction zone comprises
a. one or two metals selected from group VIIIB of the periodic table such as one or two metals selected from the group of Fe, Co, Ni, Ru supported on a supporting structure, and
b. one or more elements selected from group VIB of the periodic table such as one or two metals selected from the group of Cr, Mo, W
c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

In a preferred embodiment according to the present invention the heterogeneous catalyst in the first reaction zone may further comprise one or more elements selected from Ce, Ti, Zr, B, Bi, Cu, Na, K, Mg.

It is generally preferred that acidity of said supporting structure is low to moderate in order to minimize undesired reactions such coke formation and/or polymerization reactions. In some applications of the present invention the number of acidic sites on the catalyst support may be reduced by reacting the acidic sites with a suitable base such as sodium hydroxide or potassium hydroxide prior to drying.

Advantageous embodiments of the present invention include supporting structures comprising Ce. It has been found the Ce reduces coke formation and enables higher loadings of active catalyst elements.

Particularly preferred support for used in said first reaction zone according to the present invention include alumina such as γ-alumina or δ-alumina, silica, stabilized alumina, silicate and alumosilicate such as MCM-41, silicoaluminophosphates (SAPO), aerogirine, ceria, zirconia, titania, activated carbon and hydrotalcite supports and combinations thereof.

Further, some of the compounds of the oxygen containing renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the support structure for the heterogeneous catalyst has few micropores with pore size less than 20 Angstrom, a large amount of mesopores in the range 20 to 500 Angstrom and some macropores with a pore size larger than 500 Angstrom.

A preferred embodiment of the present invention comprises a support structure for the heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a support structure for the heterogeneous catalyst having a BET surface as measured by $N_2$ adsorption at 77K in the range 20 to about 500 $m^2/g$ such as in the range 20 to 250 $m^2/g$, preferably the support has a surface area (BET) in the range in the range 30 to 150 $m^2/g$ such as in the range 40 to 120 $m^2/g$, even more preferably the support has a surface area (BET) in the range 60 to 120 $m^2/g$ such as in the range 60 to 100 $m^2/g$.

The pore density of the support structure for the heterogeneous catalyst in as measured by $N_2$ adsorption at 77K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

The heterogeneous catalyst(-s) in the first and the second reaction zone may according to many aspects of the invention comprise substantially the same heterogeneous catalyst (-s) operating a different operating conditions (e.g. different temperature and/or pressure). However, in many aspects of invention the heterogeneous catalysts in the first and second reaction zone comprise different heterogeneous catalysts.

The temperature, pressure, catalyst and liquid hourly space velocity of the first reaction zone is often selected so as to substantially reduce the oxygen content of the oxygen containing renewable oil, while reducing other parameters such as the amount of residue (e.g. compounds having a boiling point above 550° C., the boiling point curve and/or the total acid number (TAN) and/or the viscosity and/or the density and/or the amount of unsaturated compounds such as olefins and/or the amount of aromatics, while avoiding turning too much of the lower boiling compounds into an undesired gas products that reduces the yield of desired liquid hydrocarbon products such as upgraded hydrocarbons having a boiling point in the jet fuel and diesel range.

The partially upgraded oil produced from said first reaction zone contains lower oxygen than the crude oxygen containing renewable crude oil e.g. an oxygen content below 4.0 wt. % after said first reaction zone such as an oxygen content below 3.0 wt. %. Often the oxygen content of the partially upgraded oil after said first reaction zone is below 2.5 wt. % such as below 2.0 wt. %. In certain applications, the oxygen content of the partially upgraded oil after said first reaction zone is below 2.0 wt. % such as below 1.5 wt. %. In some advantageous embodiments, the oxygen content of the partially upgraded oil after the first reaction zone is below 1.0 wt. % such as below 0.5 wt. %.

The partially upgraded oil produced from said first reaction zone contains lower sulphur than the crude oxygen containing renewable crude oil e.g. a sulphur content below 0.5 wt. % after said first reaction zone such as a sulphur content below 0.25 wt. %. Often the sulphur content of the partially upgraded oil after said first reaction zone is below 0.1 wt. % such as below 0.05 wt. %. In some advantageous embodiments, the sulphur content of the partially upgraded oil after the first reaction zone is below 0.025 wt. % such as below 0.01 wt %.

The partially upgraded oil produced from said first reaction zone has lower TAN than the crude oxygen containing renewable crude oil e.g. a TAN below 50 mg KOH/g oil after said first reaction zone such as a TAN below 25 mg KOH/g oil. Often the TAN of the partially upgraded oil after said first reaction zone is below 10 mg KOH/g oil such as below 5 mg KOH/g oil. In some advantageous embodiments, the TAN of the partially upgraded oil after the first reaction zone is below 1 mg KOH/g oil such as 0.1 mg KOH/g oil.

The partially upgraded oil produced from said first reaction zone has lower dynamic viscosity than the crude oxygen containing renewable crude oil e.g. a dynamic viscosity (at 40° C.) below 1000 cP after said first reaction zone such as a dynamic viscosity (at 40° C.) below 100 cP. In some advantageous embodiments, the dynamic viscosity (at 40° C.) of the partially upgraded oil after the first reaction zone is below 50 cP.

The partially upgraded oil produced from said first reaction zone has lower density than the crude oxygen containing renewable crude oil e.g. a density (at 15° C.) below 1050 kg/m$^3$ after said first reaction zone such as a density (at 15° C.) below 1000 kg/m$^3$. In some advantageous embodiments the density (at 15° C.) of the partially upgraded oil after the first reaction zone is in the range 0.85 to 1000 kg/m$^3$ such as in the range 0.90 to 0.95 kg/m$^3$.

The partially upgraded oil produced from said first reaction zone has higher energy content than the crude oxygen containing renewable crude oil e.g. a High Heating Value (HHV) on a dry ash free basis above 38 MJ/kg after said first reaction zone such as an HHV above 40 MJ/kg. In some advantageous embodiments, the HHV of the partially upgraded oil on a dry ash free basis after the first reaction zone is above 41 MJ/kg such as above 42 MJ/kg. In some advantageous embodiments, the HHV of the partially upgraded oil after the first reaction zone is above 44 MJ/kg such as above 46 MJ/kg.

The partially upgraded oil produced from said first reaction zone has higher hydrogen to carbon ratio (H/C) than the crude oxygen containing renewable crude oil e.g. a H/C above 1.3 after said first reaction zone such as a H/C above 1.4. In some advantageous embodiments, the H/C of the partially upgraded oil after the first reaction zone is above 1.45 such as above 1.5. In certain advantageous embodiments, the H/C of the partially upgraded oil after the first reaction zone is above 1.65 such as above 1.7.

The effluent from the first reaction zone comprises a partially upgraded oil as well as gas and water. As further shown in FIG. 4, the partially upgraded oil may be separated from the gas and water prior to entering the second reaction zone. This preferred embodiment substantially reduces the partial pressure of water in the second reaction zone, thereby improving conversion and lifespan of the catalyst in said second reaction zone.

Figure 6:
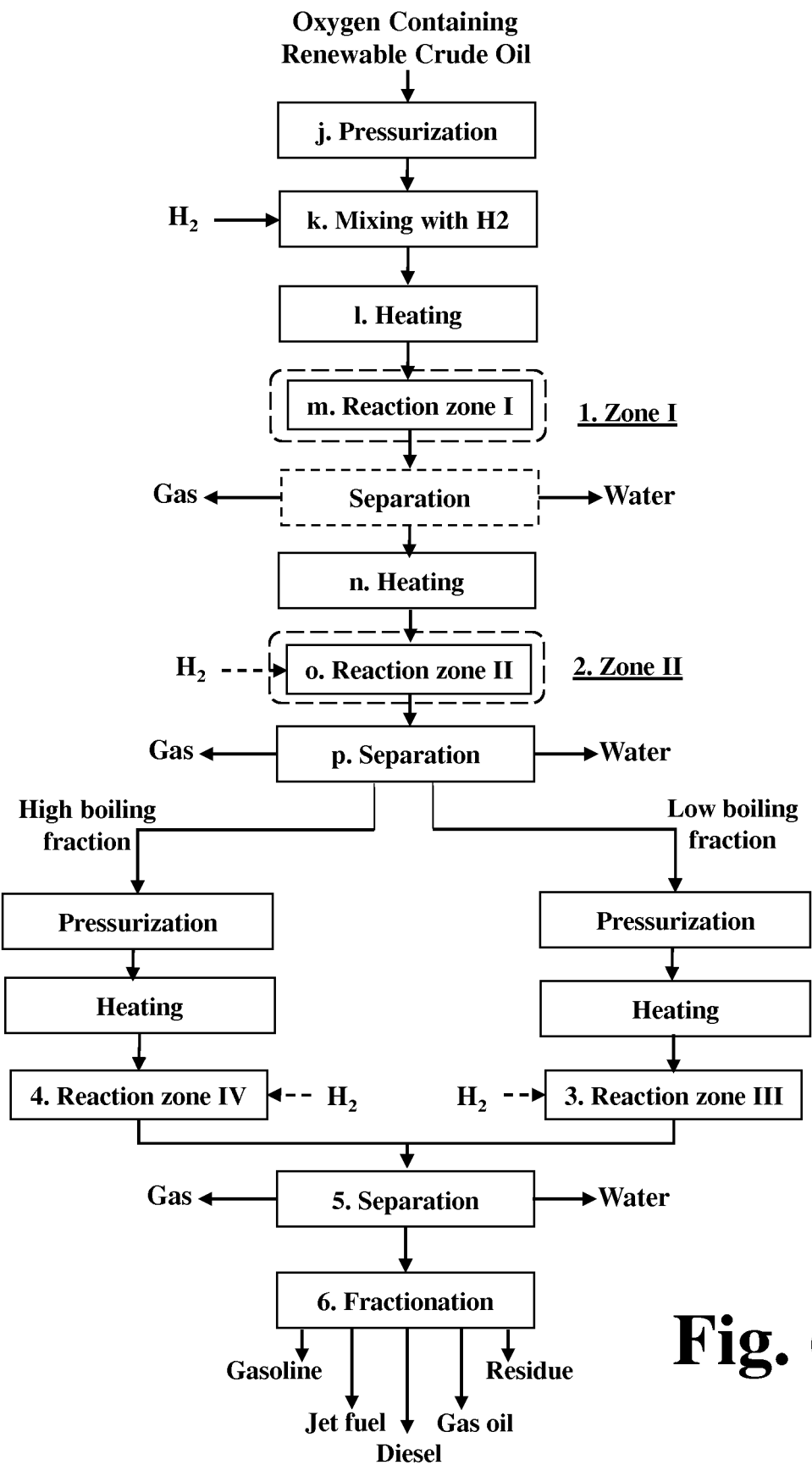
FIG. 6 shows a preferred embodiment of the present invention where partially upgraded oil is separated into a low boiling and high boiling fraction after the second reaction zone and further reacted separately in the third and fourth reaction zones, respectively.
Figure 7:
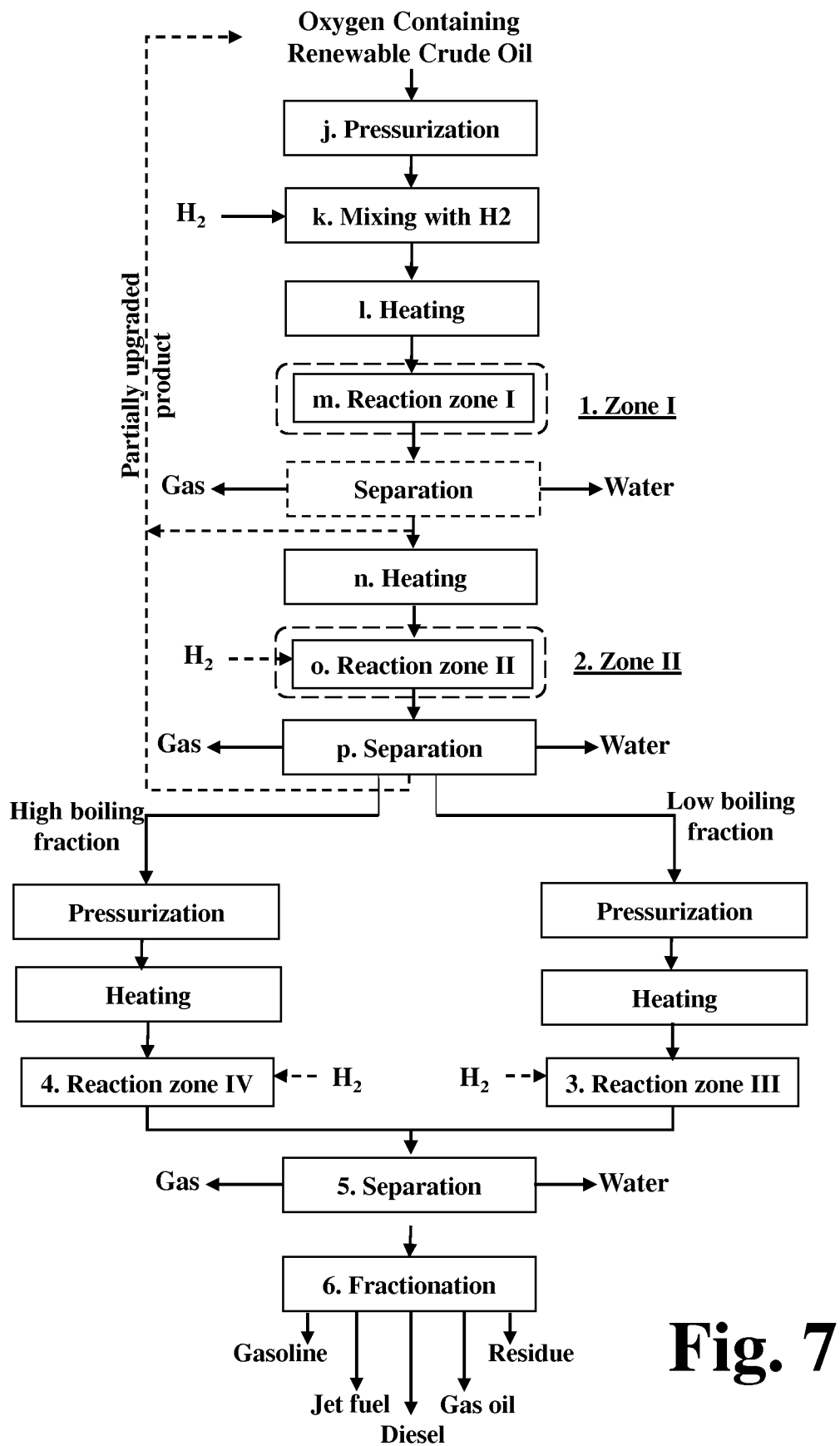
FIG. 7 shows a preferred embodiment of the present invention where a fraction of the partially upgraded product is mixed with the oxygen containing renewable crude oil from the providing step, before pressurization, heating and reacting in the first reaction zone.

In another preferred embodiment of the present invention, as further illustrated in FIG. 6, a fraction of the partially upgraded oil product from said separation after the first reaction zone may be recycled and mixed with the oxygen containing renewable crude oil before pressurization.

Second Reaction Zone

In many aspects of the invention, the catalyst(-s) and process conditions in the second reaction zone is selected so as to perform further deoxygenation and hydrogenation reactions such as de-aromatization by saturation of aromatics and/or saturation of double bonds of the partially upgraded oxygen containing renewable crude oil from the first reaction zone. Hereby the density of the renewable oil is also significantly reduced.

The catalyst(-s) in the second reaction zone may comprise one or more heterogeneous catalyst(-s) and may in many applications of the invention be substantially the same as used in said first reaction zone, but operating at a higher temperature to obtain improved kinetics for deoxygenation and hydrogenation reactions.

Hence, a preferred embodiment of the invention is where the operating temperature of the second reaction zone is selected to be higher than in the first reaction zone and the product effluent from the first reaction zone is heated in a heat exchanger before entering the second reaction zone. Advantageously the operating temperature of the second reaction zone is controlled to be in the range 350-420° C., such as an operating temperature in the range 350-400° C. such as in the range 360-390° C.

Advantageous embodiments include further adding and mixing hydrogen with the oxygen containing renewable oil between the first reaction zone and the second reaction zone.

The liquid hourly space velocity in said second reaction zone may according to an embodiment of the present invention be in the range 0.1 to 1.5 hours$^{-1}$ such as in the range 0.1 to 1.0 hours$^{-1}$, preferably the liquid hourly space velocity in said second reaction zone is in the range 0.2 to 0.8 hours$^{-1}$ such as in the range 0.2 to 0.5 hours$^{-1}$.

The weight based space velocity in said second reaction zone may according to an embodiment of the present invention be in the range in the range 0.1 to 1.5 hours$^{-1}$ such as in the range 0.1 to 1.0 hours$^{-1}$, preferably the liquid hourly space velocity in said second reaction zone is in the range 0.2 to 0.8 hours$^{-1}$ such as in the range 0.2 to 0.5 hours$^{-1}$.

The operating pressure in the second reaction zone may be at least 60 bar such as an operating pressure in the second reaction zone of at least 80 bar; Preferably the operating pressure in the second reaction zone is at least 100 bar such as an operating pressure in the second reaction zone of at least 120 bar;

Further according to a preferred embodiment of the invention the operating pressure in the second reaction zone may be below 200 bar such as an operating pressure in the second reaction zone below 180 bar; Preferably the operating pressure of the second reaction zone is below 160 bar such as below 140 bar.

The amount of hydrogen consumed by the upgrading process may correspond to 0.01 to 10.0 wt. % of the renewable oil such as 0.05 to 8.0 wt. %, preferably the amount of hydrogen consumed by the upgrading process corresponds to 0.5 to 5.0 wt. % of the renewable oil such as 1.0 to 4.5 wt. %. Even more preferably the amount of hydrogen consumed by the upgrading process corresponds to 2.0 to 4.0 wt. % of the renewable oil such as 2.5 to 3.5 wt. %.

The hydrogen is in many embodiments added in excess of the stoichiometric amount of hydrogen required for the upgrading process. Hence, the amount of hydrogen added and mixed with the oxygen containing renewable oil is often up to 10 times higher than the amount of hydrogen consumed by the upgrading process such as up to 5 times higher than the amount of hydrogen consumed by the upgrading process, preferably the amount of hydrogen added and mixed with the oxygen containing renewable oil is the range 1.5 to 5 times higher than the amount of hydrogen consumed by the upgrading process such as in the range 2 to 5 higher than the amount of hydrogen consumed by the upgrading process.

The heterogeneous catalyst(-s) in the first reaction and/or second reaction zone may be in any known form or shape such as in the form of tablets, cylinders, hollow cylinders extrudates, powder, beads, monolithic structure or a combination thereof.

The heterogeneous catalyst(-s) in the first reaction and/or second zone may be contained in one or more fixed beds, one or more ebullated beds, one or more slurry beds or a combination thereof.

A preferred embodiment according to the present invention comprises one or more fixed beds, where each of the reactors is fed from the top.

The effluent from the second reaction zone comprises a partially upgraded oil as well as gas and water.

Figure 5:
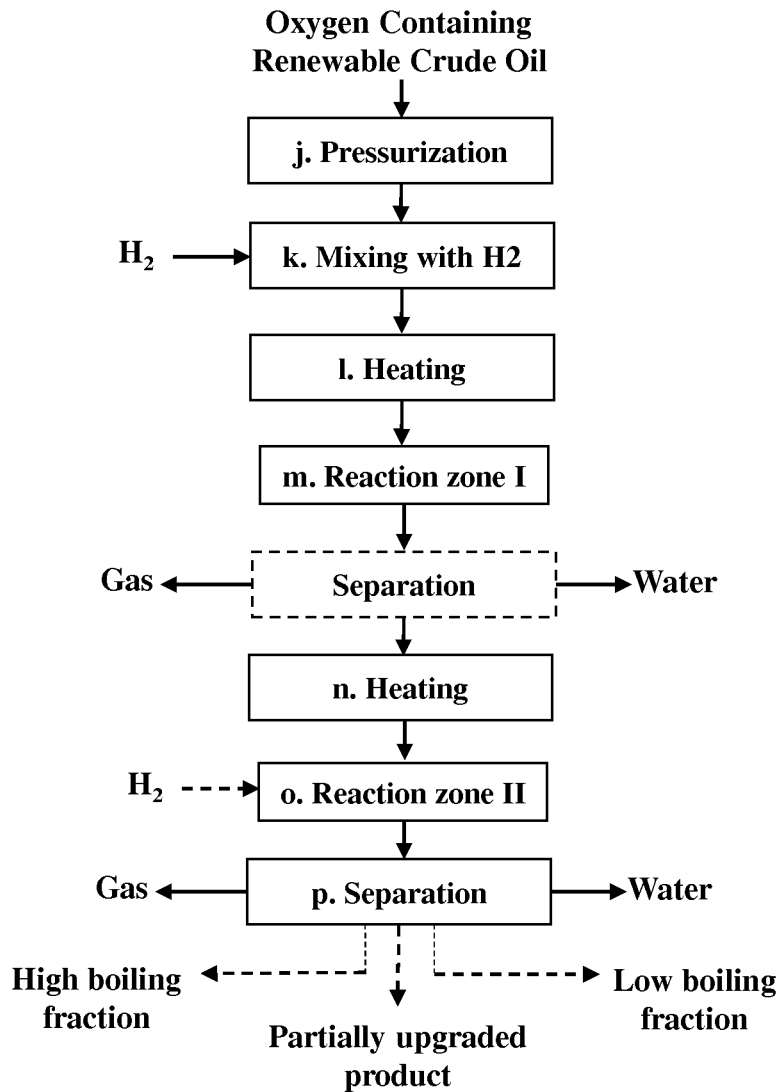
FIG. 5 shows an embodiment of an upgrading process according to the present invention with separation of water and gas from partially upgraded oil after the first reaction zone prior to entering the second reaction zone.

FIG. 5 shows how the present invention further comprises separation of the reaction products from said second reaction zone into one or more oil fraction(-s), a water fraction and gas fraction. Often said oil is separated into at least one partially upgraded low boiling oil fraction and at least one partially upgraded high boiling oil fraction. In a preferred embodiment of the present invention the separation may comprise two or more separation steps such as a first flash separation step, separating the product from said second reaction zone into a partially upgraded heavy oil stream and a phase comprising partial upgraded light oil, gas and water, a where the partial upgraded light oil, gas and water are separated in a second separation step such as a flash and/or gravimetric phase separator.

The cut point of said separation may according to certain preferred embodiments be selected so as to produce a partial upgraded light oil fraction having a boiling point of up to 280° C. such as a boiling point up to 300° C. Preferably, said partial upgraded light fraction has a boiling point of up to 320° C. such as up to 350° C. A preferred embodiment of the present invention include where said separating comprises one or more flash separation step(-s).

In certain embodiments of the present invention, a part of the partially upgraded oil product from said separation after the second reaction zone is recycled and mixed with the oxygen containing renewable crude oil before pressurization. This embodiment is illustrated in FIG. 6.

FIG. 6 shows a preferred embodiment of the present invention, where the low boiling fraction and high boiling fractions of the partially upgraded product of said second reaction zone is further treated in a third and fourth reaction zone respectively. Advantageously at least the partially upgraded low boiling fraction is further treated in said third reaction zone according to the present invention. In another advantageous embodiment said partially upgraded high boiling fraction is further treated in a fourth reaction zone. Reaction zone 3 and reaction zone 4 are often in one or more separate reactors in parallel and often at different operating conditions and/or using a different heterogeneous catalyst.

Third Reaction Zone

In many aspects of the invention, the catalyst(-s) and process conditions in the third reaction zone is selected so as to perform hydrogenation and isomerisation reactions such as de-aromatization by saturation of aromatics and/or saturation of double bonds of the partially upgraded low boiling oil fraction. Hereby the density and cetane characteristics of the partially upgraded low boiling oil fraction is also significantly reduced.

In a preferred embodiment of the invention the operating temperature of the third reaction zone is controlled to be less than 420° C., such as less than 410° C. Preferably the operating temperature of the third reaction zone is below 390° C., such as below 380° C. A preferred embodiment comprises an operating temperature of the third reaction zone in the range 350-420° C., such as an operating temperature in the range 350-410° C. such as in the range 350-390° C.

Advantageous embodiments include further adding and mixing hydrogen with the partially upgraded renewable oil before entering the third reaction zone. In some embodiments, the hydrogen is added in the third reaction zone.

The liquid hourly space velocity in said third reaction zone may according to an embodiment of the present invention be in the range 0.1 to 1.5 hours$^{-1}$ such as in the range 0.1 to 1.0 hours$^{-1}$, preferably the liquid hourly space velocity in said third reaction zone is in the range 0.2 to 0.8 hours$^{-1}$ such as in the range 0.2 to 0.5 hours$^{-1}$.

The weight based space velocity in said third reaction zone may according to an embodiment of the present invention be in the range in the range 0.1 to 1.5 hours$^{-1}$ such as in the range 0.1 to 1.0 hours$^{-1}$, preferably the liquid hourly space velocity in said third reaction zone is in the range 0.2 to 0.8 hours$^{-1}$ such as in the range 0.2 to 0.5 hours$^{-1}$.

The operating pressure in the third reaction zone may be at least 20 bar such as an operating pressure in the third reaction zone of at least 50 bar; Preferably the operating pressure in the third reaction zone is at least 60 bar such as an operating pressure in the third reaction zone of at least 80 bar; Advantageously the operating pressure of the third reaction zone is at least 100 bar such as an operating pressure of at least 110 bar.

Further according to a preferred embodiment of the invention the operating pressure in the third reaction zone may be below 200 bar such as an operating pressure in the third reaction zone below 180 bar; Preferably the operating pressure of the third reaction zone is below 150 bar such as below 120 bar.

The effluent from the third reaction zone comprises an upgraded low boiling oil fraction as well as gas. In certain embodiments of the present invention the effluent from the third reaction zone also comprises water. As shown in FIG. 5 the present invention may further comprise separation of the reaction products from said third reaction zone into one or more oil fraction(-s), a gas fraction and optionally a water fraction.

Fourth Reaction Zone

In many aspects of the invention, the catalyst(-s) and process conditions in the fourth reaction zone is selected so as to perform hydrocracking and boiling point reduction of the partially upgraded high boiling oil fraction. Hereby the amount of residue and density of the partially upgraded high boiling fraction is significantly reduced and the amount of middle distillate range fuel products can be maximised.

Said hydrocracking may be performed using heterogeneous catalyst(-s) similar to the heterogeneous catalyst(-s) used in reaction zone 1 and 2, but typically at more severe conditions e.g. higher hydrogen pressure or higher operating temperature than used in reaction zones 1-3.

In a preferred embodiment of the invention the operating temperature of the fourth reaction zone is controlled to be less than 420° C., such as less than 410° C. Preferably the operating temperature of the fourth reaction zone is below 400° C., such as below 390° C. A preferred embodiment comprises an operating temperature of the fourth reaction zone in the range 380-420° C., such as an operating temperature in the range 380-400° C.

Advantageous embodiments include further adding and mixing hydrogen with the partially upgraded renewable oil before entering the fourth reaction zone. In some embodiments, the hydrogen is added in the fourth reaction zone.

The liquid hourly space velocity in said fourth reaction zone may according to an embodiment of the present invention be in the range 0.1 to 1.5 hours$^{-1}$ such as in the range 0.1 to 1.0 hours$^{-1}$, preferably the liquid hourly space velocity in said fourth reaction zone is in the range 0.2 to 0.8 hours$^{-1}$ such as in the range 0.2 to 0.5 hours$^{-1}$.

The weight based space velocity in said fourth reaction zone may according to an embodiment of the present invention be in the range in the range 0.1 to 1.5 hours$^{-1}$ such as in the range 0.1 to 1.0 hours$^{-1}$, preferably the liquid hourly space velocity in said fourth reaction zone is in the range 0.2 to 0.5 hours$^{-1}$ such as in the range 0.3 to 0.5 hours$^{-1}$.

The operating pressure in the fourth reaction zone may be at least 20 bar such as an operating pressure in the fourth reaction zone of at least 30 bar; Preferably the operating pressure in the fourth reaction zone is at least 40 bar such as an operating pressure in the fourth reaction zone of at least 60 bar;

Further according to a preferred embodiment of the invention the operating pressure in the fourth reaction zone may be below 180 bar such as an operating pressure in the fourth reaction zone below 160 bar; Preferably the operating pressure of the fourth reaction zone is below 140 bar such as below 120 bar.

The effluent from the fourth reaction zone comprises an upgraded high boiling oil fraction as well as gas and water. The present invention further comprises separation of the reaction products from said fourth reaction zone into one or more oil fraction(-s), a gas fraction and optionally a water fraction. In an advantageous embodiment of the invention said oil is separated into at least one upgraded light oil fraction and at least one upgraded heavy oil fraction. In certain embodiments of the present invention, said upgraded light oil fraction from the fourth reaction zone is recycled and mixed with the partially upgraded low boiling oil fraction before pressurization, heating and reacting in the third reaction zone.

In yet another preferred embodiment said upgraded heavy oil fraction may comprise renewable blend stock for blending in a marine fuel or as an interim product for production of lubricants, specialty oils such as transformer oils and/or fine chemicals such as bio-aromatics and/or precursors for bio-plastics.

Said separation of third and fourth reaction zone products are often operated in parallel, but the third and fourth reaction zone products may in certain embodiments be combined and separated together.

Preferred embodiments of the present invention comprise fractionation of the upgraded renewable oil product(s) into naphtha range hydrocarbons, kerosene range hydrocarbons, diesel range hydrocarbons and heavy hydrocarbons with a boiling point higher than 350° C. or a combination thereof. In certain embodiments said fractionation is performed by a combination of flash tanks and distillations columns. In a preferred embodiment of the present invention, the upgraded low boiling fraction of the third reaction zone is fractionated. Yet in another advantageous embodiment of the present invention, the upgraded oil products that is fractionated comprise both the upgraded low boiling oil fraction of the third reaction zone and the upgraded high boiling oil fraction of the fourth reaction zone.

FIG. 8 shows another advantageous embodiment of the present invention where the fourth reaction zone comprises a reactor containing a heterogeneous catalyst with a water splitting functionality for performing a catalytic steam conversion and/or catalytic steam cracking of said partly upgraded renewable oil. The catalytic steam conversion and/or catalytic steam cracking use steam as source of hydrogen, and generates excess hydrogen which may be recovered, compressed and recycled to the first and/or second and/or third reaction zone after separation from the upgraded renewable high boiling oil fraction. The embodiment has the further advantage of operating at lower pressure compared to conventional hydrocracking.

Said advantageous embodiment of the present invention further comprises addition of water to the partially upgraded high boiling oil fraction prior to the pressurization step at the inlet of the reaction zone 4 or injecting steam into said oil after said pressurization or heating.

The amount of water or steam added or mixed with the partially upgraded high boiling oil fraction is often in the range 5.0 to 35% by weight, such as in the range 5.0 to 30% by weight of the partially upgraded high boiling oil fraction, preferably the amount of water or steam added or mixed with the partially upgraded high boiling oil fraction is in the range 5.0 to 25% by weight, such as in the range 5.0 to 20% by weight of the partially upgraded high boiling oil fraction. Even more preferably the amount of water or steam added or mixed with the partially upgraded high boiling oil fraction is in the range 5.0 to 15% by weight of the partially upgraded high boiling oil fraction such as in the range 5.0 to 10% by weight of the partially upgraded high boiling oil fraction.

The heterogeneous catalyst for performing a catalytic steam conversion and/or catalytic steam cracking of said partly upgraded high boiling oil fraction in the fourth reaction zone is according to a particularly preferred embodiment of the present invention a bimetallic or trimetallic catalyst supported on a supporting structure, and where said catalyst and/or catalyst elements comprises a. One or two transition metals selected from the group VIIIB of the periodic table of elements such as one or two metals selected from Fe, Co, Ni, Ru, Rh, Pd, Os, Ir, Pt.

b. One or more catalyst(-s) or catalyst(-s) selected from the group VIB of the periodic table of elements such as an element selected from Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

A further preferred embodiment of the heterogeneous catalyst for performing a catalytic steam conversion and/or catalytic steam cracking in the fourth reaction zone according to the present invention, is where said heterogeneous catalyst in the fourth reaction zone further comprises one or more elements selected from the group of Ce, Ti; Zr, B, Ga, Cu, B, Bi, Na, K, Mg.

According to many embodiments of the present invention said one or more elements or further elements may be present in a concentration from about to about such a concentration of said element in the range 1.0 wt % to about 25.0 wt % such as a concentration of said further catalyst element(s) is in the range from about 2.0 wt % to about 25.0 wt %. Preferably, said element or further element(-s) is present in the range from about 5 wt % to about 20 wt % such as in the range from about 10 wt % to about 20 wt %.

In other embodiments according to the present invention, the concentration of said one or more elements or further element(-s) may be in the range from about 0.5 wt % to about 10 wt % such as in the range from about 1.0 to about 7.0 wt %. Preferably, said further element(-s) is in the range from about 1.5 wt % to about 5 wt %.

Advantageously said supporting oxide or hydroxide structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mo and/or Mn and/or Cr and/or Al and/or Fe and/or Ce or a combination thereof.

A particularly preferred embodiment according to the present invention is where said heterogeneous catalyst and/or supporting structure has the empirical formula $M(II)_6M(III)_2(OH)_{16} \cdot CO_3 \cdot 4H_2O$, where M(II) is a divalent metal ion comprising one or two elements selected from the group of Mg, Ca, Ni, Co, Cu, Mn, Zn, Fe and M(III) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16} \cdot CO_3 \cdot 4H_2O$, where x: 1.0-2.0, y: 4.0-5.0, z: 0.0-1.0, w: 0.0-1.0, q: 1.0-2.0 such as $Mg_{4.3} Ni_{1.70} CeAl(OH)_{16} \cdot CO_3 \cdot 4H_2O$.

A further preferred embodiment according to the invention is where the heterogeneous catalyst of the supporting structure comprises $Mg_{4.3} Ni_{1.70} CeAl(OH)_{16} \cdot CO_3 \cdot 4H_2O$.

According to a preferred embodiment said bimetallic or trimetallic catalyst is on a sulphide, carbide, phosphide, phosphate form, nitride, boride form, oxide form, hydroxide form and/or carbonate form or a combination of these.

The operating temperature of the fourth reaction zone for performing a catalytic steam conversion and/or catalytic steam cracking according to the invention is in many applications of the present invention in the range 300° C. to 410° C., such as in the range 320° C. to 410° C.; preferably the temperature at the inlet of said further catalytic reactor is in the range 350° C. to 400° C., such as in the range 360° C. to 390° C.

Figure 9:
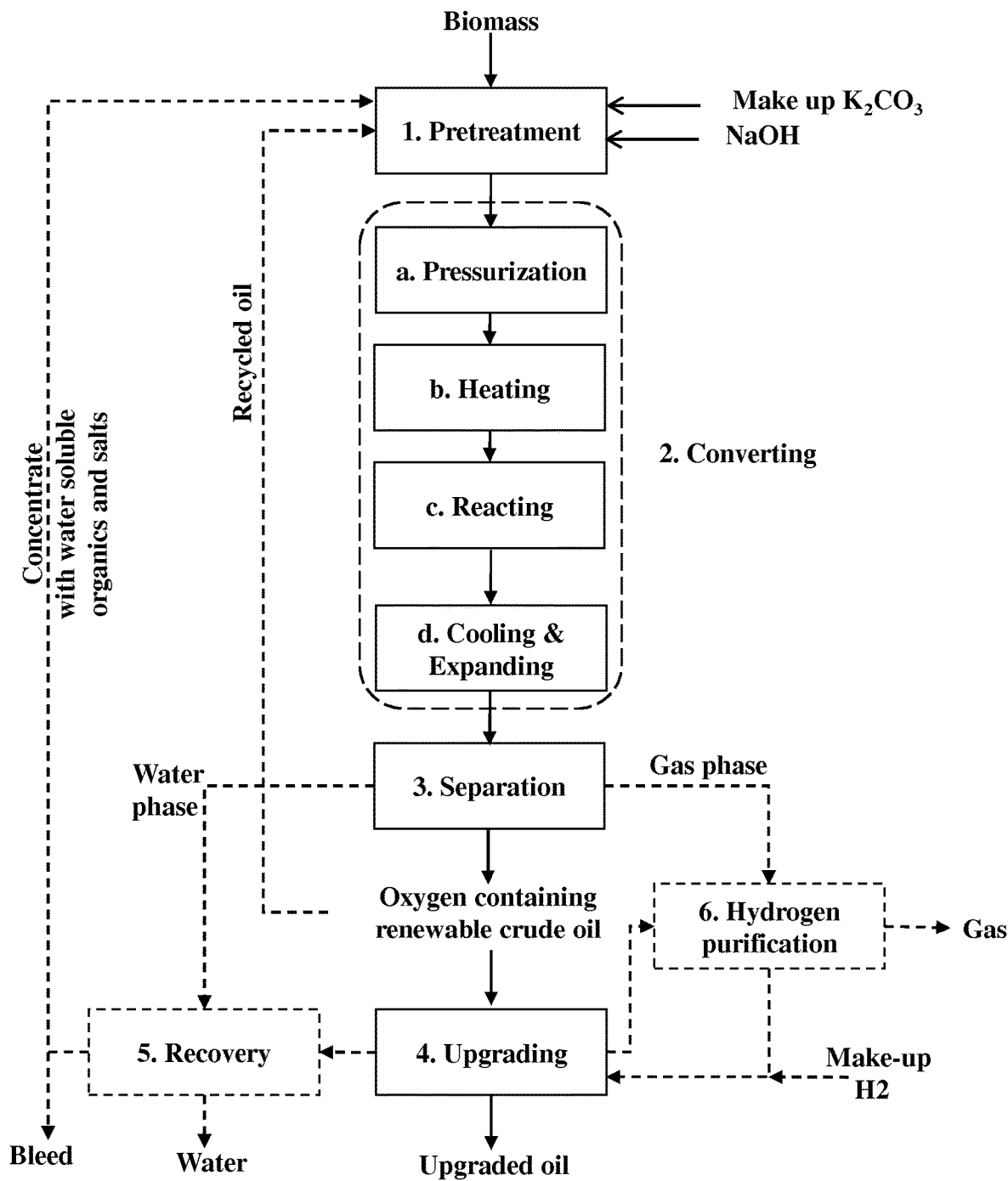
FIG. 9 shows an advantageous embodiment of the present invention, where the upgrading process is integrated with the process of providing the renewable oxygen containing oil, where external hydrogen consumption is reduced by recovering hydrogen from the oil providing step and optionally from said catalytic steam conversion process and where further, water from the upgrading process is treated together with water from the providing step in a recovery unit.

FIG. 9 shows a preferred embodiment where the upgrading process of the present invention is integrated with the process of providing the oxygen containing renewable crude oil. Gas products rich in hydrogen are in certain embodiments separated from the products of the first, and/or the second, and/or the third, and/or the fourth reaction zones. Hydrogen may advantageously to many embodiments of the present invention be extracted from said product gas and used to supply hydrogen to the upgrading process.

In certain embodiments of the present invention hydrogen produced as part of the process of providing the oxygen containing renewable crude oil is purified and used to supply hydrogen to the upgrading process of the present invention, thereby reducing the required make-up hydrogen.

Water is a product from deoxygenation of the oxygen containing renewable crude oil and water is separated from the products of the first, and/or the second, and/or the third, and/or the fourth reaction zones of the upgrading process. As illustrated in FIG. 9, said water may advantageously to many embodiments of the present invention be treated in the recovery unit of the providing process.

EXAMPLES

Example 1

Providing Oxygen Containing Renewable Crude Oil According to a Preferred Embodiment of the Present Invention An oxygen containing renewable crude oil was produced from a 50/50 mixture on a dry weight basis of fresh spruce and fresh pine using the pilot plant in FIG. 2. The analysis of the wood chips as received is shown in Table 1 below.

TABLE 1

Composition of carbonaceous material on a dry ash free basis.

| ELEMENT | SPRUCE wt %, dry | PINE wt %, dry | 50/50 MIXTURE |
|---|---|---|---|
| C, wt % | 50.4 | 50.2 | 50.3 |
| H, wt % | 6.1 | 6.2 | 6.15 |
| O, wt % | 43.1 | 43.4 | 43.25 |
| S, wt % | 0 | 0 | 0 |
| N, wt % | 0.2 | 0.1 | 0.15 |
| Cl, wt % | 0.008 | 0.007 | 0.0074 |
| HHV, MJ/kg | 20.2 | 20.1 | 20.15 |

Feed Preparation

The wood chips were sized reduced to wood flour in a Hammermill system and mixed with recycled water (inclusive dissolved salts and water-soluble organics), recycled oil, catalysts to produce a homogeneous and pumpable feed mixture. Potassium carbonate was used as catalyst and sodium hydroxide was used for pH adjustment. It was attempted to keep the potassium concentration constant during the runs i.e. the potassium concentration in the water phase was measured and the required make-up catalyst concentration was determined on this basis. Sodium hydroxide was added in amounts sufficient to maintain the outlet pH of the separated water phase in the range 8.0-8.5. Further CMC (Carboxy Methyl Cellulose, $M_w$=30000) in a concentration of 0.8 wt % was added to the feed slurry as a texturing agent to avoid sedimentation in the feed barrel and improve pumpability.

As neither water nor oil phases was available for the first cycle (batch), crude tall oil was used as start-up oil and 5.0 wt % ethanol and pure water (Reversed Osmosis water, RO water) was used to emulate the water phase in the first cycle. Multiple cycles (batches) are required before the process can be considered in steady state and representative for oil and water phases are produced. The number of cycles required to produce oil with less than 10% concentration of the start-up oil is shown in Table 2. The numbers are valid for a feed composed of 20% dry wood by weight, an Oil Yield of dry ash free oil of 45.3% by weight, and an oil/wood ratio of 1 for the first three cycles and 0.8 for the subsequent cycles:

TABLE 2

Estimation of number of cycles needed for producing oil
with more than 90 wt % wood derived from the produced oil.

| CYCLE No. | BIOMASS kg | RECIRCULATED OIL kg Total | RECIRCULATED OIL kg Crude Tall Oil | PRODUCED BIO OIL kg | CRUDE TALL OIL IN OIL PRODUCT % |
|---|---|---|---|---|---|
| 1 | 20 | 20 | 20 | 9.1 | $\frac{20}{29.1} \times 100 = 68.7\%$ |
| 2 | 20 | 20 | 20 × 68.7% = 13.7 | 9.1 | $\frac{13.7}{29.1} \times 100 = 47.2\%$ |
| 3 | 20 | 20 | 20 × 47.2% = 9.4 | 9.1 | $\frac{9.4}{29.1} \times 100 = 36.5\%$ |
| 4 | 20 | 16.6 | 16.6 × 32.3% = 5.4 | 9.1 | $\frac{5.4}{25.7} \times 100 = 20.8\%$ |
| 5 | 20 | 16.4 | 16.4 × 20.8% = 3.4 | 9.1 | $\frac{3.4}{25.5} \times 100 = 13.3\%$ |
| 6 | 20 | 16.4 | 16.4 × 13.3% = 2.2 | 9.1 | $\frac{2.2}{25.5} \times 100 = 8.6\%$ |
| 7 | 20 | 16.4 | 16.4 × 0.086% = 1.4 | 9.1 | $\frac{1.4}{25.5} \times 100 = 5.6\%$ |

As seen in the table, approximately 6 cycles are required to produce a representative oil with less than 10% of the start-up oil. Hence, 6 cycles performed where the oil and water phase produced from the previous cycled was added to the feed mixture for the subsequent cycle. The feed composition for the 6 cycle run is shown in Table 3 below:

TABLE 3

Feed mixture composition for $6^{th}$ cycle run.

| Pine wt % dry | Spruce wt % dry | CMC wt % dry | Recirc. oil from $5^{th}$ cycle wt % dry | Water contained in wood and recycled oil wt % | Recirc. water phase from 5th cycle wt % | K wt % | NaOH wt % | Total wt % |
|---|---|---|---|---|---|---|---|---|
| 11.1 | 11.1 | 0.8 | 18.2 | 9.8 | 45.2 | 2.3 | 1.5 | 100.0 |

The feed mixture in Table 3 were all processed at a pressure of about 320 bar and a temperature around 400° C. The de-gassed product was collected as separate mass balance samples (MB) in barrels from the start of each test, and numbered MB1, MB2, MB 3, etc. The collected products were weighed, and the oil and water phases were gravimetrically separated and weighed. Data was logged both electronic and manually for each batch.

Total Mass Balance

The Total mass balance ($MB_{Tot}$) is the ratio between the total mass leaving the unit and the total mass entering the unit during a specific time. The total mass balance may also be seen as a quality parameter of the data generated. The average value is 100.8% with a standard deviation of Oil Yield from Biomass (OY)

The Oil Yield from Biomass (OY) expresses the fraction of incoming dry biomass that is converted to dry ash free oil. It's defined as the mass of dry ash free Oil produced from dry biomass during a specific time divided by the mass of dry biomass entering the unit during the same time. The recirculated oil is not included in the balance; it's subtracted from the total amount of oil recovered when calculating the oil yield from biomass. The average oil yield (OY) was found to be 45.3 wt % with a standard deviation of 4.1 wt % i.e. 45.3% of the mass of dry biomass (wood+CMC) in the feed is converted to dry ash free Oil.

Detailed Oil Analysis

Data measured for the oil is presented in Table 4.

TABLE 4

Data for 6$^{th}$ cycle oil

| PARAMETER | UNIT | WHOLE OIL, (DEHYDRATED) | LIGHT FRACTIONS (180-260° C.) (260-344° C.) | | HEAVY FRACTION (344+° C.) |
|---|---|---|---|---|---|
| Yield on Crude, wt % | | | 11.6 | 21.1 | |
| C | wt % (daf) | 81.9 | 80.3 | 82.3 | 84.8 |
| H | wt % (daf) | 8.7 | 10.3 | 9.5 | 8.0 |
| N | wt % (daf) | 0.09 | n.a | n.a | <0.75 |
| S | wt % (daf) | 0.008 | n.a | n.a | n.a |
| O | wt % (daf) | 10.1 | 9.4 | 8.2 | 8.2 |
| Density, 15° C. (Whole Oil, a.r) | kg/l | 1.0729 | | | |
| Density, 15° C. | kg/l | n.a | 0.9425 | 1.0236 | 1.1541 |
| Density, 40° C. | kg/l | 1.0572 | | | |
| Density, 50° C. | kg/l | 1.0503 | | | |
| Density, 60° C. | kg/l | 1.0435 | | | |
| Density, 70° C. | kg/l | 1.0368 | | | |
| HHV (daf) | MJ/kg | 38.6 | 38.5 | 37.5 | 37.7 |
| Kinematic Viscosity, 40° C. | mm$^2$/s | 17360 | 2.996 | | 9812 (150° C.) |
| Kinematic Viscosity, 60° C. | mm$^2$/s | 1545 | | | 1298 (175° C.) |
| Total Acid Number | mg KOH/g | 8.8 | 3.75 | 8.2 | 8.2 |
| Strong Acid Number | mg KOH/g | <0.01 | | | |
| Pour point (maximum) | ° C. | 24 | −60 | −15 | 140 |
| Flash point | ° C. | 59 | 90 | 146 | |
| Moisture content | wt % | 0.88 | | | |

Figure 10:
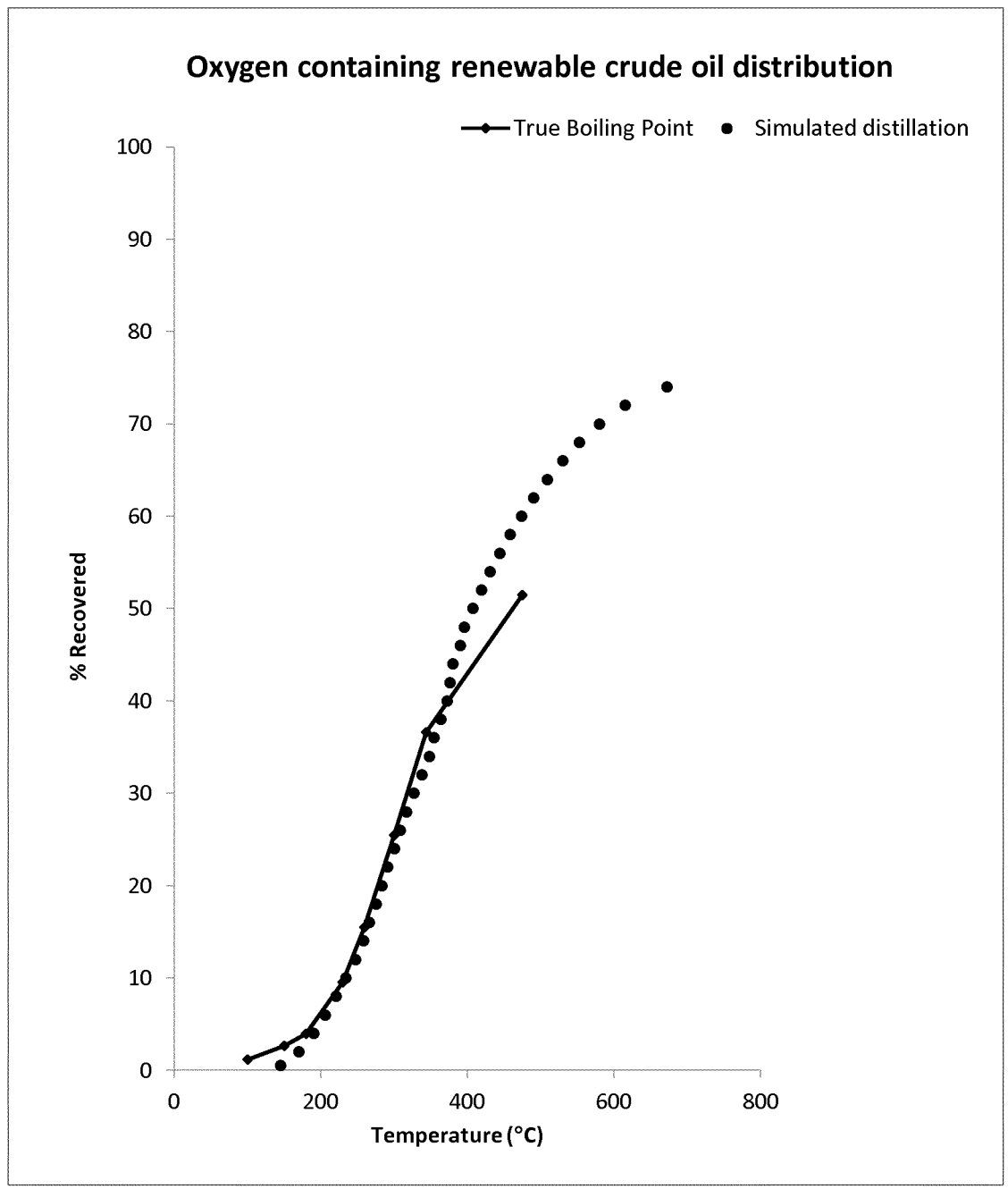
FIG. 10 shows simulated and true distillation curve of an oxygen containing renewable crude oil produced from softwood in said step of providing according to the present invention.

Simulated distillation results for whole oil and compared with true distillation results in FIG. 10.

Energy Recovery in the produced Low Sulphur Containing Oxygen Renewable Crude Oil The Energy Recovery ($ER_{oil}$) expresses how much of the chemical energy in the fed wood that is recovered in the oil. It does not take into account the energy required for heating nor the electrical energy supplied to the unit. For the calculations of recoveries, a High Heating Value (HHV) for the oil of 38.6 MJ/kg, respectively. The resulting oil yield for the 6th cycle oil was 85.7% with a standard deviation of 7.7 i.e 85.6% of the (chemical) energy in wood fed to the plant is recovered in the produced Oil.

Gas Production and Gas Analyses

Gas is produced in the process of converting biomass into Hydrofaction Oil. The yield of gas produced from dry wood in the feed is 41.2 wt % as is shown in the table 8 (oxygen balance). The gas is composed of mainly $CO_2$, $CH_4$ and other short hydrocarbons ($C_2$-$C_4$), $H_2$ and some lower alcohols. Gas was sampled and analyzed by Sveriges Tekniska Forskningsinstitut (SP) in Sweden. The analysis of 6$^{th}$ cycle gas is shown in Table 6 along with heating values of the gas estimated from the gas composition. Since a HTL process runs at reductive conditions, it's assumed that the gas is oxygen ($O_2$) free and the detected oxygen in the gas origin from air leaking into the sample bags when filled with gas sample. The gas composition is corrected for the oxygen (and nitrogen). The calculated elemental composition of the gas is shown in Table 6.

TABLE 6

Gas composition for the gas produced in the process.

| COMPONENT | vol %, A.R | vol %, AIR FREE* | wt %, AIR FREE | HHV, MJ/kg | LHV, MJ/kg |
|---|---|---|---|---|---|
| $H_2$ | 24.00 | 25.79 | 1.69 | 2.40 | 2.02 |
| $O_2$* | 0.40 | 0.0 | 0.0 | 0.0 | 0.0 |
| $N_2$ | 1.50 | 0.02 | 0.01 | 0.00 | 0.00 |
| $CO_2$ | 56.90 | 61.14 | 87.27 | 0.00 | 0.00 |
| CO | 0.30 | 0.32 | 0.29 | 0.03 | 0.03 |
| $CH_4$ | 6.70 | 7.20 | 3.75 | 2.08 | 1.87 |
| Ethene | 0.16 | 0.17 | 0.16 | 0.08 | 0.07 |
| Ethane | 2.20 | 2.36 | 2.31 | 1.20 | 1.10 |
| Propene | 0.27 | 0.29 | 0.40 | 0.19 | 0.18 |
| Propane | 0.95 | 1.02 | 1.46 | 0.74 | 0.68 |
| Sum $C_4$ | 0.63 | 0.68 | 1.25 | 0.62 | 0.57 |
| Methanol | 0.41 | 0.44 | 0.46 | 0.10 | 0.09 |
| Ethanol | 0.27 | 0.29 | 0.43 | 0.13 | 0.12 |
| Acetone | 0.26 | 0.28 | 0.53 | 0.17 | 0.15 |
| Total | 94.95 | 100 | 100 | 7.73 | 6.89 |

Oxygen ($O_2$) in the as received gas (a.r) is assumed to origin from air contamination of the gas when filling the sample bag. The produced gas composition is assumed air (Oxygen) free.

TABLE 7

Elemental gas composition.

| ELEMENT | wt % |
|---|---|
| C | 32.0 |
| H | 3.8 |
| N | 0.0 |
| O | 64.1 |
| Total | 100 |

Oxygen & Water Balance

The main oxygen removal paths in the process is believed to be via two main routes:
1. de-carboxylation with $CO_2$ as product
2. dehydration/hydrogenation with water as product.

As presented in table 8, about ⅔ of the oxygen removal is due to de-carboxylation and ⅓ due to dehydration/hydrogenation.

TABLE 8

Oxygen balance

| | COMPONENT | MASS, kg |
|---|---|---|
| Oxygen in dry wood (daf), wt % | kg O in wood/1000 kg in wood | 432.7 |
| Oxygen in dry oil (daf), wt % | kg O in oil/1000 kg wood | 45.6 |
| Carbon in gas | C(gas) | 132 |
| Mass total gas | m(Tot gas), kg/1000 kg wood | 412 (41.2% gas yield) |
| Total O in gas + produced water | O, kg/1000 kg | 387.3 |
| $CO_2$ (in gas), per 1000 kg dry wood | m($CO_2$), kg | 360 |
| | m(O), kg | 261 (67.5% of total O removed) |
| CO (in gas), per 1000 kg dry wood | m(CO), kg | 1.2 |
| | m(O), kg | 0.7 |
| Methanol (in gas), per 1000 kg dry wood | m(MeOH), kg | 1.9 |
| | m(O), kg | 0.9 |
| Ethanol (in gas), per 1000 kg dry wood | m(EtOH), kg | 1.8 |
| | m(O), kg | 0.6 |
| Acetone (in gas), per 1000 kg dry wood | m(Ac), kg | 2.2 |
| | m(O), kg | 0.6 |
| Total O (in gas), kg per 1000 kg dry wood. Sum(O in all components) | m(O), kg | 264.3 |
| Produced $H_2O$ from excess O, per 1000 kg dry feed. | m(O), kg (387.3-264.3) | 123 (31.7% of total O removed) |
| | m(Prod. $H_2O$), kg | 138 |
| m(total oxygen in gas), per 1000 kg dry feed | m(total oxygen in gas), kg | 264.3 |
| m(oxygen in oil), per 1000 kg dry feed | m(oxygen in oil), kg | 45.6 |
| m(oxygen in produced water), per 1000 kg dry feed | m(oxygen in produced water), kg | 123 |
| m(oxygen in feed), per 1000 kg dry feed | m(oxygen in feed), kg | 432.7 |
| O Balance | m($O_{out}$)/m($O_{in}$) | 100% |

Example 2

Upgrading of Oil Using Conventional Sulfided NiMo Catalyst

Upgrading of the oil produced similarly as to the oil in Example 1 was performed to obtain partially upgraded renewable oil by adaptation of conventional hydrotreating techniques. A series of experiments included parametric screening in a continuous plug flow tubular reactor were performed to evaluate a commercial sulphided Ni—Mo catalyst from Criterion DN3630 with a focus on deoxygenation and TAN reduction, saturation of aromatics, distillate recovery, catalyst stability and mass balance establishment.

About 40 g of NiMo*S on alumina (commercial catalyst) was placed in a stainless steel up-flow tubular reactor having a ¾ inch outer diameter (OD), a length of about 51 cm and an empty volume of 100 cc. The reactor was equipped with a 10-sensing point thermocouple profile probe (Omega). The catalyst resided in the middle of the reactor and both ends of the reactor were packed with about 20 g of carborundum (SiC). This allowed efficient preheating of the oil in the carborundum zone before the oil reaches the catalyst zone. The reaction temperatures were controlled by 3 temperature controllers. The catalyst bed was first dried in nitrogen atmosphere at a flow rate of about 15 L/hr at atmospheric pressure at 120° C. for 1 h. Subsequently, the catalyst was activated by a pre-sulfiding process using sulphur-spiked vacuum gas oil with 3.67 wt % of DMDS and hydrogen flow rate of 13.6 L/hr at 41.4 bar at temperature range between 35 to 343° C. (ramp of 35° C./hr) for 16 hours. The catalyst was then contacted with the feed at about 0.3 cc/min (WHSV of about 0.5 h−1) and a flow of hydrogen at about 900 scc/cc at a pressure about 900 psig. The reaction temperatures of the tests were in the range of about 350° C. and 370° C. and the total pressure in the reactor were 60 bar.

The resulting upgraded oils were evaluated using SimDist, density, viscosity, TAN, oxygen content, H/C ratio and liquid product distribution. Process metrics such as yields and temperature/pressure stability were also evaluated, and process gas composition analysis was performed by gas chromatography.

Figure 11:
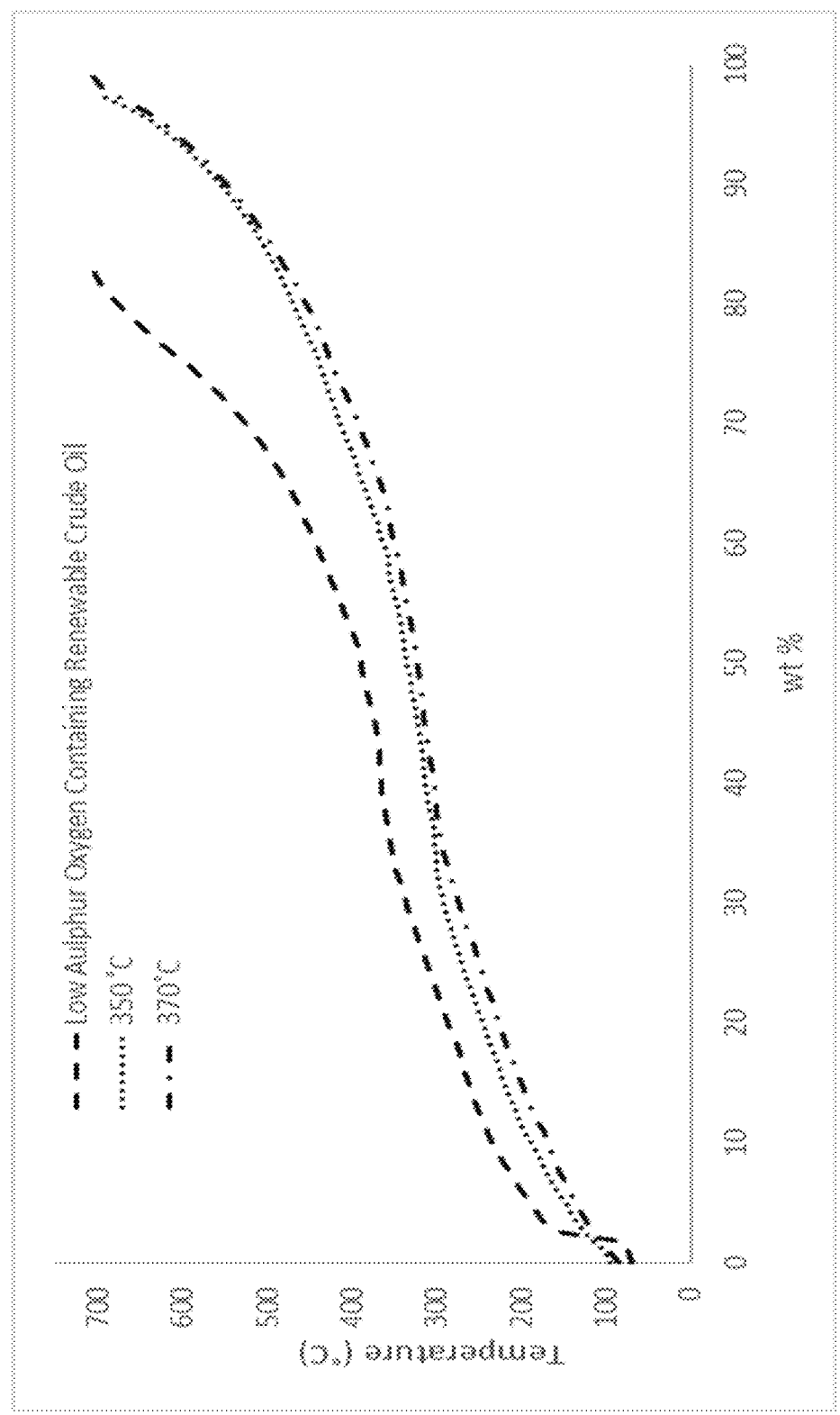
FIG. 11 shows boiling point curves for an oxygen containing renewable crude oil and upgraded renewable oil using a sulphided nickel molybdenum catalyst at 350° C. and 370° C.
Figure 12:
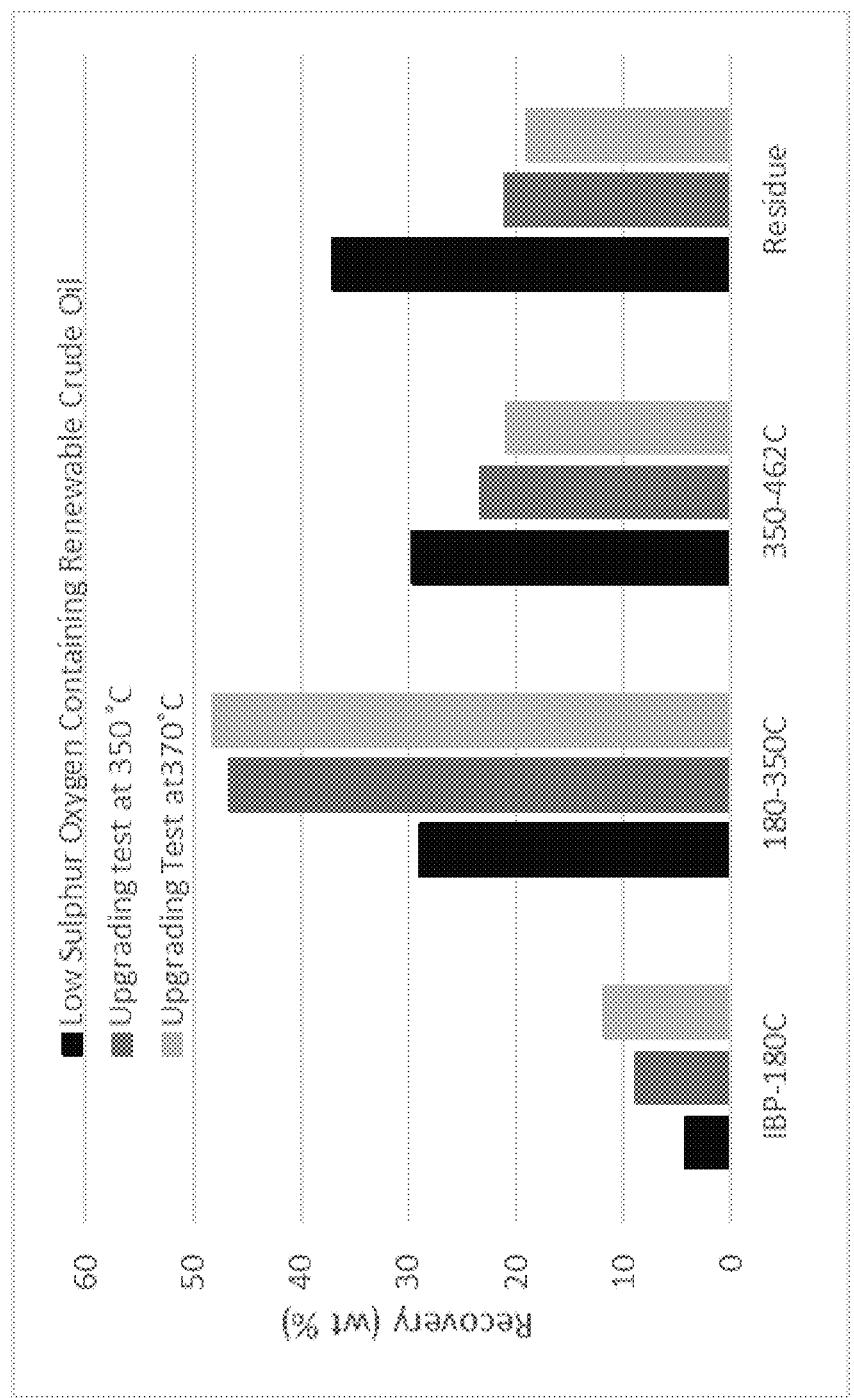
FIG. 12 shows the liquid product boiling distribution for upgraded renewable crude oil using a sulphided nickel molybdenum catalyst at 350° C. and 370° C.

Both upgrading experiments improved the oil's distillation profiles as shown in FIG. 11 and reduced the oxygen content as well as the density, viscosity and acid number of the oil as shown in Table 9. For example, at the catalyst screening test at 370° C. and 900 scc/cc produced an upgraded oil with significantly lower viscosity than the crude feed oil (80432 cP to 47 cP at 20° C.) and density (1103 Kg/m$^3$ to 991 Kg/m$^3$); Total Acid Number—TAN was eliminated, and the oxygen content dropped from about 10 to 2 wt. %. Moreover, the distillable fraction (IBP-350° C.) increased from 33 wt. % to 60 wt. % while the residue (550+° C.) have decreased from 28 wt. % to 10 wt. % as shown in FIG. 12. Combining the mass yield and density reduction results in a volume yield above 100 vol %.

TABLE 9

| | | | | physiochemical properties | | | | | |
| --- | --- | --- | --- | --- | --- | --- | --- | --- | --- |
| Sample | TAN mg KOH/g | Viscosity cP | Density kg/m$^3$ | Oil Yield wt % | Gas wt % | H$_2$ cons. wt % | HHV MJ/kg | Oxygen wt % | H/C |
| Biocrude | 55.7 | 80432 | 1103 | | | | 36.8 | 10.9 | 1.37 |
| 350° C. screening | 0.0 | 89 | 969 | 86 | 4.6 | 2.9 | 42.58 | 2.6 | 1.55 |
| 370° C. screening | 0.0 | 47 | 991 | 83 | 6.1 | 2.5 | 42.66 | 2.1 | 1.55 |

Table 10 shows the gas composition of catalytic screening tests. The gas composition shows that both decarboxylation and deoxygenation occurs. Therefore, CO$_2$ and CH$_4$ were produced.

TABLE 10

| | Gas composition of catalytic screening tests | |
| --- | --- | --- |
| Sample | 350° C. screening | 370° C. screening |
| H$_2$ | 93.50 | 92.97 |
| H$_2$S | 1.21 | 1.03 |
| C$_1$ | 1.71 | 2.33 |
| C$_2$ | 0.49 | 0.84 |
| C$_3$ | 0.22 | 0.40 |
| C$_4$ | 1.30 | 0.98 |

TABLE 10-continued

| | Gas composition of catalytic screening tests | |
| --- | --- | --- |
| Sample | 350° C. screening | 370° C. screening |
| C$_5$ | 0.03 | 0.03 |
| CO$_2$ | 1.54 | 1.44 |
| CO | 0.00 | 0.00 |

Figure 13A:
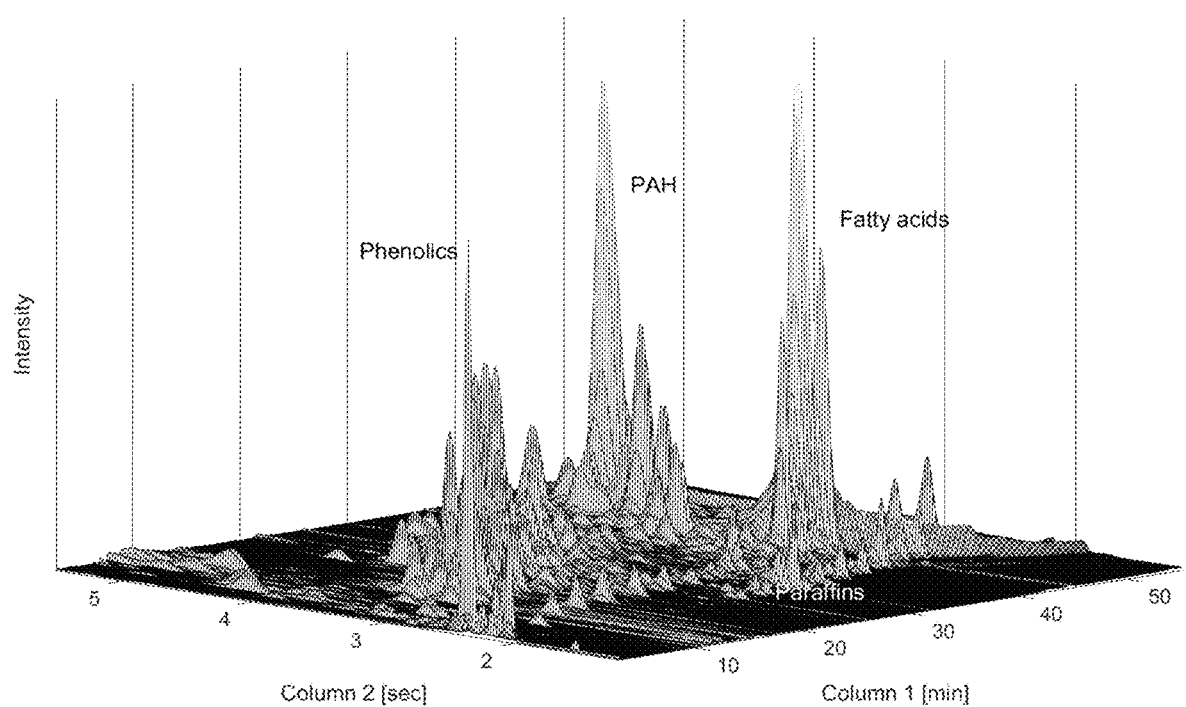
FIG. 13a-13c shows pyro GCxGC-MS of the chemical composition of oxygen containing renewable crude oil before (13a) and after upgrading (13b) and the distribution of products (13c) using a sulphided nickel molybdenum catalyst at 350° C.
Figure 13B:
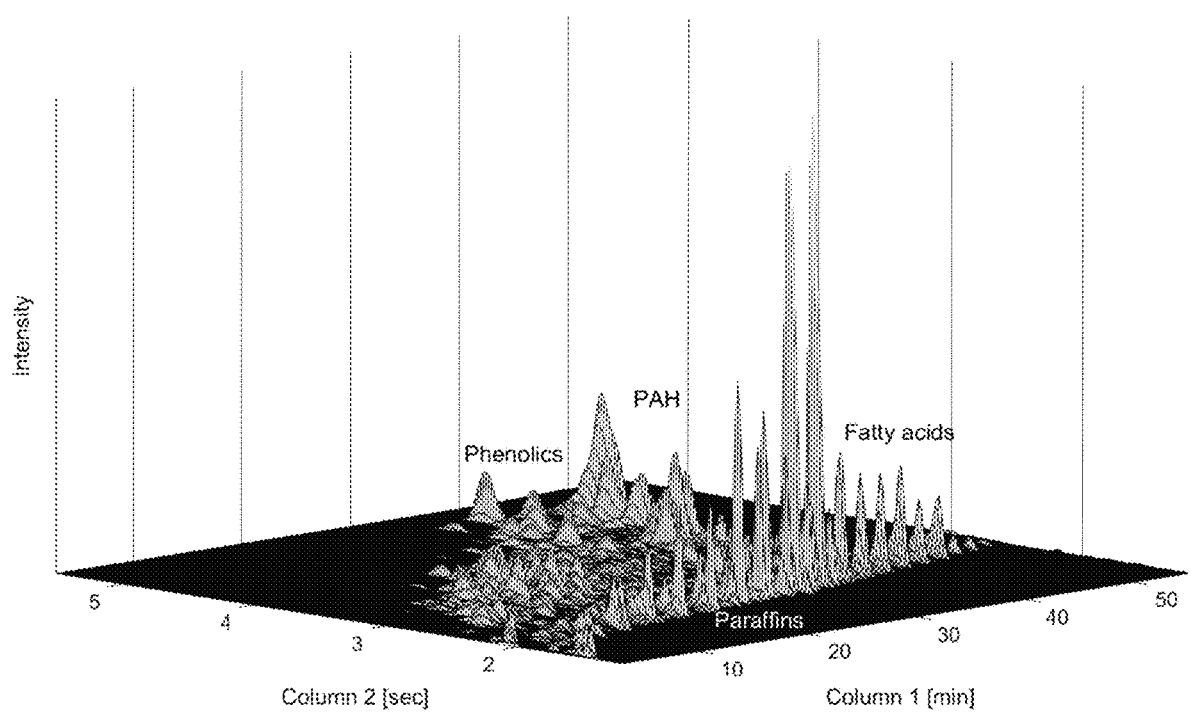
Figure 13C:
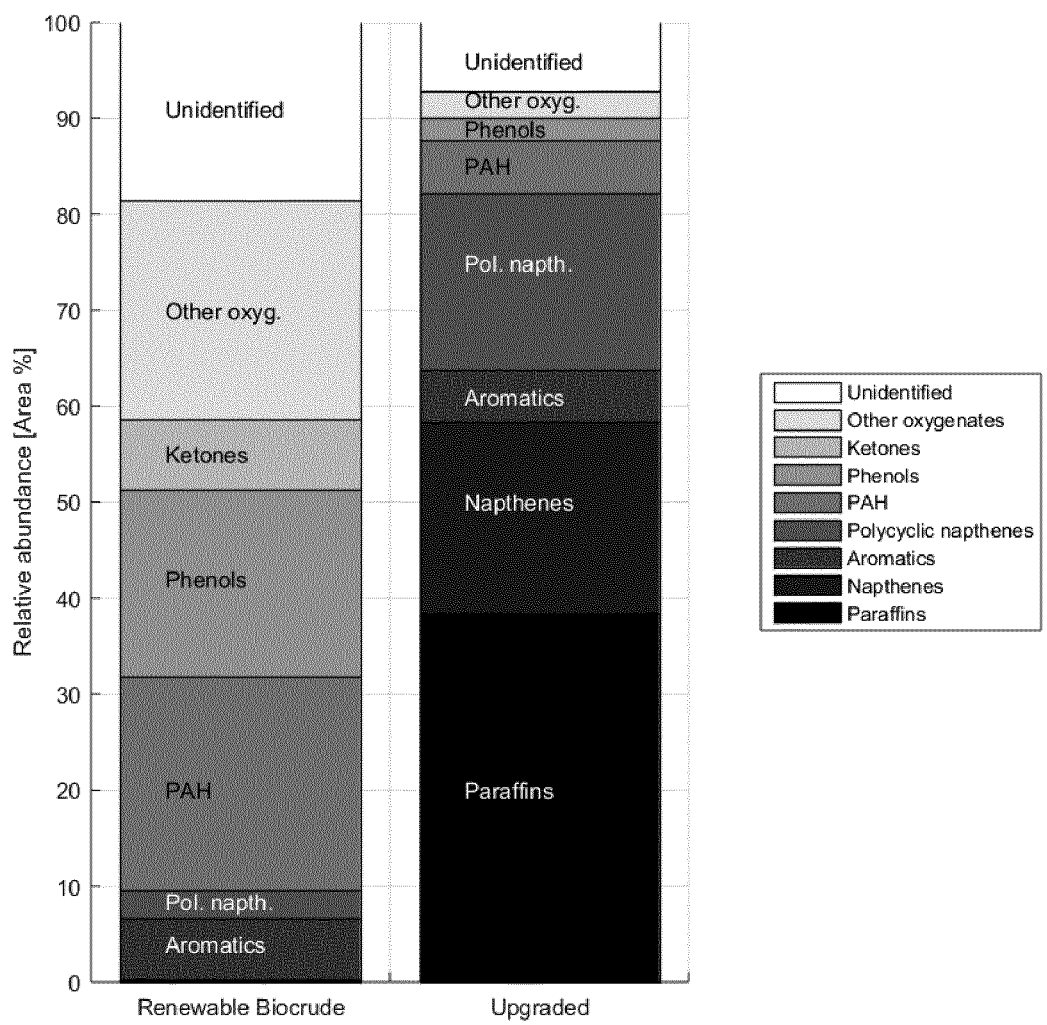

Product analysis by Py-GCxGC-MS showed how renewable crude oil complexity (FIGS. 13a and 13c) is reduced significantly during hydrotreating (FIGS. 13b and 13c). This analysis also reveals high deoxygenation and significant reduction of renewable crude oil polarity and aromaticity. The relative abundance of pure hydrocarbons is improved from 32 to 88%. Polyaromatic (PAH) hydrocarbons, fatty acids, and phenolics are reduced to naphthenes, paraffins and aromatics.

Example 3

Stability of Conventional Sulfided NiMo Catalyst

A longer stability test was performed subsequent to the screening tests described in Example 2 for evaluation of the stability and eventual deactivation of the catalyst. The test was performed at the same conditions as for the screening tests i.e. the first 200 hours was performed at a reaction temperature of 350° C., where after the reaction temperature was increased to 370° C. for another 150 hours.

Figure 14:
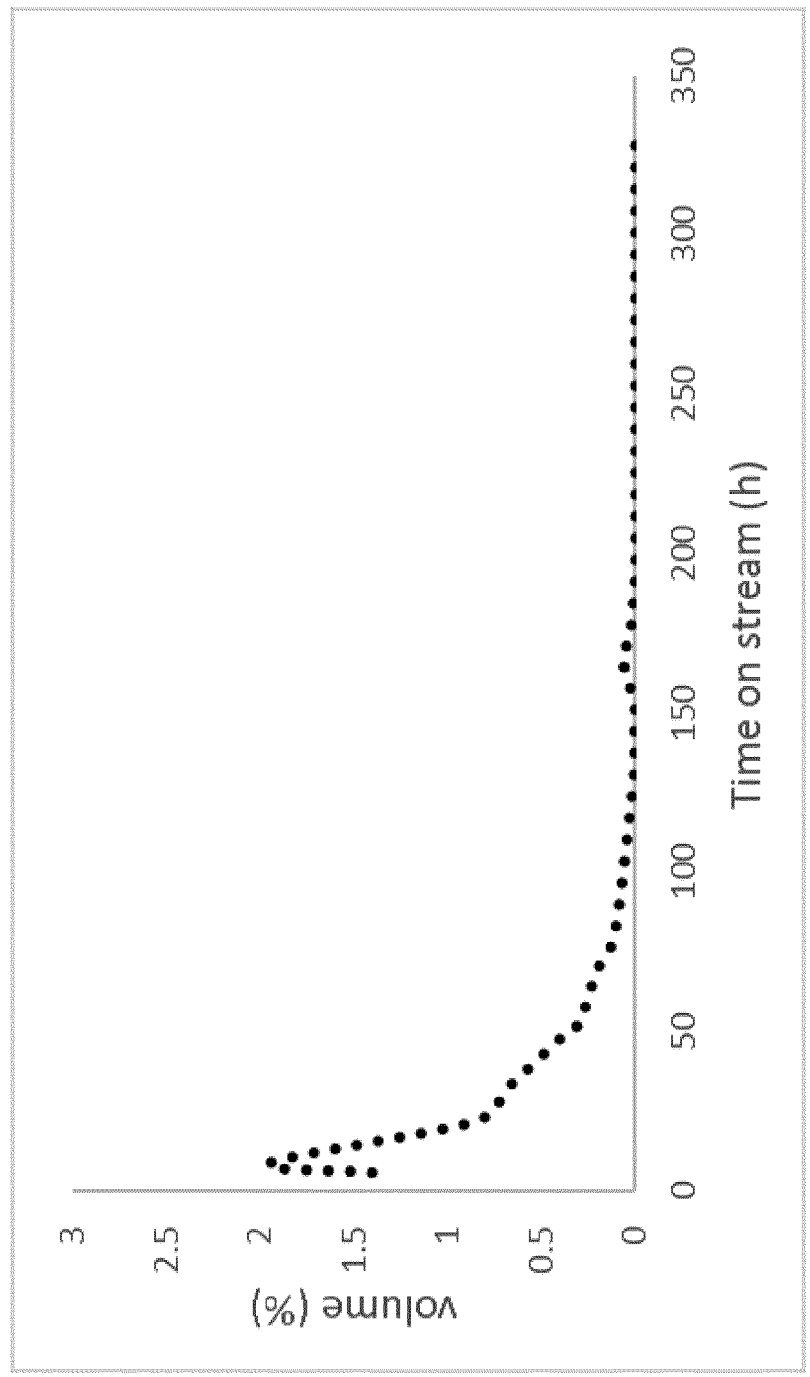
FIG. 14 shows $H_2S$ concentration in the off-gas from reaction zone 1 comprising sulphided Nickel Molybdenum on an alumina support versus time.

The stability test showed strong signs of catalyst deactivation during this longer term stability test as indicated by the H$_2$S concentration in the gas as shown in FIG. 14.

As seen from FIG. 14, the H$_2$S concentration in the process gas was nearly depleted by the 100th hour. This suggest deactivation of the catalyst associated with the loss of sulphur that came from the transformation of the catalyst from sulphide to oxide form.

This is further supported by inferior oil characteristics for the oil compared to the results from the screening run at same reaction conditions as shown below in Table 11.

TABLE 11

| | | | | physiochemical properties | | | |
| --- | --- | --- | --- | --- | --- | --- | --- |
| Sample | TAN mg KOH/g | Viscosity cP | Density kg/m$^3$ | Liquid Yield wt % | Gas wt % | H$_2$ cons. wt % | HHV MJ/kg |
| Biocrude | 55.7 | 80432 | 1103 | | | | 36.8 |
| 370° C. | 0.0 | 504 | 991 | 83 | 6.0 | 2.8 | 42.18 |

Example 4

Reactivation of Conventional Sulfided NiMo Catalyst

The catalyst in Example 3 was reactivated by repeating the activation procedure described in Example 2. It was found that it was possible to reactivate the catalyst and obtain oil characteristics similar to the screening tests.

Hence, it may be possible to design a process where the sulphide catalyst is periodically reactivated or co-feeding a sulphur agent to the system for regeneration of sulphide sites and stabilization of the catalyst. In this regard, spiking of the oxygen containing renewable crude oil with DMDS have proven useful in keeping the catalyst activity stable for up to 700 hours on stream.

Example 5

Tuning of Reaction Zone 1

Stable operation of reaction zone 1 was the focus of Campaign 3. A graded bed was prepared and tested against a non-graded bed of sulphided NiMo catalyst, activated as described in Example 1. An oxygen containing renewable crude oil was spiked to 0.5 wt. % sulphur by DMDS and different operating pressures and temperatures were tested for reaction zone 1.

The campaign lasted for 270 hours on stream and major findings include: 1) use of a graded bed in reaction zone 1 resulted in smoother operation, where operating temperature could be higher without inducing a pressure drop. Without the graded bed, a pressure drop was rapidly building up at temperatures around 350° C. and substantial exotherms were evident. 2) The furnace setpoint required to reach 350° C. in reaction zone 1 was lowered from 340° C. to 295° C. when switching from sulphur spiked heavy gas oil to oxygen containing renewable crude oil, emphasizing the higher exothermicity of oxygen containing renewable crude oil compared to conventional hydrotreater feeds. 3) Relatively smooth operation was achieved at temperatures up to 350° C. when the operating pressure was 60 and 80 bar. When approaching higher pressures, a pressure drop was rapidly forming. 4) It was observed that the oxygenated feed and a deoxygenated product are immiscible and presents an inhomogenous product unsuitable for use directly or as drop-in blendstock. Further this may cause pressure drop build-up or increased coking and catalyst deactivation.

Based on the above findings, the operating conditions in the first reaction zone need to be carefully selected with respect to catalyst, catalyst activity, bed grading, operating pressure and temperature.

Example 6

Upgrading Results from Reaction Zone 1, 2 and 3

Example 6 reflects a continuous upgrading process similar to an embodiment of the present invention where reaction zone 1 and 2 is followed by a separation of gas and water before reacting the entire partially upgraded product in reaction zone 3. Catalyst and activation procedure was the same as in Example 5.

Reaction zone 1 was a mild stabilization reactor with 50% catalyst dilution with inert carborundum. Further, the catalyst bed of reaction zone 1 was moved up to the inlet of the reactor, thereby ensuring an inlet temperature to the catalyst bed around 100° C. From where it was heated partly by the furnace and partly by the exothermic reactions to a maximum bed temperature of 315° C. By contacting the reactive feed with catalyst at a lower temperature, the reaction rate is reduced, preventing local hotspots and making temperature control easier. The reaction zone 1 effluent is less reactive and thus the reaction zone 2 catalyst bed is positioned in the middle of the reactor, allowing a more isothermal reactor. Reaction zone 2 was packed with 60% diluted catalyst and the inlet and average temperature was 350° C.

Figure 15:
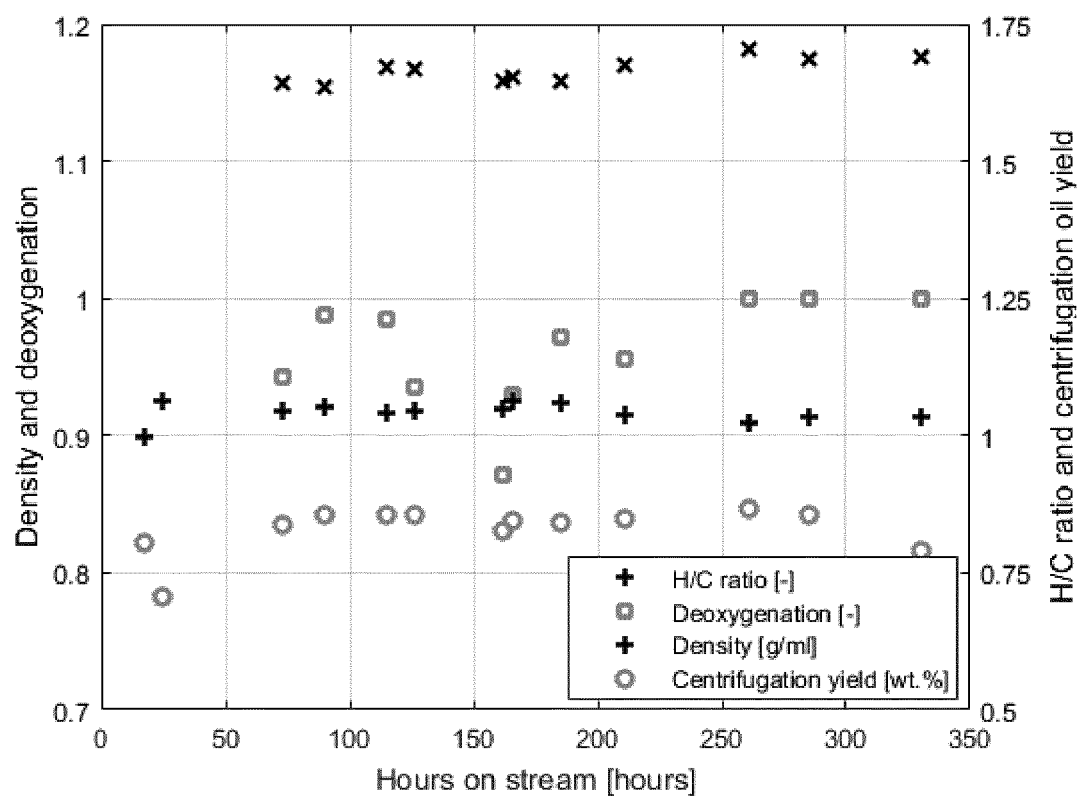
FIG. 15 shows selected product quality parameters plotted against time on stream.

This configuration and using an oxygen containing renewable crude oil spiked to 0.5 wt. % sulphur with DMDS was operated for 330 hours on stream without signs of catalyst deactivation as shown FIG. 15. In FIG. 15 selected product quality parameters are plotted against time on stream. Note that different operating conditions were tested, resulting in some scatter of the results. A WHSV of 0.5 $h^{-1}$ was used for the first 210 hours on stream after which it was lowered to try and improve conversion. A WHSV of 0.25 $h^{-1}$ compared to 0.5 $h^{-1}$ improved the H/C ratio from 1.64 to 1.70 and reduced density from 922 to 912 kg/m3. Further, the loss of bottoms by centrifugation was reduced from 7 to 4 wt. %, thus increasing the overall mass and volume yield.

Different mass balances from the 330 hours of operation of reaction zone 1 and 2 was mixed into 6.5 kg of partially upgraded oil feed. The high concentrations of water affect selectivity and activity, and the water was removed by rotary evaporation to simulate the separation of gas and water after reaction zone 2 according to the present invention.

Figure 16:
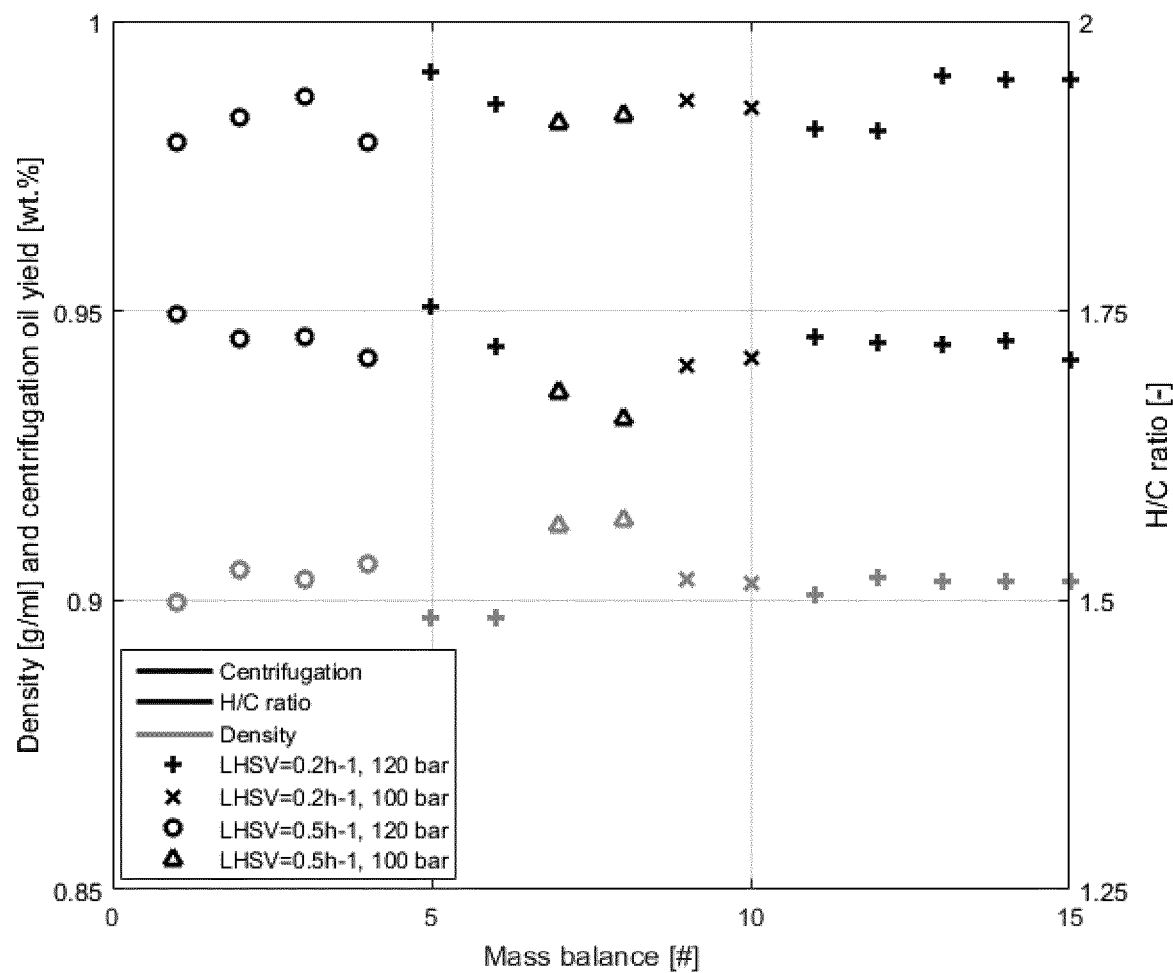
FIG. 16 shows density, molar H/C ratio and the oil yield upon product centrifugation as function of time on stream.

The dehydrated and partially upgraded oil product was not fractionated further but processed in a third reaction zone without sulphur spiking and using the same nickel molybdenum catalyst as above. Operating temperature was varied between 350-370° C., the pressure was 100-120 bar and WHSV was 0.2-0.5 $h^{-1}$. The partially upgraded feed was very easy to process, causing no increase in pressure drop or other operational problems what so ever. In comparison, the untreated oxygen containing renewable crude oil that was treated in the previous examples, is more prone to induce pressure drops if operating conditions are not carefully selected. A major reason for this difference is obviously, the higher reactivity, coking propensity and heat release associated with the oxygenated renewable crude oil. The significant difference in partial pressure of water is another explanation. Density, molar H/C ratio and the oil yield upon product centrifugation are given as function of time on stream in FIG. 16. Overall, relatively stable conversion is evident and product densities range from 897-914 kg/m3. In more detail, a lower space velocity and a higher pressure improved hydrogenation, similar to previous findings.

Figure 17:
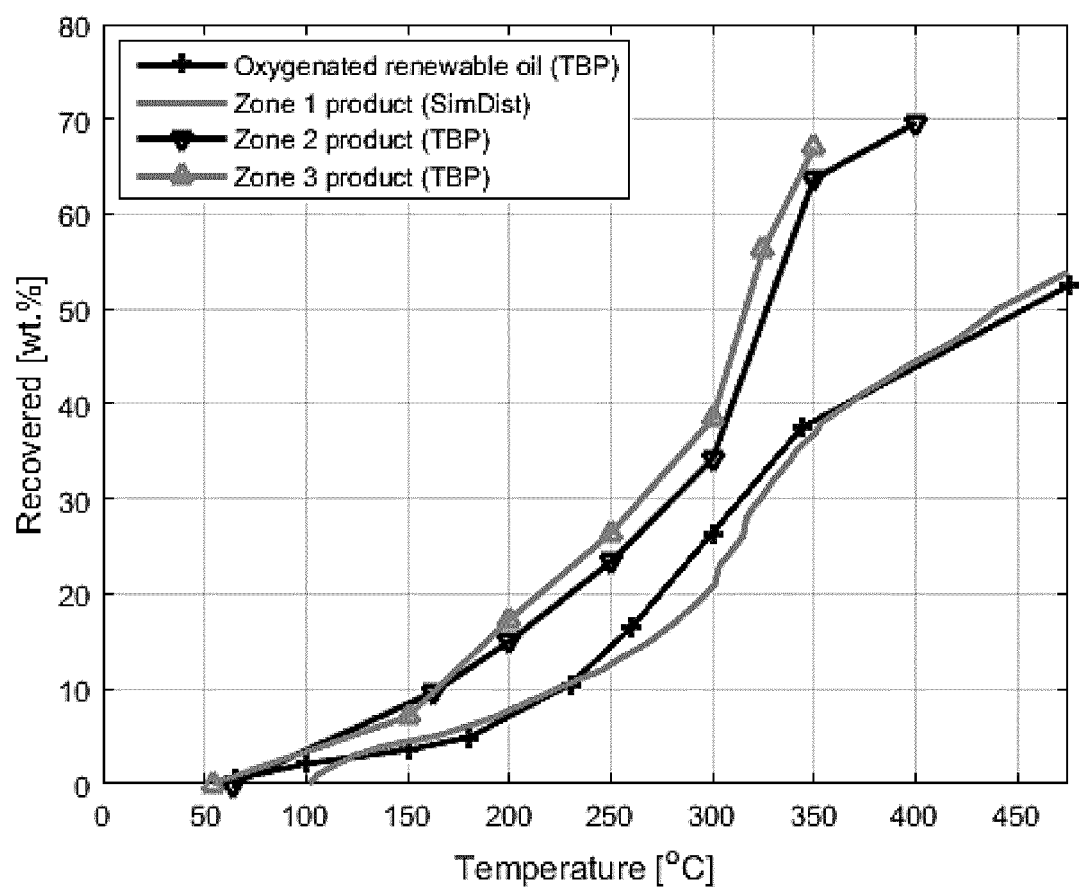
FIG. 17 shows the boiling point distribution of the oxygen containing renewable crude oil and the reaction zone products.
Figure 18:
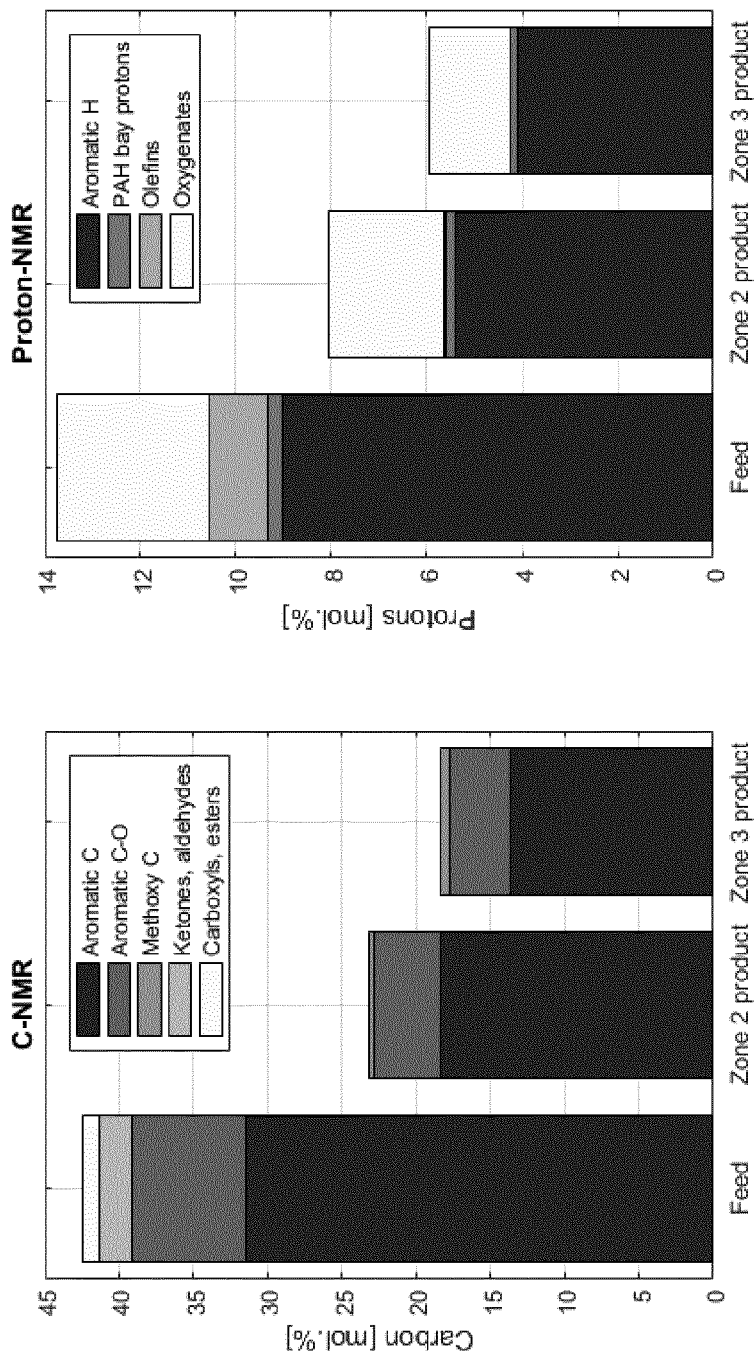
FIG. 18 shows NMR results for an oxygen containing renewable crude oil and upgraded renewable oil products from reaction zone 2 and 3.

FIG. 17 shows the boiling point distribution of the oxygen containing renewable crude oil and the products of reaction zone 1, 2 and 3 of the current example. A substantial increase in volatility is evident. FIG. 18 shows C-NMR and H-NMR results of the oxygen containing renewable crude oil and the products of reaction zone 2 and 3 of the current example. A substantial decrease in aromaticity during both reaction zone 1 and 2, but also during zone 3 is evident from the figure.

The last 5 mass balances, produced at 370° C., 120 bar, and a WHSV of 0.2 h−1, were mixed to get sufficient product for fractional distillation. The resulting distillate fractions from 15:5 fractional distillation are fuel range products as well as high boiling residue fraction which possess excellent properties as advanced drop-in fuel blend stocks. C-NMR analysis of the distillation fractions show around 10-15 mol. % total aromatic carbon in the low boiling and diesel range fraction, which indicates that the upgraded and fractionated low boiling products meet diesel fuel specifications. The high boiling fraction contains 25-30 mol. % total aromatic carbon and a sulphur content below 100 ppm and the high boiling fraction represent an advantageous marine fuel blend stock.

Example 7

Catalytic Upgrading with and Without Water Separation Between the First and Second Reaction Zone A catalytic upgrading of renewable oxygen containing crude oil produced according to the present invention was performed in a continuous bench scale set-up according to an embodiment of the present invention.

First the renewable oxygen containing renewable crude oil according to the present invention was partially upgraded through a catalytic hydrotreating process in a first reaction zone and further treated in a second reaction zone. Subsequently oxygen containing renewable crude oil according to the present invention was partially upgraded through a catalytic hydrotreating process in a reaction zone 1, and thereafter the partially upgraded oil was separated from the water and gases products prior to entering the second reaction zone.

Both upgrading approaches were performed using Ni—Mo sulphide catalysts on an alumina support. The heterogeneous catalysts were pre-sulphided in the reactors prior to the upgrading of the oxygen containing renewable crude oil. Diesel spiked with dimethyl disulphide was used as sulphur agent for catalyst activation as described in example 5.

Reaction zone 1 comprised one reactor where the reaction rates were carefully controlled by selection of reaction temperature and pressure and by using a diluted catalyst bed containing a pre-sulphided Ni—Mo catalyst and SiC 1:1 ratio.

Reaction zone 2 comprised one reactor containing two different beds of pre-sulphided Ni—Mo catalysts on a alumina support catalyst (cat-A and cat-B), where the cat-B have a higher activity compared to cat-A; therefore cat-A protects cat-B. The catalyst bed was further graded by using 4 different catalyst layers from the top to the bottom of the reactor a) 20 wt. % of Cat-A diluted with SiC, followed by b) 20 wt. % of Cat-B diluted with SiC, then c) pure Cat-B and finally d) 20 wt. % of Cat-B diluted with SiC.

Reaction Zone 1:

The effect of operating conditions on the quality of partially upgraded oil was explored. The primary goal of the reaction zone 1 is to improve the oil quality, reactivity and thermal stability by reducing oxygen content, the total acid number, and to improve the oil's boiling point distribution in a controlled way avoiding excessive temperature increase due to exotherms and without advancing cracking reactions.

Hence, deep upgrading in the first reaction zone, and thus upgrading under moderate conditions was explored. All the experiments related to reaction zone 1 were carried out at 320° C. and at pressures of 90 bar to 120 bar. The weight based space velocity (WHSV) was varied between 0.2 hours$^{-1}$ and 0.5 hours$^{-1}$ at a constant temperature of 320° C. and a constant pressure of 90 bar to produce a partially upgraded renewable oil. The results are presented below in table 12.

TABLE 12

Effect of space velocity in the first reaction zone on the physiochemical properties of partially upgraded oil at 320 c. and 90 bars.

|  | Renewable crude oil | Product at 0.5 h$^{-1}$ | Product at 0.3 h$^{-1}$ | Product at 0.2 h$^{-1}$ |
|---|---|---|---|---|
| Density at 20° C. [kg/m$^3$] | 1051.1 | 987.3 | 972.2 | 962.3 |
| Viscosity at 40° C. [cP] | 1146 | 160 | 74 | 48 |
| TAN [mg KOH/g] | 62 | 14.7 | 5.6 | 4.3 |
| HHV [MJ/kg] (dry basis) | 37.6 | 41.3 | 42.0 | 42.4 |
| C [wt. %] (dry basis) | 80.3 | 82.3 | 85.6 | 85.8 |
| H [wt. %] (dry basis) | 9.4 | 10.3 | 11.2 | 11.5 |
| O [wt. %] (dry basis) | 9.5 | 6.3 | 2.4 | 2.1 |
| H/C [wt. %] | 1.41 | 1.50 | 1.57 | 1.61 |

As seen from the table a weight based hourly space velocity (WHSV) of 0.5 h$^{-1}$ in the first reaction zone reduces the oxygen content from 9.8 wt % to 6.3 wt %, reduces the viscosity at 40° C. by approximately an order of magnitude from 1146 cP to 160 cP, and the Total Acid Number (TAN) from 62 to 14.7. Reduction of the weight based hourly space velocity from 0.5 h$^{-1}$ to 0.3 h$^{-1}$ is seen to result in a significantly further improved product quality e.g the oxygen content in the partially upgraded oil is decreased from 6.3 wt. % to 2.4 wt. %, while the viscosity is reduced by more than half to a viscosity of 74 cP, and the TAN is reduced by almost a factor to 3 to 5.6. A further reduction to of the weight based hourly space velocity from 0.3 h$^{-1}$ to 0.2 h$^{-1}$ only results in a minor reduction of oxygen content from 2.4 to 2.1 wt % and a minor TAN reduction from 5.6 to 4.3, while the viscosity was reduced from 74 cP to 48 cP. Hence a weight hourly space velocity of 0.2-0.3 h$^{-1}$ seems optimal for the specific renewable crude oil, catalyst and operating pressure and temperature[1] in the first reaction zone.

Figure 19:
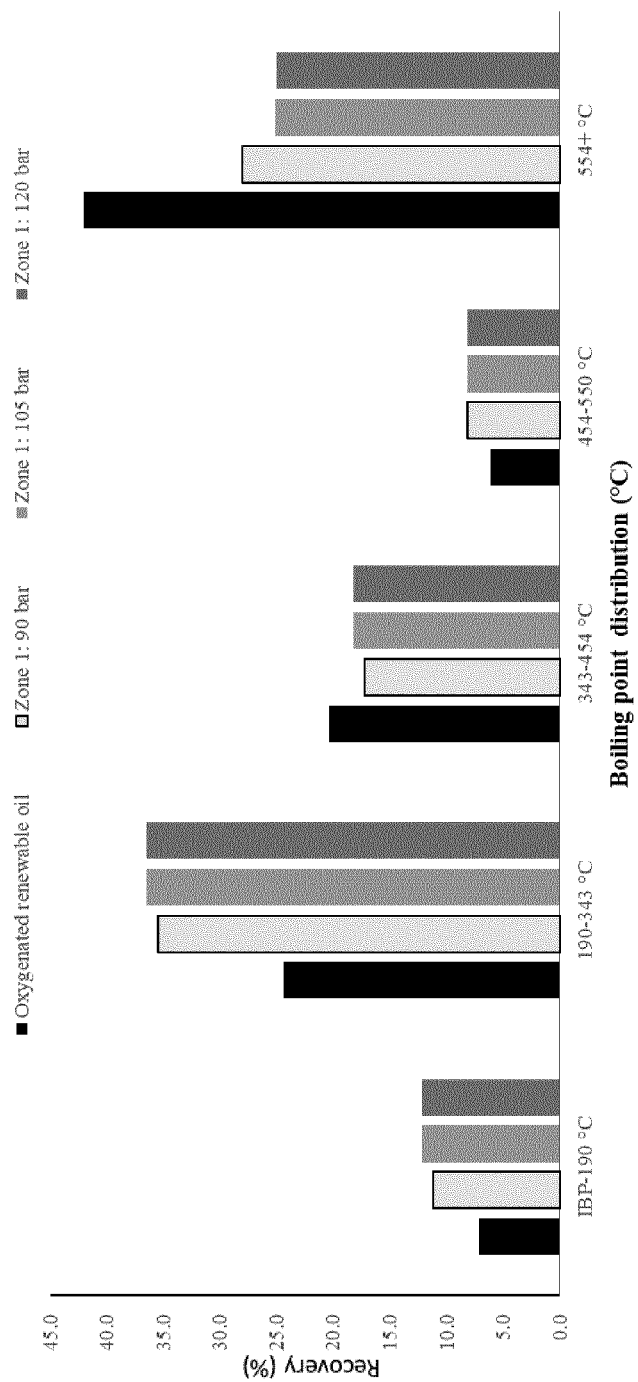
FIG. 19 shows the boiling point distribution of the oxygen containing renewable oil and reaction zone 1 liquid hydrocarbons products obtained at pressure in the range of 90 to 120 bar.

The operating pressure in the first reaction zone was varied from 90 bar to 120 bar at a constant operating temperature of 320° C., and a constant weight based hourly space velocity of 0.3 h$^{-1}$. Only minor variation in the quality of partially upgraded renewable oil product was observed by variation of the operating pressure in this range. The viscosity decreased from 1146 cP in biocrude oil to 74 cP after upgrading at 90 bar but remained unchanged by increasing the pressure to 105 bar, and then slightly decreased to 54 cP at 120 bar. The oxygen content slightly decreased from 2.4 to 2.1 wt. % by increasing the pressure from 90 to 120 bar. The same trend was observed in the boiling point distribution determined by Simulated Distillation (SimDist) as shown in FIG. 19. A significant reduction of the residue with a boiling point of 554° C. and a significant increase of the jet fuel and diesel fraction in the boiling point range from 193 to 343° C. is observed, while the further changes with increasing pressure are minor. Therefore, the results are not pressure dependent for the range of pressure study under the process.

Partially upgraded oil from reaction zone 1 was collected during 20 days of continues operation at 90 bar, 320° C. and 0.3 h$^{-1}$. Catalyst activity was continuously evaluated over more than 512 h of operation by continuously monitoring of product quality. The results are shown in Table 13. The first 8 hours of operation showed catalyst hyperactivity that was slowly stabilized over the 100 hours post reaction initiation, which is confirmed by the high quality of the liquid product and $CO_2$ and $CH_4$ monitoring on stream. The oxygen content was reduced from 9.5 to 0.9 wt. % after 8 h of operation, then increasing achieving 2.3 wt. % after catalysts stabilization at 100 h of operation and remained within this value until the end of the test (512 h). The same trend was observed to other oil properties presented in table 13.

TABLE 13

Physiochemical properties of partially upgraded oil during time on stream. Reaction zone 1: 320° C., 90 bar, 0.3 h$^{-1}$;

|  | Renewable crude oil | Blended All MB | Time on stream | | | | |
|---|---|---|---|---|---|---|---|
|  |  |  | 8 h | 200 h | 320 h | 440 h | 512 h |
| Density at 20° C. [kg/m$^3$] | 1051.1 | 963.0 | 948.4 | 966.6 | 970.1 | 972.2 | 972.2 |
| Viscosity at 40° C. [cP] | 1146 | 45 | 23 | 59 | 59 | 74 | 74 |

TABLE 13-continued

Physiochemical properties of partially upgraded oil during time on stream. Reaction zone 1: 320° C., 90 bar, 0.3 h$^{-1}$;

| | Renewable crude oil | Blended All MB | Time on stream | | | | |
|---|---|---|---|---|---|---|---|
| | | | 8 h | 200 h | 320 h | 440 h | 512 h |
| TAN [mg KOH/g] | 62 | 4.4 | 2.4 | 5.2 | 5.2 | 5.6 | 5.6 |
| HHV [MJ/kg] dry basis | 37.6 | 42.4 | 43.0 | 42.2 | 42.1 | 42.0 | 42.0 |
| C [wt. %] dry basis | 80.3 | 85.6 | 86.3 | 85.7 | 85.7 | 85.6 | 85.6 |
| H [wt. %] dray basis | 9.4 | 11.2 | 11.9 | 11.4 | 11.4 | 11.2 | 11.2 |
| O [wt. %] dry basis | 9.5 | 2.6 | 0.9 | 2.3 | 2.3 | 2.4 | 2.4 |
| H/C [mol] | 1.41 | 1.57 | 1.65 | 1.59 | 1.59 | 1.57 | 1.57 |

The $CO_2$ production after 8 h of operation was 0.68 mol %; its production decreased to 0.56 mol % after 20 h of operation and finally remained at about 0.4 mol % from 100 to 500 h of operation. The same trend was observed for methane production, where the remained at 0.5 mol % after 100 h of operation. Hence, it can be concluded that the first reaction zone can be operated stable without significant catalyst deactivation at these operating conditions.

Two Reaction Zone in Series: Effect of Water in the Second Reaction Zone:

A set of parametric tests were performed using the dewatered partially upgraded oil previously produced (Reaction zone 1) in a second reaction zone using the Cat-A and Cat-B catalyst bed. The results were compared with the results of a second set of parametric tests performed using two reaction zones in series without water or gas product separation from the liquid partially upgraded oil. The catalysts beds configuration and process conditions tested were the same in both tests. Therefore, separation of intermediate products was the only variable parameter between the two processes. The results shown in table 14 indicate a negligible effect of water and gases on the second reaction zone's catalyst bed during 320 hours of operation. For instance, the results obtained when performed the second reaction zone at 350° C. and 370° C. are similar regardless of the presence/absence of the water and process gas. The quality of the upgraded oil was higher when performed the reaction at the higher temperature (370° C.), the oxygen content was eliminated while the viscosity (9 cP) and the density (920 kg/m$^3$) where slightly improvement compare to the second reaction zone performed at 350° C. (i.e. 0.7 wt. % of oxygen, 11 cP and 926 kg/m$^3$).

TABLE 14

Physiochemical properties of upgraded oil after second reaction zone with and without phase separation between reaction zones. Reaction zone 1: 320° C., 90 bar, 0.3 h$^{-1}$; Reaction zone 2: 90 bar, 0.3 h$^{-1}$.

| Reaction zone Temperature (RZ) [° C.] | Density at 20° C. [kg/m$^3$] | Viscosity at 40° C. [cP] | TAN [mg KOH/g] | HHV [MJ/kg] dray basis | C [wt. %] dry basis | H [wt. %] dry basis | O [wt. %] dry basis | H/C [mol] |
|---|---|---|---|---|---|---|---|---|
| Renewable crude | 1051.1 | 1146 | 62 | 37.6 | 80.3 | 9.4 | 9.5 | 1.41 |
| RZ1-T$_1$ = 320, T$_2$= 320 | 929.9 | 14 | 1.9 | 43.3 | 86.1 | 11.9 | 1.7 | 1.66 |
| T$_1$ = 320, T$_2$ = 350 | 926.2 | 11 | 0.5 | 43.5 | 86.9 | 11.4 | 0.7 | 1.58 |
| T$_1$ = 320, T$_2$ = 370 | 920.9 | 9 | 0.2 | 43.7 | 87.2 | 12.1 | 0 | 1.67 |
| T$_1$ = 350, T$_2$ = 350 | 923.2 | 9 | 0.2 | 43.5 | 86.8 | 12.3 | 0.4 | 1.69 |
| T$_1$ = 350, T$_2$ = 390 | 918.0 | 6 | <0.1 | 43.7 | 87.1 | 12.4 | 0 | 1.71 |

Although these results indicate that phase separation of water between reaction zone 1 and 2 is not required when using the Ni—Mo pre-sulfide catalysts, catalyst bed configuration and process conditions, a third set of experiment suggested that once the 300 hours of operation are reached, a build up of pressure drop in the second reactor (second reaction zone) was observed and ended in a plug of reactor 2 and subsequent process interruption of the run without separation of water and gases from the partially upgraded oil between reaction zone 1 and 2, whereas no pressure build up was observed for the with separation of water and gases between the two reaction zones. Hence, the produced water and gases in the first reaction zone might affect the activity of the fresh presulphided catalysts in the second reaction zone through re-oxidation of sulphided catalysts and solids accumulation. Furthermore, the availability of hydrogen to the oil may be affected by the presence of water and gas in the reactor.

The distribution of components in exit gas indicated that methane was the main gas compound after hydrotreating while $CO_2$ and other light hydrocarbons were also produced. By increasing the temperature of the second reaction zone, the selectivity to hydrocarbons increased while $CO_2$ selectivity decreased, indicating the lower importance of decarboxylation reaction at higher temperatures. Moreover, by increasing the temperature of 2$^{nd}$ reaction zone from 320° C. to 370° C., the gas yield slightly increased from 4.8% to 5.4% and the produced water also increased from 8 to 8.9 wt.

%. The hydrogen consumption increased from 0.019 to 0.023 gH2/g-oil when temperature of $2^{nd}$ reaction zone increased from 320° C. to 370° C.

Two set of conditions were added to the parametric study with the aim evaluating the quality of the products at severe temperature conditions. i.e. Initially, the temperature of reaction zone 1 was increased from 320 to 350° C., while the temperature in the reaction zone 2 was maintain at 350° C. The results suggested slightly improvement of the upgraded oil quality compare to test 2 (Table 15).

For the second set of experiments, the temperature of reaction zone 2 was initially 350° C. then increased to 390° C., while the reaction zone 1 was maintained at 350° C. A deoxygenated and low TAN (below detection point <0.1) was obtained when the reaction zone two temperature was set at 390° C. However, the gas yield at this condition was double (9 wt. %) when compare to the gas yield obtained at test 3 (5.4%) which directly affects the liquid hydrocarbon yield (i.e. a reduction from 85.6% (test 3) to 82.0% (test 5) was observed). Moreover, the hydrogen consumption reached 0.033 g H$_2$/g oil at maximum temperatures conditions (RZ1: 350° C. and RZ2: 390° C.), indicating a 43.5 increase in hydrogen consumption compared to 0.023 g H$_2$/g oil at RZ1: 320° C. and RZ2: 370° C.

Figure 20:
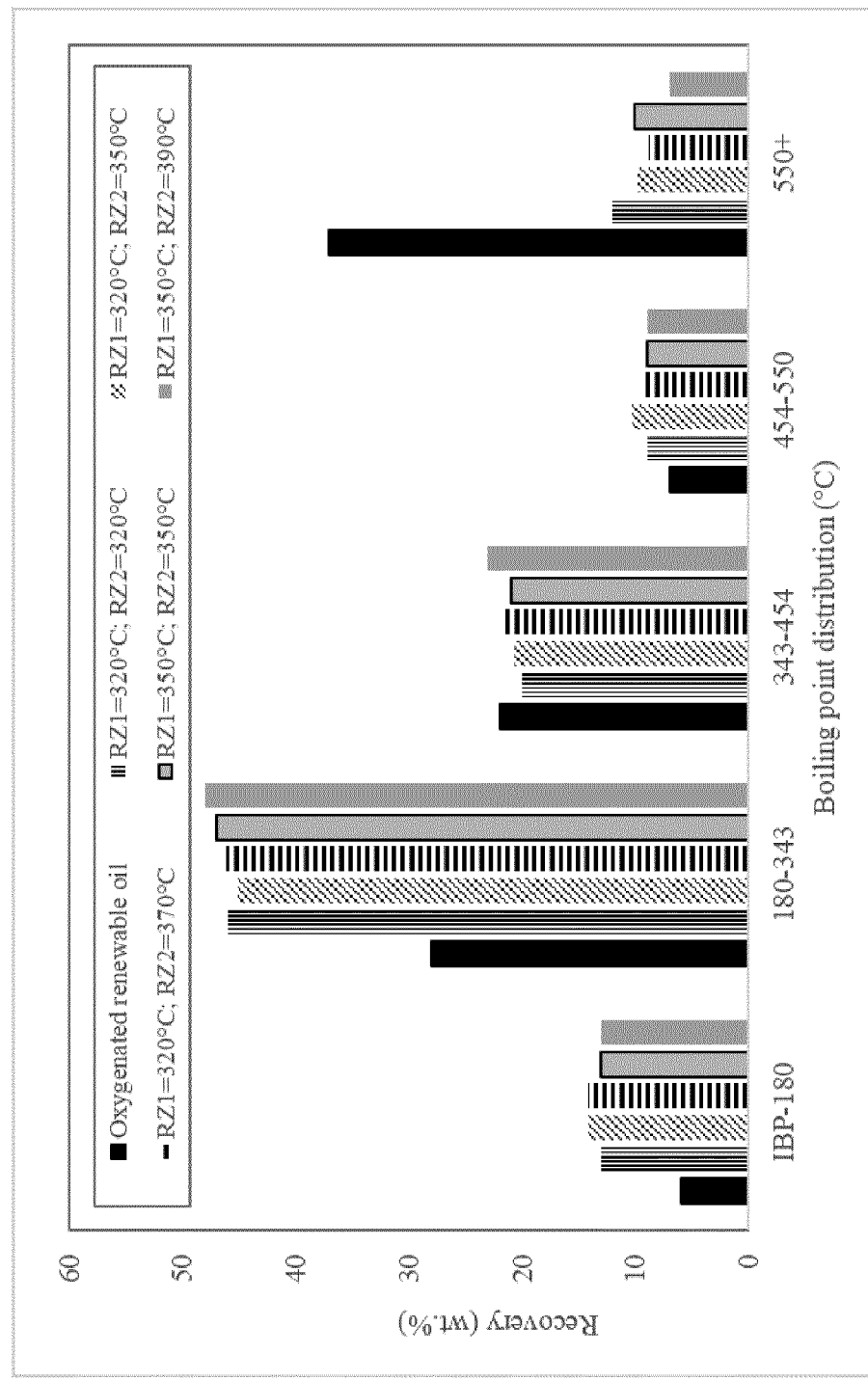
FIG. 20 shows how the boiling point distribution of the oxygen containing renewable oil and reaction zone 1&2 products are affected by modification of the reaction temperature in both reaction zones.

The boiling point distribution for the upgraded oils obtained by the set of tests listed in table 14 are shown in FIG. 20 indicates significant improvement of the recovery of hydrocarbons with BP up to 343° C. compare to the observed in the oxygenated renewable oil. The diesel fraction (180-343° C.) increase 64.3% after upgrading at RZ1=320° C. and RZ2=370° C. when compare to 28% in the oxygen content renewable oil. The residue (BP>550° C.) was reduced from 37% (biocrude) to below 12% after upgrading, reaching a minimum of 7% when hydrotreatment was performed at RZ1=350° C. and RZ2=390° C.

The invention claimed is:

1. A process for producing an upgraded renewable oil from renewable carbonaceous material(-s) comprising:
providing an oxygen containing renewable crude oil having:
an oxygen content in the range of 3.0 to 20% by weight,
a water content of less than 1.5 wt. %
a total acid number in the range from 5 to 80 mg KOH/g,
an oil fraction having a boiling point below than 350° C., in an amount of less than 70% by weight, and
a residue fraction having a boiling point of more than 450° C., in an amount of at least 10% by weight,
pressurizing the oxygen containing renewable crude oil to an operational pressure in the range 60 to 200 bar;
adding and mixing hydrogen to the pressurized oxygen containing renewable crude oil;
contacting the pressurized mixture with at least one heterogeneous catalyst contained in a first reaction zone at a temperature of 260 to 350° C. having a weight based hourly space velocity (WHSV) in the range 0.1 to 1 h$^{-1}$ so as to produce a partially hydrogenated and deoxygenated oil;
separating water and gas from the partially hydrogenated and deoxygenated oil from the first reaction zone
heating the separated partially hydrogenated and deoxygenated oil from the first reaction zone to a temperature in the range 350 to 400° C.;
contacting the heated partially hydrogenated and deoxygenated oil with at least one heterogeneous catalyst in a second reaction zone at a temperature of 350 to 400° C. at weight based hourly space velocity (WHSV) in the range 0.1 to 1.5 h$^{-1}$,
separating a product from the second reaction zone into at least a gas fraction, a water fraction, a low boiling point renewable liquid hydrocarbon fraction and a high boiling point renewable liquid hydrocarbon fraction,
contacting the low boiling point fraction from the second reaction zone with hydrogen and one or more heterogeneous catalysts at a temperature in the range 350 to 390° C. in a third reaction zone having a weight based space velocity in the range 0.1 to 1 h$^{-1}$, thereby producing a first product stream, and
contacting the high boiling point oil fraction with hydrogen and one or more heterogeneous catalysts at a temperature in the range 360-420° C. in a fourth reaction zone having a weight based space velocity in the range 0.1 to 1 h$^{-1}$, thereby producing a second product stream.

2. A process according to claim 1, where the first reaction zone comprises an initial stabilization zone for reducing the content of reactive oxygenated compounds and/or unsaturated compounds and/or aromatic compounds and/or metals of the low oxygen containing renewable crude oil where the weight based space velocity of the initial stabilization zone is in the range 0.2 to 1 h$^{-1}$.

3. A process according to claim 1 where at least one reactor in the first reaction zone is a graded bed comprising heterogeneous catalysts having an increasing activity.

4. A process according to claim 1, where hydrogen is produced from the separated gas from the first reaction zone and/or the second reaction zone by contacting it with steam and a heterogeneous catalyst capable of performing a steam reforming reaction of hydrocarbons contained in the process gas in a fifth reaction zone.

5. A process according to claim 4, where the steam reforming of the separated process gas is performed at a pressure in the range 2 to 40 bar and a temperature in the range 350° C. to 600° C. and a weight based space velocity in the range 0.1 to 2 h$^{-1}$ in the fifth reaction zone.

6. A process according to claim 1, where providing oxygen containing renewable crude oil comprises:
providing a carbonaceous material in the form of biomass contained in one or more feedstock;
providing a feed mixture by slurring the carbonaceous material in one or more fluids, at least one of which comprises water;
pressurizing the feed mixture to a pressure in the range 150 to 400 bar;
heating the pressurized feed to a temperature in the range of 300° C. to about 450° C.
maintaining the pressurized and heated feed mixture in a reaction zone for a conversion time in the range 3 to 30 minutes, thereby causing the carbonaceous material to be converted; and
cooling the converted feed mixture to a temperature in the range from 25° C. to 200° C.;
depressurizing the converted feed mixture to a pressure in the range 1-120 bar, and separating the converted feed mixture into at least a low oxygen containing renewable crude oil, a gas phase and a water phase comprising water-soluble organics and dissolved salts.

7. A process according to claim 3, where the oxygen containing renewable crude oil is subjected to a polishing step for removal of inorganic contaminants prior to being pressurized to the operational pressure.

8. A process according to claim 7, where the polishing step for removal of inorganic contaminants comprises an ion exchange step comprising a cation resin.

9. A process according to claim 1, where the renewable oxygen containing crude oil provided has an aromatics content in the range 20 to 70% by weight.

10. A process according to claim 1, where the renewable oxygen containing crude oil provided in step a has an H/C ratio of less than 1.5.

11. A process according to claim 1 further comprising
passing the first and second product streams from the third and/or fourth reaction zone to a further separation zone in which water and gases are separated from the product streams;
passing the dewatered and degassed product streams to a fractionation zone, where the product streams are separated into a gasoline fraction, an aviation fuel fraction, a diesel fraction, a gas oil fraction, and a residual fraction or any combination thereof.

12. A process according to claim 1, where the oxygen containing renewable crude oil is spiked with sulfur by addition of a sulfur containing compound prior to the step of pressurizing the oxygen containing renewable crude oil to the operational pressure.

13. A process according to claim 1, where a total amount of hydrogen consumed by the process is in the range 2.0 to 10% by weight of the provided oxygen containing renewable crude.

14. A process according to claim 1, wherein the hydrogen added is at least partly produced in-situ from said process of producing an upgraded renewable oil.

15. A process according to claim 1, wherein each of the at least one heterogeneous catalyst in the first and second reaction zones, and the one or more heterogeneous catalysts in the third and fourth reaction zones, comprises a hydrotreating and/or a hydrocracking and/or hydroprocessing, and/or hydrodeoxygenation and/or hydrodenitrogenation and/or hydrodearomatization and/or hydrosomerization catalyst or a combination thereof.

16. A process according to claim 1, wherein an operating pressure of the first and/or second reaction zone and/or third reaction zone and/or fourth reaction zone is at least 70 bar.

17. A process according to claim 1, where an operating pressure of the fourth reaction zone is in the range 20 to 70 bars.

18. A process according to claim 16, where an operating pressure of the first reaction zone and/or the second reaction zone and/or third reaction zone and/or fourth reaction zone is below 180 bar.

19. A process for producing an upgraded renewable oil from renewable carbonaceous material(-s) according to claim 1, wherein
the oxygen containing renewable crude oil is heated to an operational temperature in the range 350-420° C. in one or more steps.

20. A process according to claim 1, where an operational temperature in the first reaction zone is below 350° C.

21. A process according to claim 1, where an operational temperature in the first reaction zone of at least 280° C.

22. A process according to claim 19, where a temperature of the pressurized oxygen containing renewable oil entering the first reaction zone is in the range 80 to 150° C.

23. A process according to claim 1, where an operational temperature in the second reaction zone is below 400° C.

24. A process according to claim 23, where an operational temperature in the second reaction zone is controlled to be in the range from 350 to 400° C.

25. A process according to claim 23, where the weight based hourly space velocity (WHSV) in the second reaction zone is in the range 0.1 to 1 hours$^{-1}$.

26. A process according to claim 23, where an effluent from the reactor is cooled after the second reaction zone.

27. A process according to claim 1, where a partially upgraded renewable oil produced in the second reaction zone is separated into a low boiling fraction and a high boiling fraction where the cut point between the low boiling oil fraction and the high boiling fraction is at least 325° C.

28. A process according to claim 16, where a fraction of the separated oil is withdrawn and added to the oxygen containing renewable crude oil prior to being provided and/or prior to entering the second reaction zone as the heated partially hydrogenated and deoxygenated oil.

29. A process according to claim 1, where the one or more heterogeneous catalysts in the third reaction zone is selected so as to perform a de-aromatization and/or isomerization by means of a hydrocatalytic process of separated and partially upgraded low boiling fraction of renewable oil.

30. A process according to claim 1, where an operational temperature in the third reaction zone is below 400° C.

31. A process according to claim 1, where an operational temperature in the third reaction zone is controlled to be in the range from 350 to 400° C.

32. A process according to claim 1, where the weight based hourly space velocity in the third reaction zone is in the range 0.1 to 1.5 h$^{-1}$.

33. A process according to claim 1,
where water in the form of steam is added to the high boiling renewable liquid hydrocarbon fraction separated from the product of the second reaction zone, prior to entering the fourth reaction zone,
where the fourth reaction zone comprises a catalytic steam conversion and/or catalytic steam cracking reactor comprising a heterogeneous catalyst having a water splitting functionality,
where the heterogeneous catalyst use steam as source of hydrogen for said upgrading process, and
where an operational temperature of the fourth reaction zone is in the range of 350-400° C.

34. A process according to claim 33, where the amount of water added in the form of steam is in the range 5.0 to 35% by weight of the high boiling renewable liquid hydrocarbon fraction.

* * * * *

UNITED STATES PATENT AND TRADEMARK OFFICE
CERTIFICATE OF CORRECTION

| | | |
|---|---|---|
| PATENT NO. | : 11,578,275 B2 | Page 1 of 1 |
| APPLICATION NO. | : 16/961533 | |
| DATED | : February 14, 2023 | |
| INVENTOR(S) | : Steen B. Iversen et al. | |

It is certified that error appears in the above-identified patent and that said Letters Patent is hereby corrected as shown below:

In the Claims

In Claim 33, Column 68, Line 49:
Please change "350-400° C" to --350-420° C.--.

Signed and Sealed this
Sixteenth Day of December, 2025

John A. Squires
*Director of the United States Patent and Trademark Office*